US012165118B2

(12) United States Patent
Yantis et al.

(10) Patent No.: US 12,165,118 B2
(45) Date of Patent: *Dec. 10, 2024

(54) TOKENIZATION PLATFORM

(71) Applicant: VERONA HOLDINGS SEZC, George Town (KY)

(72) Inventors: Jonathan Yantis, Grants Pass, OR (US); William Edward Quigley, Pacific Palisades, CA (US); Lukasz Jakub Sliwka, Long Beach, CA (US)

(73) Assignee: VERONA HOLDINGS SEZC, George Town (KY)

( * ) Notice: Subject to any disclaimer, the term of this patent is extended or adjusted under 35 U.S.C. 154(b) by 473 days.

This patent is subject to a terminal disclaimer.

(21) Appl. No.: 17/523,020

(22) Filed: Nov. 10, 2021

(65) Prior Publication Data

US 2022/0067705 A1 Mar. 3, 2022

Related U.S. Application Data

(63) Continuation of application No. 17/363,618, filed on Jun. 30, 2021, now Pat. No. 11,334,875, which is a
(Continued)

(51) Int. Cl.
*G06Q 20/12* (2012.01)
*G06F 21/60* (2013.01)
(Continued)

(52) U.S. Cl.
CPC ......... *G06Q 20/123* (2013.01); *G06F 21/602* (2013.01); *G06Q 20/326* (2020.05);
(Continued)

(58) Field of Classification Search
CPC .. G06F 21/602; G06Q 20/40; G06Q 30/0185; G06Q 2220/00; G06Q 20/065; G06Q 20/405; H04L 9/50
See application file for complete search history.

(56) References Cited

U.S. PATENT DOCUMENTS 6,970,812 B2 11/2005 Kamachi et al.
7,389,269 B1 6/2008 Robinson et al.
(Continued)

FOREIGN PATENT DOCUMENTS

CA 3055829 A1 9/2018
CA 3118593 A1 5/2020
(Continued)

OTHER PUBLICATIONS

Regner, F. et al., "NFTs in Practice—Non-Fungible Tokens as Core Component of a Blockchain-based Event Ticketing Application," Fortieth International Conference on Information Systems, Munich, 2019, 17 pages.
(Continued)

*Primary Examiner* — Christle I Marshall
(74) *Attorney, Agent, or Firm* — RMCK Law Group, PLC

(57) ABSTRACT

A system for integrating real-world items into video games is disclosed. The system is configured to generate a digital token that is cryptographically linked to an item identifier of a real-world item and to write the token to a cryptographic ledger, wherein the token corresponds to an in-game benefit in a video game that is unlocked for an owner of the token. The system includes a video game integration system that receives a request from an instance of the video game, wherein the request is indicative of the user and requests eligible digital tokens owned by the user; accesses the account of the user on the blockchain using a public address of the user to verify that the user is the owner of the digital token; and serves the digital token to the instance of a video game that unlocks the in-game benefit in response to receiving the token.

28 Claims, 19 Drawing Sheets

Related U.S. Application Data continuation of application No. 17/245,662, filed on Apr. 30, 2021, which is a continuation of application No. PCT/US2019/059389, filed on Nov. 1, 2019.

(60) Provisional application No. 62/906,211, filed on Sep. 26, 2019, provisional application No. 62/770,620, filed on Nov. 21, 2018, provisional application No. 62/770,624, filed on Nov. 21, 2018, provisional application No. 62/754,987, filed on Nov. 2, 2018.

(51) Int. Cl.
  *G06Q 20/32* (2012.01)
  *G06Q 20/34* (2012.01)
  *G06Q 20/36* (2012.01)
  *G06Q 20/38* (2012.01)
  *G06Q 20/40* (2012.01)
  *G06Q 30/018* (2023.01)

(52) U.S. Cl.
  CPC ..... *G06Q 20/342* (2013.01); *G06Q 20/38215* (2013.01); *G06Q 20/40* (2013.01); *G06Q 30/0185* (2013.01); *G06Q 20/1235* (2013.01); *G06Q 20/3672* (2013.01); *G06Q 2220/00* (2013.01)

(56) References Cited

U.S. PATENT DOCUMENTS

| | | |
|---|---|---|
| 7,711,647 B2 | 5/2010 | Gunaseelan et al. |
| 7,747,519 B2 | 6/2010 | Kemper et al. |
| 7,904,381 B1 | 3/2011 | Tatang et al. |
| 8,037,193 B2 | 10/2011 | Hay et al. |
| 8,156,019 B2 | 4/2012 | Wilson et al. |
| 8,360,867 B2 | 1/2013 | Luchene |
| 8,549,416 B2 | 10/2013 | Ganz et al. |
| 8,589,255 B2 | 11/2013 | Glazer et al. |
| 8,606,673 B1 | 12/2013 | Grim et al. |
| 8,712,920 B2 | 4/2014 | Walker et al. |
| 9,129,339 B2 | 9/2015 | Liu |
| 9,229,987 B2 | 1/2016 | Mattsson et al. |
| 9,373,139 B2 | 6/2016 | Kressler |
| 9,396,486 B2 | 7/2016 | Stivoric et al. |
| 9,608,829 B2 | 3/2017 | Spanos et al. |
| 9,737,819 B2 | 8/2017 | DeSanti et al. |
| 9,794,797 B2 | 10/2017 | Hoffberg |
| 9,996,983 B2 | 6/2018 | Mullins |
| 10,043,174 B1 | 8/2018 | Chikkanna |
| 10,116,830 B2 | 10/2018 | Eagleton et al. |
| 10,121,143 B1 | 11/2018 | Madisetti et al. |
| 10,192,073 B2 | 1/2019 | Marin |
| 10,192,198 B2 | 1/2019 | Nazzari et al. |
| 10,210,453 B2 | 2/2019 | Krishnamurthy et al. |
| 10,210,527 B2 | 2/2019 | Radocchia et al. |
| 10,243,743 B1 | 3/2019 | Madisetti et al. |
| 10,373,158 B1 | 8/2019 | James et al. |
| 10,482,533 B2 | 11/2019 | Leonard et al. |
| 10,489,768 B2 | 11/2019 | Szeto et al. |
| 10,505,726 B1 | 12/2019 | Andon et al. |
| 10,506,070 B2 | 12/2019 | Ford et al. |
| 10,540,654 B1 | 1/2020 | James et al. |
| 10,657,595 B2 | 5/2020 | Jong et al. |
| 10,755,263 B1 | 8/2020 | Ramanathan |
| 10,832,338 B1 | 11/2020 | Floyd et al. |
| 10,839,379 B2 | 11/2020 | Pierce et al. |
| 10,896,412 B2 | 1/2021 | Robertson et al. |
| 10,946,283 B1 | 3/2021 | Meilich et al. |
| 10,963,958 B1 | 3/2021 | Best et al. |
| 11,049,082 B2 | 6/2021 | Rice |
| 11,055,279 B2 | 7/2021 | Yan |
| 11,068,978 B1 | 7/2021 | Ferreira |
| 11,075,891 B1 | 7/2021 | Long et al. |
| 11,139,955 B1 | 10/2021 | So et al. |
| 11,176,620 B1 | 11/2021 | Lubczynski et al. |
| 11,200,569 B1 | 12/2021 | James et al. |
| 11,222,298 B2 | 1/2022 | Abelow |
| 11,250,111 B2 | 2/2022 | Goldston et al. |
| 11,256,788 B2 | 2/2022 | Goldston et al. |
| 11,288,736 B1 | 3/2022 | Jette et al. |
| 11,308,487 B1 | 4/2022 | Foster et al. |
| 11,321,308 B2 | 5/2022 | Yan |
| 11,334,883 B1 | 5/2022 | Auerbach et al. |
| 11,488,059 B2 | 11/2022 | Cella |
| 11,500,972 B2 | 11/2022 | Goldston et al. |
| 11,522,700 B1 | 12/2022 | Auerbach et al. |
| 11,538,002 B2 | 12/2022 | Wang et al. |
| 11,552,799 B1 | 1/2023 | Parikh |
| 11,556,620 B2 | 1/2023 | Goldston et al. |
| 11,557,174 B2 | 1/2023 | Simons |
| 11,720,888 B2 | 8/2023 | Norton et al. |
| 11,853,404 B2 | 12/2023 | Goldston et al. |
| 2001/0049606 A1 | 12/2001 | Lucarelli |
| 2002/0073015 A1 | 6/2002 | Chan et al. |
| 2002/0194209 A1 | 12/2002 | Bolosky et al. |
| 2003/0055754 A1 | 3/2003 | Sullivan |
| 2003/0065624 A1 | 4/2003 | James et al. |
| 2003/0220885 A1 | 11/2003 | Lucarelli et al. |
| 2005/0065871 A1 | 3/2005 | Gerhart et al. |
| 2005/0246193 A1 | 11/2005 | Roever et al. |
| 2006/0085314 A1 | 4/2006 | Grim et al. |
| 2006/0224480 A1 | 10/2006 | Bent et al. |
| 2007/0061248 A1 | 3/2007 | Shavit et al. |
| 2007/0094721 A1 | 4/2007 | Nguyen et al. |
| 2007/0129124 A1 | 6/2007 | Luchene |
| 2007/0203852 A1 | 8/2007 | Cameron et al. |
| 2007/0282723 A1 | 12/2007 | Cohen et al. |
| 2008/0004969 A1 | 1/2008 | Shniberg et al. |
| 2008/0027786 A1 | 1/2008 | Davis et al. |
| 2008/0120240 A1 | 5/2008 | Ginter et al. |
| 2008/0243719 A1 | 10/2008 | Shavit et al. |
| 2009/0063295 A1 | 3/2009 | Smith |
| 2009/0063343 A1 | 3/2009 | Mertz et al. |
| 2009/0192891 A1 | 7/2009 | Titus et al. |
| 2009/0198586 A1 | 8/2009 | Owen |
| 2009/0234755 A1 | 9/2009 | Sidoruk |
| 2009/0265270 A1 | 10/2009 | Gangaraju |
| 2009/0283589 A1 | 11/2009 | Moore et al. |
| 2010/0005007 A1 | 1/2010 | Cox et al. |
| 2011/0099099 A1 | 4/2011 | Rivest et al. |
| 2011/0238530 A1 | 9/2011 | Shniberg et al. |
| 2012/0005043 A1 | 1/2012 | Bushinsky |
| 2012/0046779 A1 | 2/2012 | Pax et al. |
| 2012/0290467 A1 | 11/2012 | Shenkar et al. |
| 2012/0330798 A1 | 12/2012 | Fox |
| 2013/0013471 A1 | 1/2013 | Fishman |
| 2013/0132230 A1 | 5/2013 | Gibson et al. |
| 2013/0325547 A1 | 12/2013 | Clark |
| 2014/0244361 A1 | 8/2014 | Zhang et al. |
| 2014/0289386 A1 | 9/2014 | Vatto et al. |
| 2014/0337189 A1 | 11/2014 | Barsade et al. |
| 2014/0351105 A1 | 11/2014 | Hamm |
| 2015/0026072 A1 | 1/2015 | Zhou et al. |
| 2015/0039444 A1 | 2/2015 | Hardin et al. |
| 2015/0074018 A1 | 3/2015 | Gill et al. |
| 2015/0088753 A1 | 3/2015 | Schueren |
| 2015/0142603 A1 | 5/2015 | Haberman |
| 2015/0170112 A1 | 6/2015 | DeCastro |
| 2015/0324764 A1 | 11/2015 | Van Rooyen et al. |
| 2015/0332224 A1 | 11/2015 | Melika et al. |
| 2015/0332256 A1 | 11/2015 | Minor |
| 2015/0363769 A1 | 12/2015 | Ronca et al. |
| 2015/0363777 A1 | 12/2015 | Ronca et al. |
| 2015/0379510 A1 | 12/2015 | Smith |
| 2016/0063429 A1 | 3/2016 | Varley et al. |
| 2016/0071206 A1 | 3/2016 | Danieli |
| 2016/0092988 A1 | 3/2016 | Letourneau |
| 2016/0098723 A1 | 4/2016 | Feeney |
| 2016/0217436 A1 | 7/2016 | Brama |
| 2016/0253651 A1 | 9/2016 | Park et al. |
| 2016/0300234 A1 | 10/2016 | Moss-Pultz et al. |
| 2016/0328705 A1 | 11/2016 | Sebag et al. |
| 2016/0335609 A1 | 11/2016 | Jenkins |
| 2016/0358161 A1 | 12/2016 | Cobban et al. |

(56) References Cited

U.S. PATENT DOCUMENTS

| | | |
|---|---|---|
| 2016/0358184 A1 | 12/2016 | Radocchia et al. |
| 2017/0005804 A1 | 1/2017 | Zinder |
| 2017/0011460 A1 | 1/2017 | Molinari et al. |
| 2017/0024817 A1 | 1/2017 | Wager et al. |
| 2017/0024818 A1 | 1/2017 | Wager et al. |
| 2017/0057170 A1 | 3/2017 | Gupta et al. |
| 2017/0076366 A1 | 3/2017 | Wadley et al. |
| 2017/0083907 A1 | 3/2017 | McDonough et al. |
| 2017/0085545 A1 | 3/2017 | Lohe et al. |
| 2017/0085555 A1 | 3/2017 | Bisikalo et al. |
| 2017/0091756 A1 | 3/2017 | Stern et al. |
| 2017/0103385 A1 | 4/2017 | Wilson, Jr. et al. |
| 2017/0103468 A1 | 4/2017 | Orsini et al. |
| 2017/0109735 A1 | 4/2017 | Sheng et al. |
| 2017/0109744 A1 | 4/2017 | Wilkins et al. |
| 2017/0116693 A1 | 4/2017 | Rae et al. |
| 2017/0132619 A1 | 5/2017 | Miller et al. |
| 2017/0132633 A1 | 5/2017 | Whitehouse |
| 2017/0178245 A1 | 6/2017 | Rodkey et al. |
| 2017/0206522 A1 | 7/2017 | Schiatti et al. |
| 2017/0210525 A1 | 7/2017 | Mayer et al. |
| 2017/0213265 A1 | 7/2017 | Masherah et al. |
| 2017/0214522 A1 | 7/2017 | Code et al. |
| 2017/0221029 A1 | 8/2017 | Lund et al. |
| 2017/0221052 A1 | 8/2017 | Sheng et al. |
| 2017/0232300 A1 | 8/2017 | Tran et al. |
| 2017/0236143 A1 | 8/2017 | Code et al. |
| 2017/0249622 A1 | 8/2017 | Ortiz et al. |
| 2017/0345019 A1 | 11/2017 | Radocchia et al. |
| 2018/0025442 A1 | 1/2018 | Isaacson et al. |
| 2018/0047111 A1 | 2/2018 | Vieira et al. |
| 2018/0048735 A1 * | 2/2018 | Drouin ..................... H04L 67/52 |
| 2018/0068359 A1 | 3/2018 | Preston et al. |
| 2018/0075421 A1 | 3/2018 | Serrano et al. |
| 2018/0075527 A1 | 3/2018 | Nagla et al. |
| 2018/0078843 A1 | 3/2018 | Tran et al. |
| 2018/0091316 A1 | 3/2018 | Stradling et al. |
| 2018/0094953 A1 | 4/2018 | Colson et al. |
| 2018/0096175 A1 | 4/2018 | Schmeling et al. |
| 2018/0114198 A1 | 4/2018 | Ghotbi et al. |
| 2018/0143995 A1 | 5/2018 | Bailey et al. |
| 2018/0144156 A1 | 5/2018 | Marin |
| 2018/0159838 A1 | 6/2018 | Dintenfass |
| 2018/0165612 A1 | 6/2018 | Saxena et al. |
| 2018/0178962 A1 | 6/2018 | Marr et al. |
| 2018/0191503 A1 | 7/2018 | Alwar et al. |
| 2018/0198617 A1 * | 7/2018 | Drouin ................. H04L 9/3213 |
| 2018/0211313 A1 | 7/2018 | Narahari |
| 2018/0218176 A1 | 8/2018 | Voorhees et al. |
| 2018/0218469 A1 | 8/2018 | Lert, Jr. et al. |
| 2018/0322597 A1 | 11/2018 | Sher |
| 2018/0330212 A1 | 11/2018 | Kumar |
| 2018/0343128 A1 | 11/2018 | Uhr et al. |
| 2018/0349485 A1 | 12/2018 | Carlisle et al. |
| 2018/0349893 A1 | 12/2018 | Tsai |
| 2018/0349938 A1 | 12/2018 | Ericson |
| 2018/0365764 A1 | 12/2018 | Nelson |
| 2019/0012660 A1 | 1/2019 | Masters |
| 2019/0019144 A1 | 1/2019 | Gillen |
| 2019/0026711 A1 | 1/2019 | Pinski et al. |
| 2019/0028276 A1 | 1/2019 | Pierce et al. |
| 2019/0043138 A1 | 2/2019 | Blake et al. |
| 2019/0044917 A1 | 2/2019 | Mork et al. |
| 2019/0080392 A1 | 3/2019 | Youb et al. |
| 2019/0080398 A1 | 3/2019 | Jain |
| 2019/0080402 A1 | 3/2019 | Molinari et al. |
| 2019/0081789 A1 | 3/2019 | Madisetti et al. |
| 2019/0087893 A1 | 3/2019 | Pellew |
| 2019/0114609 A1 | 4/2019 | Burton et al. |
| 2019/0114706 A1 | 4/2019 | Bell et al. |
| 2019/0114707 A1 | 4/2019 | McSheehan et al. |
| 2019/0130387 A1 | 5/2019 | Arora et al. |
| 2019/0130399 A1 | 5/2019 | Wright et al. |
| 2019/0130483 A1 | 5/2019 | de Jong |
| 2019/0130484 A1 | 5/2019 | Jong |
| 2019/0130506 A1 | 5/2019 | Walsh |
| 2019/0130701 A1 | 5/2019 | Simons |
| 2019/0156301 A1 | 5/2019 | Bentov et al. |
| 2019/0156938 A1 | 5/2019 | Brunner |
| 2019/0158289 A1 | 5/2019 | Drouin et al. |
| 2019/0164151 A1 | 5/2019 | Doney et al. |
| 2019/0164221 A1 | 5/2019 | Hill et al. |
| 2019/0172026 A1 | 6/2019 | Vessenes et al. |
| 2019/0173854 A1 | 6/2019 | Beck |
| 2019/0213564 A1 | 7/2019 | Chan et al. |
| 2019/0220813 A1 | 7/2019 | Madisetti et al. |
| 2019/0220836 A1 | 7/2019 | Caldwell |
| 2019/0222418 A1 | 7/2019 | O'Brien et al. |
| 2019/0228409 A1 | 7/2019 | Madisetti et al. |
| 2019/0228461 A1 | 7/2019 | Domokos et al. |
| 2019/0236594 A1 | 8/2019 | Ehrlich-Quinn |
| 2019/0251078 A1 | 8/2019 | Yan |
| 2019/0266661 A1 | 8/2019 | Moura et al. |
| 2019/0272591 A1 | 9/2019 | Leonard et al. |
| 2019/0279204 A1 | 9/2019 | Norton et al. |
| 2019/0279215 A1 | 9/2019 | Kuchar et al. |
| 2019/0287100 A1 | 9/2019 | Song et al. |
| 2019/0287175 A1 | 9/2019 | Hill et al. |
| 2019/0299105 A1 | 10/2019 | Knight et al. |
| 2019/0303892 A1 | 10/2019 | Yantis et al. |
| 2019/0303926 A1 | 10/2019 | Yantis et al. |
| 2019/0318425 A1 | 10/2019 | Tilley et al. |
| 2019/0333030 A1 | 10/2019 | Ramasamy et al. |
| 2019/0333142 A1 | 10/2019 | Thomas |
| 2019/0340609 A1 | 11/2019 | Mayadas et al. |
| 2019/0370792 A1 | 12/2019 | Lam |
| 2019/0385156 A1 | 12/2019 | Liu |
| 2019/0385229 A1 | 12/2019 | Leonard et al. |
| 2019/0392511 A1 | 12/2019 | Mahajan et al. |
| 2019/0392536 A1 | 12/2019 | Rice |
| 2020/0005284 A1 | 1/2020 | Vijayan |
| 2020/0013053 A1 | 1/2020 | Amin |
| 2020/0034457 A1 | 1/2020 | Brody et al. |
| 2020/0038761 A1 | 2/2020 | Packin et al. |
| 2020/0042989 A1 | 2/2020 | Ramadoss et al. |
| 2020/0065847 A1 | 2/2020 | Harrison et al. |
| 2020/0065899 A1 | 2/2020 | Fritsch et al. |
| 2020/0074429 A1 | 3/2020 | DeRosa-Grund |
| 2020/0097950 A1 | 3/2020 | Thompson |
| 2020/0133944 A1 | 4/2020 | Yan |
| 2020/0134139 A1 | 4/2020 | Vaish et al. |
| 2020/0184041 A1 | 6/2020 | Andon et al. |
| 2020/0184547 A1 | 6/2020 | Andon et al. |
| 2020/0219150 A1 | 7/2020 | Johnston |
| 2020/0242105 A1 | 7/2020 | Rich et al. |
| 2020/0250590 A1 | 8/2020 | Augustine et al. |
| 2020/0250657 A1 | 8/2020 | Senter et al. |
| 2020/0250752 A1 | 8/2020 | Sugarman |
| 2020/0273048 A1 | 8/2020 | Andon et al. |
| 2020/0279249 A1 | 9/2020 | Ta |
| 2020/0294011 A1 | 9/2020 | Robertson et al. |
| 2020/0320518 A1 | 10/2020 | Simas et al. |
| 2020/0334668 A1 | 10/2020 | Nicli et al. |
| 2020/0349536 A1 | 11/2020 | Hertel et al. |
| 2020/0356991 A1 | 11/2020 | Saraniecki et al. |
| 2020/0119905 A1 | 12/2020 | Revankar et al. |
| 2020/0380090 A1 | 12/2020 | Marion |
| 2020/0394652 A1 | 12/2020 | Youb et al. |
| 2020/0402025 A1 | 12/2020 | Wang et al. |
| 2021/0065293 A1 | 3/2021 | Sigler et al. |
| 2021/0082044 A1 | 3/2021 | Sliwka et al. |
| 2021/0097508 A1 | 4/2021 | Papanikolas |
| 2021/0103984 A1 | 4/2021 | Leonard et al. |
| 2021/0110469 A1 | 4/2021 | Ross et al. |
| 2021/0126794 A1 | 4/2021 | Forrester et al. |
| 2021/0133708 A1 | 5/2021 | Robertson et al. |
| 2021/0133713 A1 | 5/2021 | Wang et al. |
| 2021/0192473 A1 | 6/2021 | Meehan |
| 2021/0201336 A1 | 7/2021 | Mallett et al. |
| 2021/0201625 A1 | 7/2021 | Simons |
| 2021/0248214 A1 | 8/2021 | Goldston et al. |
| 2021/0248594 A1 | 8/2021 | Yantis et al. |
| 2021/0248653 A1 | 8/2021 | McKenzie et al. |
| 2021/0256070 A1 | 8/2021 | Tran et al. |

(56) References Cited

U.S. PATENT DOCUMENTS

| | | |
|---|---|---|
| 2021/0266167 A1 | 8/2021 | Lohe et al. |
| 2021/0279305 A1 | 9/2021 | Goldston et al. |
| 2021/0279695 A1 | 9/2021 | Rice |
| 2021/0281410 A1 | 9/2021 | Hain |
| 2021/0312545 A1 | 10/2021 | Ferreira |
| 2021/0319430 A1 | 10/2021 | Yantis et al. |
| 2021/0326848 A1 | 10/2021 | Yantis et al. |
| 2021/0326849 A1 | 10/2021 | Yantis et al. |
| 2021/0326850 A1 | 10/2021 | Yantis et al. |
| 2021/0342836 A1 | 11/2021 | Cella et al. |
| 2021/0365909 A1 | 11/2021 | Shiina |
| 2021/0382966 A1 | 12/2021 | Shii et al. |
| 2021/0383379 A1 | 12/2021 | Choi |
| 2022/0005023 A1 | 1/2022 | Angelos et al. |
| 2022/0058625 A1 | 2/2022 | Yantis et al. |
| 2022/0058632 A1 | 2/2022 | Yantis et al. |
| 2022/0067705 A1 | 3/2022 | Yantis et al. |
| 2022/0067706 A1* | 3/2022 | Yantis .................. G06Q 20/123 |
| 2022/0067707 A1* | 3/2022 | Yantis .................. G06Q 20/123 |
| 2022/0067708 A1* | 3/2022 | Yantis .................... G06Q 20/40 |
| 2022/0084368 A1 | 3/2022 | Merati |
| 2022/0122050 A1 | 4/2022 | Pacella et al. |
| 2022/0122062 A1 | 4/2022 | Mayblum et al. |
| 2022/0172201 A1 | 6/2022 | Amin |
| 2022/0172284 A1 | 6/2022 | Tarmann et al. |
| 2022/0173893 A1 | 6/2022 | Basu et al. |
| 2022/0210061 A1 | 6/2022 | Simu et al. |
| 2022/0215075 A1 | 7/2022 | Goldston et al. |
| 2022/0215076 A1 | 7/2022 | Goldston et al. |
| 2022/0215469 A1 | 7/2022 | Jette et al. |
| 2022/0230240 A1 | 7/2022 | Sliwka et al. |
| 2022/0233959 A1 | 7/2022 | Tsuda et al. |
| 2022/0245608 A1 | 8/2022 | Burchetta |
| 2022/0253834 A1 | 8/2022 | Vijayan |
| 2022/0261882 A1 | 8/2022 | Youb et al. |
| 2022/0277275 A1 | 9/2022 | Housser et al. |
| 2022/0300926 A1 | 9/2022 | Marusyk |
| 2022/0327529 A1 | 10/2022 | Williams et al. |
| 2022/0374888 A1 | 11/2022 | Lackey |
| 2023/0036730 A1 | 2/2023 | Casa |
| 2023/0054446 A1 | 2/2023 | LaFever et al. |
| 2023/0069649 A1 | 3/2023 | Goldston et al. |
| 2023/0117725 A1 | 4/2023 | Quigley et al. |
| 2023/0117801 A1* | 4/2023 | Quigley ............. G06Q 30/0209 705/65 |
| 2023/0118213 A1 | 4/2023 | Quigley et al. |
| 2023/0119584 A1 | 4/2023 | Quigley et al. |
| 2023/0120636 A1 | 4/2023 | Toohey et al. |
| 2023/0120637 A1 | 4/2023 | Hain |
| 2023/0124608 A1 | 4/2023 | Quigley et al. |
| 2023/0129494 A1* | 4/2023 | Quigley ............... G06Q 20/123 705/65 |
| 2023/0153799 A1 | 5/2023 | Wilson, Jr. et al. |
| 2023/0179421 A1 | 6/2023 | Rojas |
| 2023/0245101 A1 | 8/2023 | Quigley et al. |
| 2023/0273980 A1 | 8/2023 | Goldston et al. |
| 2023/0281937 A1 | 9/2023 | Liu |
| 2023/0376572 A1 | 11/2023 | Barba et al. |
| 2024/0037668 A1 | 2/2024 | Leise et al. |

FOREIGN PATENT DOCUMENTS

| | | | |
|---|---|---|---|
| CA | 3038090 | A1 | 9/2020 |
| CN | 106682983 | A | 5/2017 |
| CN | 108062671 | A | 5/2018 |
| CN | 108335206 | A | 7/2018 |
| CN | 108711040 | A | 10/2018 |
| CN | 108768666 | A | 11/2018 |
| CN | 110860090 | A * | 3/2020 |
| CN | 110135819 | A | 6/2021 |
| CN | 114616582 | A | 6/2022 |
| EP | 3540662 | A1 | 9/2019 |
| GB | 2572339 | A | 10/2019 |
| JP | 2019004463 | A | 1/2019 |
| JP | 2019083013 | A | 5/2019 |
| JP | 2019160312 | A | 9/2019 |
| JP | 2023167674 | A | 11/2023 |
| JP | 3245291 | U | 1/2024 |
| KR | 20190101625 | A | 9/2019 |
| KR | 102100457 | B1 | 4/2020 |
| WO | 2005048159 | A1 | 5/2005 |
| WO | 2007017874 | A2 | 2/2007 |
| WO | 2012150491 | A1 | 11/2012 |
| WO | 2012166790 | A1 | 12/2012 |
| WO | 2015150749 | A1 | 10/2015 |
| WO | 2017178956 | A1 | 10/2017 |
| WO | 2018009973 | A1 | 1/2018 |
| WO | 2018020389 | A2 | 2/2018 |
| WO | 2018154489 | A1 | 8/2018 |
| WO | 2018165472 | A1 | 9/2018 |
| WO | 2018189658 | A1 | 10/2018 |
| WO | 2018209148 | A1 | 11/2018 |
| WO | 2019104250 | A1 | 5/2019 |
| WO | 2019144234 | A1 | 8/2019 |
| WO | 2019169374 | A1 | 9/2019 |
| WO | 2019191687 | A1 | 10/2019 |
| WO | 2020092900 | A2 | 5/2020 |
| WO | 2020123464 | A1 | 6/2020 |
| WO | 2020198409 | A1 | 10/2020 |
| WO | 2020232012 | A1 | 11/2020 |
| WO | 2021046494 | A1 | 3/2021 |
| WO | 2021054989 | A1 | 3/2021 |
| WO | 2022224585 | A1 | 10/2022 |

OTHER PUBLICATIONS

Salt Technology Ltd., "Salt: Blockchain-Backed Loans," Crushcrypto, Sep. 8, 2017, https://crushcrypto.com/wp-content/uploads/2017/08/SALT-abstract.pdf, 18 pages.

Sankrit, K., "What are NFT Tickets? How NFT ticketing could disrupt entertainment," Jan. 2024, https://www.moonpay.com/learn/nft/nft-ticketing, 13 pages.

Schneier, B., "Applied Cryptography, Second Edition—Protocols, Algorithms, and Source Code in C," 20th Anniversary Edition, John Wiley & Sons, Inc., 1996, 31 pages.

Sedlak, K. et al., "Oxcert Protocol Whitepaper 0.4 (draft)," Jul. 5, 2018, 59 pages.

Shrier, D. et al., "Blockchain & Transactions, Markets and Marketplaces," Massachusetts Institute of Technology, May 2016, https://www.getsmarter.com/blog/wp-content/uploads/2017/07/mit_blockchain_transactions_reports.pdf, 18 pages.

Singapore Search Report and Written Opinion dated Apr. 17, 2023 for SG Application No. 11202104293R, 11 pages.

Singapore Search Report and Written Opinion dated Apr. 20, 2023 for SG Application No. 11202105350Q, 9 pages.

Song, I., "Collateral in Loan Classification and Provisioning," IMF Working Paper, Jul. 2002, 25 pages.

The Sandbox Whitepaper [retrieved from the internet on May 24, 2022], , published on Oct. 29, 2020 as per Wayback Machine, 43 pages.

Thirdweb, "Build web3 apps, easily," The Wayback Machine, Nov. 2021, https://web.archive.org/web/20211127040049/https://thirdweb.com/, 6 pages.

Truffle, "Smart Contracts Made Sweeter," The Wayback Machine, Dec. 2020, https://web.archive.org/web/20201201085449/https://www.trufflesuite.com/truffle, 2 pages.

Tsagkarakis, G., "The Six Dragons Reveal Mind-Blowing Crafting on the Blockchain," egamers.io, https://egamers.io/the-six-dragons-reveal-mind-blowing-crafting-on-the-blockchain/, Nov. 2019, 5 pages.

Virk, R., "The One Thing Missing from the ERC 721 Standard for Digital Collectibles on the Blockchain," Sep. 2, 2018, https://medium.com/hackernoon/the-one-thing-missing-from-erc-721-standard-for-digital-collectibles-on-the- blockchain-9ee26e4a918c, 7 pages.

Westerkamp, M. et al., "Blockchain-Based Supply Chain Traceability: Token Recipes Model Manufacturing Processes," Aug. 2018, Retrieved online Sep. 5, 2021 https://www.researchgate.net/publication/326901585_Blockchain-Based_Supply_Chain_Traceability_Token_Recipes_Model_Manufacturing_Processes, 9 pages.

(56) References Cited

OTHER PUBLICATIONS

Yang, J. et al., "A calculation model for the serviceable evaluation of user online comment," 2015 IEEE International Conference on Smart City/SocialCom/SustainCom together with DataCom 2015 and SC2 2015, 2015, pp. 1117-1121.
Your Events Guy: The Top 5 Event Technology Trends That Will Transform Events in 2022, Jun. 2022, https://youreventsguy.wordpress.com, 72 pages.
Zimmerman, B., "How the World of NFTs Could Be the Next Big Thing for Advertising," Forbes Business Council, May 7, 2021, https://www.forbes.com/sites/forbesbusinesscouncil/2021/05/07/how-the-world-of-nfts-could-be-the-next-big-thing-for-advertising/?sh=4b264a044912, 5 pages.
Atkinson, J., "What are NFT events and how do they work?" Dec. 2023, 6 pages, https://jeffreyatkinson209.medium.com/what-are-nft-events-and-how-do-they-work-fbf67b786db9#:~:text=NFT%20events%20serve%20as%20a,their%20digital%20creations%20through%20NFTs.
Banon, J. et al., "Boson Protocol White Paper Decentralized Autonomous Commerce," WhitePaper Version 1.1, Nov. 2020, 50 pages.
Binance Academy, "What Are NFT Games and How Do They Work," The Wayback Machine, Sep. 2021, https://web.archive.org/web/20211010111916/https://academy.binance.com/en/articles/what-are-nft-games-and-how-do-they-work, 9 pages.
Binance Blog: What Is NFT Ticketing and How Does It Work? Jun. 2022, https://www.binance.com/en/blog/nft/what-is-nft-ticketing-and-how-does-it-work-421499824684904022, 3 pages.
Blocknative, "Lessons from a Pioneer in the NFT Game Ecosystem: A Brave New World for Indie Dapp Devs," blocknative, https://www.blocknative.com/blog/gu-cards, Oct. 2019, 5 pages.
Brenn, "Noobs Guide to Understanding ERC-20 vs ERC-721 Tokens," Mar. 25, 2018, https://brennhill.medium.com/noobs-guide-to-understanding-erc-20-vs-erc-721-tokens-d7f5657a4ee7, 4 pages.
Builtin.com, "What is Blockchain?", Aug. 7, 2018, Retrieved online Sep. 5, 2021, https://builtin.com/blockchain, 53 pages.
Buleen, C., "Is iOS AirDrop Marketing a Creepy Tactic or a Unique Opportunity?" Jun. 20, 2018, https://resources.clearvoice.com/blog/is-ios-airdrop-marketing-a-creepy-tactic-or-a-unique-opportunity, 14 pages.
Chevet, S., "Blockchain Technology and Non-Fungible Tokens: Reshaping Value Chains in Creative Industries," May 10, 2018, https://ssrn.com/abstract=3212662 or http://dx.doi.org/10.2139/ssrn.3212662, 73 pages.
Christidis, K. et al., "Blockchains and Smart Contracts for the Internet of Things," IEEE Access, vol. 4, May 2016, pp. 2292-2303.
Crowdfunding Writing with NFTs [retrieved from internet on Jul. 8, 2022] published on Apr. 19, 2021 as per Wayback Machine, 10 pages.
Dhar, S. et al., "Smarter banking: Blockchain technology in the Indian Banking System," Asian Management Insights, vol. 3, No. 2, Nov. 2016, pp. 46-53.
Di Stasi, G. et al., "Routing Payments on the Lightning Network," 2018 IEEE Confs on Internet of Things, Green Computing Communications, Cyber, Physical and Social Computing, Smart Data, Blockchain, Computer and Information Technology, Congress on Cybermatics, Jul. 2018, pp. 1161-1170.
Entriken, W. et al., "EIP-721: ERC-721 Non-Fungible Token Standard," Ethereum Improvement Proposals, No. 721, Jan. 2018, https://eips.ethereum.org/EIPS/eip-721, 11 pages.
Entriken, W. et al., "EIP-721: Non-Fungible Token Standard," Jan. 24, 2018, retrieved online Sep. 5, 2021 https://eips.ethereum.org/EIPS/eip-721, 14 pages.
Extended European Search Report dated Dec. 6, 2021 for European Patent Application No. 19775523.4, 10 pages.
Extended European Search Report dated Dec. 8, 2021 for European Patent Application No. 19776576.1, 10 pages.
Extended European Search Report dated Jul. 12, 2022 for EP Application No. 19887239.2, 6 pages.
Extended European Search Report dated Jun. 27, 2023 for EP Application No. 20867151.1, 10 pages.
Extended European Search Report dated Jun. 28, 2022 for EP Application No. 19879849.8, 6 pages.
Flynn, B., "Crafting New Value with Existing Tokens," medium.com, https://medium.com/@brianubiquik/crafting-new-value-with-existing-tokens-de95fe838fea, Jun. 6, 2018, 10 pages.
Frankenfield, J., "Cryptocurrency Airdrop," WayBack Machine, Jun. 24, 2021, https://web.archive.org/web/20210730071512/https://www.investopedia.com/terms/a/airdrop-cryptocurrency.asp, 6 pages.
Gigco Ltd., Web3 Live Music Revolution, https://gigco-global.ams3.cdn.digitaloceanspaces.com/docs/GIGCO_LITEPAPER%20.pdf, 2024, 26 pages.
Hackernoon, "NFT Renting: For When You Want to Give Your NFTs DeFi Powers," The Wayback Machine, Jan. 7, 2022, https://web.archive.org/web/20220107140320/https://hackernoon.com/nft-renting-for-when-you-want-to-give-your-nfts-defi-powers, 6 pages.
Hong, S. et al., "FabAsset: Unique Digital Asset Management System for Hyperledger Fabric," 2020 IEEE 40th International Conference on Distributed Computing Systems (ICDCS), IEEE, 2020, pp. 1269-1274.
Hoogendoorn, R., "The Six Dragons NFT Extends to Crafting Simulator—Play to Earn," Published: Jan. 11, 2021, https://www.playtoearn.online/2021/01/11/the-six-dragons-nft-extends-to-crafting-simulator/, 3 pages.
Jerseyloco Whitepaper NFT's, Aug. 2023, https://jerseyloco.com/wp-content/uploads/2020/02/Whitepaper-NFT-08.pdf, 33 pages.
Khan, M. et al., "A Tamper-Resistant Digital Token-Based Rights Management System," IEEE, 2017 International Carnahan Conference on Security Technology (ICCST), 2017, 6 pages.
Klems, M. et al., "Trustless Intermediation in Blockchain-Based Decentralized Service Marketplaces," ICSOC 2017, LNCS 10601, Oct. 2017, pp. 731-739, https://doi.org/10.1007/978-3-319-69035-3_53.
Kryvoborodov, Y., "Why NFT Ticketing Is a New Normal for Event Management," Jan. 2023, https://unicsoft.com/blog/why-nft-ticketing-is-a-new-normal-for-event-managment/, 13 pages.
Li, H. et al., "How People Select Their Payment Methods in Online Auctions? An Exploration of eBay Transactions," Proceedings of the 37th Hawaii International Conference on System Sciences, 2004, pp. 1-10.
LuxFi Official, "Real-World Asset-Backed NFTs—What Does it Mean?" Sep. 28, 2021, https://luxfiofficial.medium.com/real-world-asset-backed-nfts-what-does-it-mean-5c95e41d88d3, 14 pages.
Mai, J. et al., "Customized production based on distributed 3D printing services in cloud manufacturing," Int J Adv Manuf Technol, 2016, vol. 84, pp. 71-83.
Menezes, A.J. et al., "Handbook of Applied Cryptography," CRC Press, Dec. 1996, 30 pages.
Mihuandayani, et al., "Text Mining Based on Tax Comments as Big Data Analysis Using SVM and Feature Selection," 2018 International Conference on Information and Communications Technology (ICOIACT), 2018, pp. 537-542.
NFTs for Events: Should You Embrace Them? https://www.proglobalevents.com/blog/nft-events/2024, 11 pages.
Ogiela, M.R. et al., "Security of Distributed Ledger Solutions Based on Blockchain Technologies," 2018 IEEE 32nd International Conference on Advanced Information Networking and Applications, 2018, pp. 1089-1095.
PCT International Search Report and Written Opinion dated Aug. 21, 2020 for International Application No. PCT/US2019/059389, 20 pages.
PCT International Search Report and Written Opinion dated Feb. 5, 2020 for International Application No. PCT/US2019/062673, 10 pages.
PCT International Search Report and Written Opinion dated Jan. 8, 2021 for International Application No. PCT/US2020/052728, 11 pages.
PCT International Search Report and Written Opinion dated Jul. 1, 2022 for International Application No. PCT/US2022/016749, 17 pages.
PCT International Search Report and Written Opinion dated Jun. 21, 2022 for International Application No. PCT/US2022/021745, 20 pages.

(56) References Cited

OTHER PUBLICATIONS

PCT International Search Report and Written Opinion dated Jun. 26, 2019 for PCT International Application No. PCT/US2019/025003, 7 pages.
PCT International Search Report and Written Opinion dated Jun. 28, 2019 for PCT International Application No. PCT/US2019/025002, 6 pages.
PCT International Search Report and Written Opinion dated Jun. 30, 2023 for International Application No. PCT/US2023/014961, 16 pages.
PCT International Search Report and Written Opinion mailed Apr. 18, 2023 for International Application No. PCT/US2022/047396, 25 pages.
Pink.gg, "Atomic Assets 1.0—Launching the AtomicHub," https://pinkgg.medium.com/atomicassets-1-0-launching-the-atomichub-493c9242c1ff, Jun. 2020, 9 pages.
Radomski, W. et al., "EIP-1155: ERC-1155 Multi Token Standard," Ethereum Improvement Proposals, No. 1155, Jun. 2018, https://eips.ethereum.org/EIPS/eip-1155, 18 pages.
Rajendran, B. et al., "Secure and Privacy Preserving Digital Payment," IEEE SmartWorld, Ubiquitous Intelligence & Computing, Advanced & Trusted Computed, Scalable Computing & Communications, Cloud & Big Data Computing, Internet of People and Smart City Innovation, 2017, 5 pages.
Ray, J., "A Next-Generation Smart Contract and Decentralized Application Platform," Ethereum Whitepaper, The Wayback Machine—https://web.archive.org/web/20180919085323/https://github.com/ethereum/wiki/wiki/White-Paper#messages-and-transactions, 2018, 40 pages.

\* cited by examiner

TOKENIZATION PLATFORM

CROSS-REFERENCE TO RELATED APPLICATIONS

This application is a continuation of U.S. Non-Provisional application Ser. No. 17/363,618, filed on Jun. 30, 2021, which is a continuation of U.S. Non-Provisional application Ser. No. 17/245,662, filed on Apr. 30, 2021, which is a continuation of International Application No. PCT/US2019/059389, filed on Nov. 1, 2019, which claims priority to U.S. Provisional Application No. 62/906,211, filed on Sep. 26, 2019; 62/770,620, filed on Nov. 21, 2018; 62/770,624, filed on Nov. 21, 2018; and 62/754,987, filed on Nov. 2, 2018. The disclosures of each of the above applications are incorporated herein by reference in their entirety.

FIELD

The present disclosure relates to a platform that effectuates transactions involving tokens that correspond to instances of linkage among physical and/or digital items and corresponding virtual representations of the physical and/or digital items.

BACKGROUND

Conventional e-Commerce processes involve unnecessary friction. These processes were typically designed around use cases in which a purchaser places an order knowing exactly what they want, how they are going to pay for it, where it is going to go, who it is for, and that they want it as soon as possible. Conventional e-commerce does not allow for much flexibility in these buying decisions. For example, a user wishing to purchase a gift for someone typically makes a purchase via a website or mobile application, enters the intended recipient's known address (regardless of whether the recipient typically receives packages at the known address), and pays for the gift. The gift is then immediately sent to the recipient, regardless of whether the recipient is available to receive the package. Accordingly, there is a need in the art for an e-commerce platform with greater flexibility around all facets of a transaction including, but not limited to, purchase selection, payment, transfer of possession, and location and timing of delivery.

Meanwhile, virtual items have become increasingly popular, such as in video games, where skins, weapons, tools, and many other items are purchased and traded among players. Virtual items, like other digital items, can be possessed, used and transferred without the same constraints on transportation, delivery and storage that are involved for physical items. However, the value of a virtual item can be ephemeral, as creators can potentially create an unlimited number of copies, rendering initially rare items much less valuable. A need exists for a platform with methods and systems that provide both the flexibility and convenience of virtual item transactions and the reliability and value of physical item transactions.

SUMMARY

Provided herein is a platform that provides both the flexibility and convenience of virtual item transactions and the reliability and value of physical item transactions by providing a set of capabilities for storing, transacting, transferring, exchanging, and otherwise processing a set of secure, tokenized links, where each link exists between a unique physical item and a unique instance of a virtual representation of the physical item, such that ownership and control of the virtual representation corresponds to ownership and control of the physical item. As a result of the linkage, for example, a user can send a virtual representation of an item to friend, and the friend may possess the item, representing ownership and the right to control of the physical item to which the virtual item is linked. Meanwhile, the item itself need not be delivered until such time as the recipient wishes to take possession of it. In some embodiments, the physical item may comprise an item that has yet to be created, such as an item of food (e.g., a pizza from a specific provider) that will be made and delivered when delivery is desired by the owner of the virtual representation that corresponds to that item (e.g., when the owner received a gift of a token representing the pizza). A wide range of transactions in a wide range of virtual items that are linked to physical items are encompassed and enabled by the platform, methods and systems described herein, such as gifts that do not require immediate physical delivery, lending transactions where collateral can remain securely stored, transactions in digital luxury goods, and many others.

According to some embodiments of the present disclosure, a platform and method for facilitating a set of transactions involving a set of items is disclosed. The method includes receiving one or more item attributes of the item via a first graphical user interface of a tokenization platform, the item attributes including a number of instances of the item that are available for transaction by a merchant of the item. The method also includes generating a virtual representation of the item based on the item attributes, wherein the virtual representation is a data structure that stores the item attributes. The method further includes updating a distributed ledger to include the virtual representation. The method also includes generating N tokens based on the virtual representation, wherein N is an integer equal to the number of items available for transaction and wherein each token is redeemable by an owner of the token in order to satisfy the transaction for the instance of the item. The method further includes updating the distributed ledger to include the N tokens, and for each token of the N tokens, ownership data of the token that indicates that the token is initially owned by the merchant of the item. The method also includes providing a digital marketplace that provides a second graphical user interface that allows consumers to: view visualizations of virtual representations of items including the virtual representation of the item; and transact for an instance of the item by purchasing a token of the N tokens.

In some embodiments, the N tokens include non-fungible tokens. In embodiments, the N tokens include fungible tokens. In embodiments, the N tokens are transferrable to other users. In embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, a giveaway of the instance of the item, or any other action that affects the ownership of the item.

In some embodiments, the method further includes receiving a request to transact for the item via the digital marketplace from a user device associated with a transacting consumer and facilitating a transaction for an instance of the item. In these embodiments, facilitating the truncation includes verifying an account of the transacting consumer; and processing a payment received from the transacting consumer. The method also includes updating the ownership data of one token of the N tokens to indicate that the transacting consumer owns the one token.

According to some embodiments of the present disclosure, a method for facilitating transactions via a tokenization platform is disclosed. The method includes maintaining a distributed ledger that stores: a plurality of public addresses, wherein each respective public address corresponds to a respective account of a respective user of the tokenization platform; a plurality of virtual representations of a plurality of respective items; and for each virtual representation, a set of tokens that respectively correspond to a respective instance of the item represented by the virtual representation, and ownership data of each respective token. The method further includes providing a digital marketplace that provides a second graphical user interface that allows consumers to: view visualizations of virtual representations of items including the virtual representation of the item; and transact for an instance of an item of the plurality of respective items by purchasing a token from the set of tokens corresponding to the item. The method also includes receiving a request to participate in a transaction for an instance of an item represented by a virtual representation of the plurality of virtual representations from a consumer user. The method includes updating the distributed ledger with a block that includes ownership data that indicates that a specific token corresponding to the virtual representation is owned by the transacting user in response to verifying the request to participate in the transaction, wherein the specific token is redeemed by an owner of the token in order to satisfy the transaction for the instance of the item.

In embodiments, the set of tokens corresponding to a virtual representation includes non-fungible tokens. In some embodiments, the set of tokens corresponding to a virtual representation includes fungible tokens. In some embodiments, the set of tokens corresponding to a virtual representation are transferrable to other users. In some embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, and a giveaway of the instance of the item.

According to some embodiments of the present disclosure, a method for facilitating transactions via a tokenization platform is disclosed. The method includes maintaining a distributed ledger that stores: a plurality of public addresses, wherein each respective public address corresponds to a respective account of a respective user of the tokenization platform; a plurality of virtual representations of a plurality of respective items; and for each virtual representation, a set of tokens that respectively correspond to a respective instance of the item represented by the virtual representation, and ownership data of each respective token. The method further includes providing a digital marketplace that provides a second graphical user interface that allows consumers to: view visualizations of virtual representations of items including the virtual representation of the item; and transact for an instance of an item of the plurality of respective items by purchasing a token from the set of tokens corresponding to the item. The method also includes receiving a request to participate in a transaction for an instance of an item represented by a virtual representation of the plurality of virtual representations from a consumer user. The method includes updating the distributed ledger with a block that includes ownership data that indicates that a specific token corresponding to the virtual representation is owned by the transacting user in response to verifying the request to participate in the transaction, wherein the specific token is redeemed by an owner of the token in order to satisfy the transaction for the instance of the item. The method further includes receiving a transfer request to transfer the specific token to a different user, wherein the transfer request includes a token identifier that identifies the specific token and a public address of the different user and validating the specific token based on the token identifier and the distributed ledger. The method further includes verifying that the different user has a valid account on the tokenization platform based on the public address of the user and the distributed ledger. Furthermore, in response to validating the specific token and verifying the different user, the method includes updating the distributed ledger with a block that includes ownership data that indicates that a specific token corresponding to the virtual representation is owned by the transacting user. The method also includes receiving a redemption request to redeem the token from a user device of the different user. Additionally, in response to receiving the redemption request, the method further includes executing a workflow to satisfy the transaction for instance of the item corresponding to the token.

In embodiments, the set of tokens corresponding to a virtual representation includes non-fungible tokens. In some embodiments, the set of tokens corresponding to a virtual representation includes fungible tokens. In some embodiments, the set of tokens corresponding to a virtual representation are transferrable to other users. In some embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, and a giveaway of the instance of the item.

According to some embodiments of the present disclosure, a method is disclosed. The method includes displaying a digital wallet graphical user interface via a user device of a user associated with the digital wallet. The method further includes displaying, by the digital wallet graphical user interface, an inventory of tokens that are owned by the user, wherein each token corresponds to a respective item and wherein each token is redeemable by user to satisfy a transaction for an instance of the respective item. The method also includes receiving, by the digital wallet graphical user interface, an instruction to transfer a token from the inventory of tokens to a recipient. The method also includes displaying, by the digital wallet graphical user interface, a digital keyboard, wherein the digital keyboard includes a selectable media content that is representative of the respective item that corresponds to the token to be transferred. The method also includes receiving, by the digital keyboard, a text-based message including a selection of the selectable media content. The method also includes embedding, by the digital keyboard, the token in the text-based message, wherein the token is embedded in the selectable media content. The method further includes transmitting, by the digital wallet, the text-based message having the token embedded therein to a message account of the recipient, wherein the recipient can select the selectable media content to accept to the token into a respective digital wallet of the recipient.

In embodiments, the set of tokens corresponding to a virtual representation includes non-fungible tokens. In embodiments, the set of tokens corresponding to a virtual representation includes fungible tokens. In embodiments, the set of tokens corresponding to a virtual representation are transferrable to other users. In embodiments, the item is one of a digital good, a physical good, a digital service, a physical service, a digital experience, or a digital experience. In embodiments, the transaction for an instance of an item is one of a sale of the instance of the item, a lease of the instance of the item, a gifting of the instance of the item, and a giveaway of the instance of the item. In embodiments, the selectable media content is an emoji having the token associated therewith. In some of these embodiments, the token is embedded in the emoji. In some of these embodiments, the selectable media content includes a deep link where a recipient of the selectable media content can select the selectable media content to accept the token. In embodiments, the selectable media content is one of an image, a .gif, or a video.

According to some embodiments of the present disclosure, a method for facilitating transactions via a tokenization platform is disclosed. The method includes maintaining a distributed ledger that stores a plurality of public addresses, wherein each respective public address corresponds to a respective account of a respective user of the tokenization platform. The distributed ledger further stores a plurality of virtual representations of a plurality of respective items, wherein each virtual representation includes virtual reality content to render a virtual reality visualization of the respective item, and for each virtual representation, a set of tokens that respectively correspond to a respective instance of the item represented by the virtual representation, and ownership data of each respective token. The method also includes rendering a virtual reality store environment, wherein the virtual reality store environment provides an interface that allows users to view virtual reality visualizations of available items that are available for transaction and to transact for instances of the available items. The method further includes rendering a virtual reality visualization of an item represented by a virtual representation of the plurality of virtual representations based on the virtual reality content in in the virtual representation, wherein the virtual reality visualization of the item is presented in the virtual reality store environment. The method also includes receiving a request to participate in a transaction for an instance of the item represented by the virtual reality representation of the item from a user device of a transacting user, wherein the request to participate in the transaction is received in response to the transacting user viewing the virtual reality representation of the item in the virtual reality store environment. The method also includes, in response to verifying the request to participate in the transaction, associating a specific token corresponding to the virtual representation with an account of the transacting user in the distributed ledger.

In embodiments, the method also includes receiving a transfer request to transfer the specific token to a different user, wherein the transfer request includes a token identifier that identifies the specific token and a public address of the different user. In these embodiments, the method further includes validating the specific token based on the token identifier and the distributed ledger, verifying that the different user has a valid account on the tokenization platform based on the public address of the user and the distributed ledger, and in response to validating the specific token and verifying the different user, updating the distributed ledger with a block that includes ownership data that indicates that a specific token corresponding to the virtual representation is owned by the transacting user. In some of these embodiments, the method further includes receiving a redemption request to redeem the token from a user device of the different user, and in response to receiving the redemption request, executing a workflow to satisfy the transaction for instance of the item corresponding to the token.

In embodiments, the set of tokens corresponding to a virtual representation includes non-fungible tokens. In embodiments, the set of tokens corresponding to a virtual representation includes fungible tokens. In embodiments, the set of tokens corresponding to a virtual representation are transferrable to other users. In embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, and a giveaway of the instance of the item.

According to some embodiments of the present disclosure, a method for facilitating transactions via a tokenization platform is disclosed. The method includes maintaining a distributed ledger that stores a plurality of public addresses, wherein each respective public address corresponds to a respective account of a respective user of the tokenization platform. The distributed ledger further stores a plurality of virtual representations of a plurality of respective items, wherein each virtual representation includes virtual reality content to render a virtual reality visualization of the respective item, and for each virtual representation, a set of tokens that respectively correspond to a respective instance of the item represented by the virtual representation, and ownership data of each respective token. The method further includes receiving a redemption request to redeem a token from a user device of a user, the token corresponding to an instance of an item to be redeemed. The method also includes, in response to receiving the redemption request, verifying that the user is the owner of the token based on the distributed ledger and the redemption request. The method further includes, in response to verifying that the user is the owner of the token, requesting delivery details pertaining to the item from the user. The method further includes receiving the delivery details from the user device of the user and, in response to receiving the delivery details form the user device, outputting the delivery details to a delivery system that facilitates delivery of the item.

In embodiments, requesting the delivery details pertaining to the item includes requesting a current location of the user. In some of these embodiments, the item being redeemed is one of a food item or a ride share. In some of these embodiments, the user device provides a geolocation of the user device. Additionally, or alternatively, the user device provides an address provided by the user.

In embodiments, the item being redeemed is a tangible good. In some of these embodiments, the delivery details include a current geolocation of the user device captured by the user device. In some of these embodiments, the delivery details include a current address of the user provided to the user device by the user via a graphical user interface of the user device.

In embodiments, the set of tokens corresponding to a virtual representation are transferrable to other users. In embodiments, a transaction for an instance of an item is one of a sale of the instance of the item, a lease of the instance of the item, a gifting of the instance of the item, and a giveaway of the instance of the item.

According to some embodiments of the present disclosure, a method for facilitating transactions via a tokenization platform is disclosed. The method includes maintaining a distributed ledger that stores a plurality of public addresses, wherein each respective public address corresponds to a respective account of a respective user of the tokenization platform. The distributed ledger further stores a plurality of virtual representations of a plurality of respective items, wherein each virtual representation includes virtual reality content to render a virtual reality visualization of the respective item, and for each virtual representation, a set of tokens that respectively correspond to a respective instance of the item represented by the virtual representation, and ownership data of each respective token. The method also includes receiving a redemption request to redeem a token from a user device of a user, the token corresponding to an instance of an item to be redeemed. The method further includes, in response to receiving the redemption request, verifying that the user is the owner of the token based on the distributed ledger and the redemption request. The method also includes, in response to verifying that the user is the owner of the token, requesting fulfilment details pertaining to the item from the user, wherein the fulfilment details include information needed to satisfy the transaction for the item that were not provided at a time when the token was transacted for. The method also includes receiving the fulfilment details from the user device of the user and, in response to receiving the delivery details form the user device, outputting the fulfilment details to a fulfilment system that satisfies transactions for items.

In embodiments, the item is an article of clothing. In some of these embodiments, requesting the fulfilment details pertaining to the item includes requesting a size of the item. In some of these embodiments, requesting the fulfilment details pertaining to the item includes requesting a color of the item. In some of these embodiments, requesting the fulfilment details pertaining to the item includes requesting a delivery date of the item.

In embodiments, the set of tokens corresponding to a virtual representation includes non-fungible tokens. In embodiments, the set of tokens corresponding to a virtual representation includes fungible tokens. In embodiments, the set of tokens corresponding to a virtual representation are transferrable to other users. In embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, and a giveaway of the instance of the item.

According to some embodiments of the present disclosure, a method for facilitating transactions via a tokenization platform is disclosed. The method includes maintaining a distributed ledger that includes a main chain of blocks and a first side chain of blocks. The main chain of blocks collectively store information relating to plurality of users, including item providers and consumers, wherein the information relating to the plurality of users includes a plurality of public addresses, wherein each respective public address corresponds to a respective account of a respective user of the tokenization platform. The first side chain of blocks collectively store: a plurality of virtual representations of a plurality of respective items, wherein each virtual representation includes virtual reality content to render a virtual reality visualization of the respective item; and for each virtual representation, a set of tokens that respectively correspond to a respective instance of the item represented by the virtual representation, and ownership data of each respective token. The method also includes receiving a request to participate in a transaction for an instance of an item represented by a virtual representation of the plurality of virtual representations from a user device of a transacting user. The method further includes, in response to verifying the request to participate in the transaction, updating ownership data of a specific token corresponding to the virtual representation in the first side chain of blocks to indicate that the transacting user owns the specific token.

According to some embodiments, the method further includes receiving a redemption request to redeem the specific token from a user device of the transacting user, and verifying that the transacting user is the owner of the specific token based on the first side chain of blocks and the redemption request. The method also includes, in response to verifying the transacting user is the owner of the specific token, executing a workflow to satisfy the transaction for instance of the item corresponding to the token.

According to some embodiments, the method further includes receiving a transfer request to transfer the specific token to a different user, wherein the transfer request includes a token identifier that identifies the specific token and a public address of the different user. In these embodiments, the method further includes validating the specific token based on the token identifier and the first chain of block and verifying that the different user has a valid account on the tokenization platform based on the public address of the user and the main chain of blocks. The method further includes, in response to validating the specific token and verifying the different user, updating the second chain of blocks with a new block that includes ownership data that indicates that the specific token corresponding to the virtual representation is owned by the different user. In some of these embodiments, the method further includes receiving a redemption request to redeem the token from a user device of the different user; verifying that the different user is the owner of the specific token based on the first side chain of blocks and the redemption request; and in response to verifying the different user is the owner of the specific token, executing a workflow to satisfy the transaction for instance of the item corresponding to the token.

According to some embodiments, the distributed ledger further includes a second side chain of blocks that collectively store one or more respective media contents relating to respective virtual representations of the plurality of virtual representations. In some of these embodiments, the one or more respective media contents include an image of a respective item represented by a respective virtual representation. In some of these embodiments, the one or more respective media contents include a video of a respective item represented by a respective virtual representation. In some of these embodiments, the one or more respective media contents include virtual reality content depicting a respective item represented by a respective virtual representation.

In embodiments, the set of tokens corresponding to a virtual representation includes non-fungible tokens. In embodiments, the set of tokens corresponding to a virtual representation includes fungible tokens. In embodiments, the set of tokens corresponding to a virtual representation are transferrable to other users. In embodiments, the item is one of a digital good, a physical good, a digital service, a physical service, a digital experience, or a digital experience. In embodiments, a transaction for an instance of an item is one of a sale of the instance of the item, a lease of the instance of the item, a gifting of the instance of the item, and a giveaway of the instance of the item.

According to some embodiments of the present disclosure, a method for facilitating transactions via a tokenization platform is disclosed. The method includes maintaining a distributed ledger that includes a main chain of blocks and a first side chain of blocks. The main chain of blocks collectively store information relating to plurality of users, including item providers and consumers, wherein the information relating to the plurality of users includes a plurality of public addresses, wherein each respective public address corresponds to a respective account of a respective user of the tokenization platform. The first side chain of blocks collectively store: a plurality of virtual representations of a plurality of respective items, wherein each virtual representation includes virtual reality content to render a virtual reality visualization of the respective item; and for each virtual representation, a set of tokens that respectively correspond to a respective instance of the item represented by the virtual representation, and ownership data of each respective token. The method also includes receiving a transfer request to transfer the specific token from an owner of the specific token to a different user, wherein the transfer request includes a token identifier that identifies the specific token and a public address of the different user. The method also includes validating the specific token based on the token identifier and the first chain of blocks and verifying that the different user has a valid account on the tokenization platform based on the public address of the user and the main chain of blocks. The method also includes, in response to validating the specific token and verifying the different user, updating the second chain of blocks with a new block that includes ownership data that indicates that the specific token corresponding to the virtual representation is owned by the different user.

According to some embodiments, the method further includes receiving a redemption request to redeem the token from a user device of the different user and verifying that the different user is the owner of the specific token based on the new block in the first side chain of blocks and the redemption request. In these embodiments, the method further includes, in response to verifying the different user is the owner of the specific token, executing a workflow to satisfy the transaction for instance of the item corresponding to the token.

According to some embodiments of the present disclosure, a method for facilitating transactions via a tokenization platform is disclosed. The method includes maintaining a distributed ledger that includes a main chain of blocks and a first side chain of blocks. The main chain of blocks collectively store information relating to plurality of users, including item providers and consumers, wherein the information relating to the plurality of users includes a plurality of public addresses, wherein each respective public address corresponds to a respective account of a respective user of the tokenization platform. The first side chain of blocks collectively store: a plurality of virtual representations of a plurality of respective items, wherein each virtual representation includes virtual reality content to render a virtual reality visualization of the respective item; and for each virtual representation, a set of tokens that respectively correspond to a respective instance of the item represented by the virtual representation, and ownership data of each respective token.

According to some embodiments of the present disclosure, a method for generating a digital token that uniquely represents an item includes obtaining, by a processing system of a tokenization platform, a unique identifier for a unique unit of the item, generating, by a cryptographic token generation system, a unique digital token includes a set of digital attributes that correspond to the set of item attributes, and cryptographically linking, by a linking system, the unique digital token and the unique identifier for the unique unit of the item such that the unique digital token provides a unique digital representation of the unique unit of the item. The item includes a set of item attributes.

In embodiments, the item is a real-world object.

In embodiments, the real-world object is a consumer product, a unique instance of a digital item, or a gift card.

In embodiments, the set of digital attributes of the gift card include a merchant with which the gift card is redeemable.

In embodiments, the set of digital attributes of the gift card include a redeemable value. In embodiments, the item is already in existence.

In embodiments, the unique digital token is redeemable for fulfillment of the unit of the consumer product.

In embodiments, the item has a defined type and a defined set of characteristics but is not yet in existence.

In embodiments, the unique digital token is redeemable for a right to possess the item.

In embodiments, possession of the unique digital token represents ownership of the item.

In embodiments, the item is a gift card and the unique digital token represents a right to redeem the gift card.

In embodiments, the unique digital token is transferable.

In embodiments, transfer of the unique digital token is executable by sending the unique digital token in a messaging interface.

In embodiments, transfer of the unique digital token is executable by sending the unique digital token in an email interface.

In embodiments, the set of item attributes includes a set of physical attributes.

In embodiments, set of the item attributes includes a set of origination attributes.

In embodiments, the set of origination attributes includes limited-edition attributes, celebrity-signature attributes, certification of originality attributes, location of origin attributes, certification of ethical production attributes, or creator attributes.

In embodiments, the set of digital attributes of the unique digital token includes a data structure that represents the set of item attributes.

In embodiments, the set of digital attributes of the unique digital token includes a data structure that supports a visual representation of the item.

In embodiments, the set of digital attributes of the unique digital token includes a data structure that represents an animation of the item.

In embodiments, the set of digital attributes of the unique digital token includes an image of the item.

According to some embodiments of the present disclosure, a system for generating a digital token that uniquely represents a real-world object, includes an interface configured to handle a unique identifier for a unique unit of a real-world object, a cryptographic token generation system that generates a unique digital token that has a set of digital attributes that correspond to the set of real-world object attributes, wherein the unique digital token is cryptographically secure, and a cryptographic linking system configured to generate a cryptographically secure, one-to-at-least-one link between the unique digital token generated by the cryptographic token generation system and the unique identifier for the unique unit of the real-world object, such that the unique digital token provides a unique digital representation of the unique unit of the real-world object. The real-world object has a set of real-world-object attributes.

In embodiments, the real-world object is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for a right to possess the real-world object.

In embodiments, possession of the unique digital token represents ownership of the real-world object.

In embodiments, the unique digital token is transferable.

In embodiments, the set of real-world-object attributes includes a set of physical attributes.

In embodiments, the set of real-world-object attributes a set of origination attributes.

In embodiments, the set of origination attributes includes limited edition attributes.

In embodiments, the set of origination attributes includes celebrity signature attributes.

In embodiments, the set of origination attributes includes certification of originality attributes.

In embodiments, the set of origination attributes includes location of origin attributes.

In embodiments, the set of origination attributes includes certification of ethical production attributes.

In embodiments, the set of digital attributes of the unique digital token includes a data structure that represents the physical attributes of the real-world object.

In embodiments, the set of digital attributes of the unique digital token includes a data structure that supports a visual representation of the real-world object.

In embodiments, the set of digital attributes of the unique digital token includes an image of the real-world object.

In embodiments, the set of digital attributes of the unique digital token includes a data structure that represents an animation of the real-world object.

According to some embodiments of the present disclosure, a system for generating a digital token that uniquely represents a unique unit of a consumer product, includes an interface configured to handle a unique identifier for a unique unit of a consumer product, a cryptographic token generation system that generates a unique digital token that has a set of digital attributes that corresponds to the set of consumer-product attributes, wherein the unique digital token is cryptographically secure, and a linking system configured to generate a one-to-at-least-one link between the unique digital token generated by the cryptographic token generation system and the unique identifier for the unique unit of the consumer product, such that the unique digital token provides a unique digital representation of the unique unit of the consumer product. The consumer product has a set of consumer-product attributes.

In embodiments, the set of consumer-product attributes includes a set of physical attributes.

In embodiments, the set of consumer-product attributes includes a set of origination attributes.

In embodiments, the set of origination attributes includes limited edition attributes.

In embodiments, the set of origination attributes of the consumer product include celebrity signature attributes.

In embodiments, the set of origination attributes includes certification of originality attributes.

In embodiments, the set of origination attributes includes location of origin attributes.

In embodiments, the set of origination attributes includes certification of ethical production attributes.

In embodiments, the set of digital attributes of the unique digital token includes a data structure that represents the physical attributes of the consumer product.

In embodiments, the set of digital attributes of the unique digital token includes a data structure that supports a visual representation of the consumer product.

In embodiments, the set of digital attributes of the unique digital token includes an image of the consumer product.

In embodiments, the set of digital attributes of the unique digital token includes a data structure that represents an animation of the consumer product.

In embodiments, the consumer product is already in existence.

In embodiments, the unique digital token is redeemable for fulfillment of the unit of the consumer product.

In embodiments, the consumer product has a defined type and a defined set of characteristics but is not yet in existence.

In embodiments, the unique digital token is redeemable for fulfillment of creation and delivery of the unit of the consumer product.

According to some embodiments of the present disclosure, a system for generating a digital token that uniquely represents a unique unit of a digital product includes an interface configured to handle a unique identifier for a unique unit of a digital product, a cryptographic token generation system that generates a unique digital token that has a set of token attributes that correspond to the set of digital-product attributes, wherein the unique digital token is cryptographically secure, and a linking system configured to generate a one-to-at-least-one link between the unique digital token generated by the cryptographic token generation system and the unique identifier for the unique unit of the digital product, such that the unique digital token provides a unique digital representation of the unique unit of the digital product. The digital product has a set of attributes.

In embodiments, the set of digital-product attributes includes a set of origination attributes.

In embodiments, the set of origination attributes includes limited edition attributes.

In embodiments, the set of origination attributes includes creator attributes.

In embodiments, the set of origination attributes includes certification of originality attributes.

In embodiments, the set of origination attributes includes location of origin attributes.

In embodiments, the set of digital attributes of the unique digital token includes a data structure that represents the attributes of the digital product.

In embodiments, the set of digital attributes of the unique digital token includes a data structure that supports a visual representation of the digital product.

In embodiments, the set of digital attributes of the unique digital token includes an image of the digital product.

In embodiments, the set of digital attributes of the unique digital token includes a data structure that represents an animation of the digital product.

In embodiments, the digital product is already in existence.

In embodiments, the unique digital token is redeemable for fulfillment of the unit of the digital product.

In embodiments, the digital product has a defined type and a defined set of characteristics but is not yet in existence.

In embodiments, the unique digital token is redeemable for fulfillment of creation and delivery of the unit of the digital product.

According to some embodiments of the present disclosure, a system for generating a digital token that uniquely represents a unique unit of a gift card, includes an interface configured to handle a unique identifier for a unique unit of a gift card, a cryptographic token generation system that generates a unique digital token that has a set of token attributes that correspond to the set of gift card attributes, wherein the unique digital token is cryptographically secure, and a linking system configured to generate a cryptographically secure, one-to-at-least-one link between the unique digital token generated by the cryptographic token generation system and the unique identifier for the unique unit of the gift card, such that the cryptographically secure digital token provides a unique digital representation of the unique unit of the gift card. The gift card has a set of gift-card attributes.

In embodiments, the set of gift-card attributes includes a merchant with which the gift card is redeemable.

In embodiments, the set of gift-card attributes includes a redeemable value.

In embodiments, the unique digital token represents the right to redeem the gift card and is transferable.

In embodiments, the transfer of the unique digital token is executable by sending the unique digital token in a chat interface.

In embodiments, the transfer of the unique digital token is executable by sending the unique digital token in an email interface.

In embodiments, the set of digital attributes of the unique digital token includes a data structure that represents the gift-card attributes.

In embodiments, the set of digital attributes of the unique digital token includes a data structure that supports a visual representation of the gift card.

In embodiments, the set of digital attributes of the unique digital token includes an image of the gift card.

In embodiments, the gift card is already in existence.

In embodiments, the unique digital token is redeemable for fulfillment of the unit of the gift card.

In embodiments, the gift card has a defined type and a defined set of characteristics but is not yet in existence.

In embodiments, the unique digital token is redeemable for fulfillment of creation and delivery of the unit of the gift card.

According to some embodiments of the present disclosure, a method includes receiving, by a processing system of a tokenization platform, a notification of a transfer of funds to a user account of a user, the funds is in a first currency and the tokenization platform facilitating trade in a second currency defined in accordance with a protocol, receiving, by the processing system of the tokenization platform, request to generate a tokenized token representing a portion of the funds, generating, by the processing system, the tokenized token that represents the portion of the funds, initiating, by the processing system, a hold of the portion of the funds, wherein the portion of the funds are inaccessible to an owner of the tokenized token until the tokenized token is redeemed by the owner of the tokenized token, and updating, by the processing system, a ledger to indicate that the tokenized token is owned by the user. The tokenized token is defined in accordance with the protocol.

In embodiments, the visual indicia depict an amount of currency corresponding to the portion of the funds.

In embodiments, the funds are in a traditional currency and transferred to the account of the user via a credit card or bank transfer.

In embodiments, the funds are in a cryptocurrency and transferred in from an external cryptocurrency account of the user.

In embodiments, the initiating the hold of the portion of the funds includes transferring the portion of the funds from the account of the user into an escrow account.

In embodiments, the portion of the funds remain in the escrow account until the tokenized token is redeemed by the owner of the tokenized token.

In embodiments, in response to the tokenized token is redeemed. The tokenized token is invalidated.

In embodiments, the ledger is a distributed ledger.

In embodiments, the second digital token is redeemable for a defined quantity of the first digital token.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

According to some embodiments of the present disclosure, a system for tokenizing a token, includes an interface configured to handle a unique identifier for a first digital token, wherein the first digital token is associated with a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and an exchange system for exchange of the second digital token via integration with a messaging system, wherein upon a user sending a message includes an embedded media content of the second digital token that represents the defined quantity of the cryptocurrency to a recipient, the system automatically transfers the defined amount of the cryptocurrency from an account of the user to an account of the recipient of the message.

In embodiments, the second digital token is redeemable for a defined quantity of the first digital token.

In embodiments, the first digital token is a fungible token.

In embodiments, the first digital token is a non-fungible token.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system is integrated with a digital wallet such that the digital wallet is updated upon exchange of the second digital token without requiring the user to interact with a user interface of the digital wallet.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

According to some embodiments of the present disclosure, a system for tokenizing a token, includes an interface configured to handle a unique identifier for a first digital token, wherein the first digital token is associated with a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a digital wallet-less system that automatically enables the exchange of the cryptocurrency from a first account of a first user to a second account of a second user upon transfer of the second digital token from the first account to the second account.

In embodiments, the second digital token is redeemable for a defined quantity of the first digital token.

In embodiments, the digital wallet-less system enables the exchange of the cryptocurrency upon parsing of a coded message.

In embodiments, the digital wallet-less system enables the exchange of the cryptocurrency upon recognition of a movement of the second digital token in a user interface.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

In embodiments, the digital wallet-less system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with a user interface of the digital wallet.

In embodiments, the first account is associated with a first cryptographic key. The second account is associated with a second cryptographic key. the second cryptographic key is different from the first cryptographic key, and the digital wallet-less system exchanges the cryptocurrency using a set of workflows that omits interaction of both the first user and the second user with a cryptographic key.

According to some embodiments of the present disclosure, a system for tokenizing a token, includes an interface configured to handle a unique identifier for a first digital token, wherein the first digital token is associated with a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a transfer system that enables transfer of the defined quantity of the cryptocurrency embodied by the first digital token in the amount represented by the second digital token among user accounts using a set of workflows that omits interaction of users with a cryptographic key.

In embodiments, the second digital token is redeemable for a defined quantity of the first digital token.

In embodiments, the transfer system enables transfer upon parsing of a coded message.

In embodiments, the transfer system enables transfer upon recognition of a movement of the second digital token in a user interface.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

In embodiments, the transfer system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

According to some embodiments of the present disclosure, a system for tokenizing a token, includes an interface configured to handle a unique identifier for a first digital token, wherein the first digital token is a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a transfer system that enables an exchange of control of a quantity of the first digital token using a workflow that omits interaction by users with a cryptography system.

In embodiments, the second digital token is redeemable for a defined quantity of the first digital token.

In embodiments, the transfer system executes an exchange upon parsing of a code in a message from a party that controls the second digital token.

In embodiments, the exchange system executes an exchange upon recognition of a movement of the second digital token in a user interface.

In embodiments, the exchange of control results in transfer of ownership.

In embodiments, the exchange of control results in movement of a record of the second digital token from one account to another account.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

In embodiments, the transfer system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the transfer system executes the exchange upon parsing of a code in a message from a party that controls the second digital token.

In embodiments, the system executes the exchange upon recognition of a movement of the second digital token in a user interface.

According to some embodiments of the present disclosure, a method for facilitating a transaction of an item, includes receiving one or more item attributes of the item via a first graphical user interface of a tokenization platform, the item attributes includes a number of instances of the item that are available for transaction by a merchant of the item, generating a virtual representation of the item based on the item attributes, wherein the virtual representation is a data structure that stores the item attributes, and generating N digital tokens based on the virtual representation, wherein N is an integer equal to the number of items available for transaction and wherein each digital token is redeemable by an owner of the respective digital token to satisfy the transaction for an instance of the item.

In embodiments, the N digital tokens include non-fungible tokens.

In embodiments, the N digital tokens include fungible tokens.

In embodiments, the N digital tokens are transferrable to other users.

In embodiments, the item is one of a digital good, a physical good, a digital service, a physical service, a digital experience, or a digital experience.

In embodiments, a transaction for an instance of an item is at least one of a sale of the instance of the item, a lease of the instance of the item, a gifting of the instance of the item, and a giveaway of the instance of the item.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the ledger is a distributed ledger.

According to some embodiments of the present disclosure, a method for facilitating transactions via a tokenization platform includes maintaining a ledger, providing a digital marketplace, receiving a request to participate in a transaction for an instance of an item represented by a virtual representation of the plurality of virtual representations from a user device of a transacting user, in response to verifying the request to participate in the transaction, associating a specific token corresponding to the virtual representation with an account of the transacting user, receiving a transfer request to transfer the specific token to a different user, wherein the transfer request includes a digital-token identifier that identifies the specific token and a public address of the different user, validating the specific token based on the digital-token identifier and the ledger, verifying that the different user has a valid account on the tokenization platform based on the public address of the user and the ledger, in response to validating the specific token and verifying the different user, updating the ledger with a block that includes ownership data that indicates that the specific token corresponding to the virtual representation is owned by the different user, receiving a redemption request to redeem the digital token from a user device of the different user, and in response to receiving the redemption request, executing a workflow to satisfy the transaction for the instance of the item corresponding to the token. The ledger stores a plurality of public addresses, wherein each respective public address corresponds to a respective account of a respective user of the tokenization platform, a plurality of virtual representations of a plurality of respective items, for each virtual representation, a set of tokens that respectively correspond to a respective instance of the item represented by the virtual representation, and ownership data of each respective token. The digital marketplace provides a second graphical user interface that allows consumers to view visualizations of virtual representations of items includes the virtual representation of the item and to transact for an instance of the item by purchasing a digital token of the set of tokens.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the ledger is a distributed ledger.

According to some embodiments of the present disclosure, a method includes displaying a digital wallet graphical user interface via a user device of a user associated with the digital wallet, displaying, by the digital wallet graphical user interface, an inventory of tokens that are owned by the user, wherein each token corresponds to a respective item and wherein each token is redeemable by the user to satisfy a transaction for an instance of the respective item, receiving, by the digital wallet graphical user interface, an instruction to transfer a digital token from the inventory of tokens to a recipient, displaying, by the digital wallet graphical user interface, a digital keyboard, wherein the digital keyboard includes a selectable media content that is representative of the respective item that corresponds to the digital token to be transferred, receiving, by the digital keyboard, a text-based message includes a selection of the selectable media content, embedding, by the digital keyboard, a digital-token identifier of the digital token in the text-based message, wherein the digital token is embedded in the selectable media content, and transmitting, by the digital wallet, the text-based message has the digital-token identifier embedded therein to a message account of the recipient, wherein the recipient can select the selectable media content to accept to the digital token into a respective digital wallet of the recipient.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the selectable media content is an emoji has the digital token associated therewith.

In embodiments, the digital token is embedded in the emoji.

In embodiments, the selectable media content includes a deep link where a recipient of the selectable media content can select the selectable media content to accept the digital token.

In embodiments, the selectable media content is one of an image, a .gif, or a video.

In embodiments, the text-based message has the digital-token identifier embedded therein is transferrable from the message account of the recipient to a second messaging account of a second recipient without the first recipient redeeming the digital token, wherein the second recipient can select the selectable media content to accept to the digital token into a respective digital wallet of the second recipient.

According to some embodiments of the present disclosure, a system for tokenizing a token, includes an interface configured to handle a unique identifier for a respective one of a set of first digital tokens, wherein each first digital token is associated with a respective cryptocurrency, a cryptographic token generation system that generates a set of second digital tokens corresponding to respective first digital tokens within the set of first digital tokens, wherein each second digital token represents a defined quantity of the cryptocurrency represented by the first digital token, wherein the second digital token is unique and cryptographically secure, a linking system that generates a one-to-at-least-one link between each second digital token generated by the cryptographic token generation system and the respective first digital token, such that the second digital token provides a unique digital tokenization of the first digital token, wherein the one-to-at-least-one link is cryptographically secure, and a user interface that enables a workflow for transfer of a plurality of second digital tokens within the set of second digital tokens, each of the plurality of second digital tokens representing a respective cryptocurrency type.

In embodiments, each second digital token is redeemable for the respective defined quantity of the respective first digital token.

In embodiments, each first digital token is a fungible token.

In embodiments, each first digital token is a non-fungible token.

In embodiments, the set of first digital tokens includes fungible tokens and non-fungible tokens.

In embodiments, each first digital token is a respective cryptocurrency coin.

In embodiments, each first digital token is a respective digital ticket to a respective event.

In embodiments, each first digital token is a respective gift card.

In embodiments, each first digital token is a respective gift certificate.

In embodiments, each first digital token is a respective digital representation of a security.

In embodiments, each first digital token is a respective access token to a secure location.

In embodiments, the linking system uses a blockchain.

In embodiments, ownership of the tokenized token is recorded in an ownership record system.

In embodiments, the ownership record system uses a distributed ledger.

In embodiments, the second digital token is exchangeable among accounts via a user interface of the system.

In embodiments, the user interface is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the user interface initiates the transfer of the plurality of second digital tokens upon parsing of a code in a message from a party that controls the set of second digital tokens.

In embodiments, the user interface initiates the transfer of the plurality of second digital tokens upon recognition of a movement of the second digital token in a user interface.

According to some embodiments of the present disclosure, a system for tokenizing a token, includes an interface configured to handle a unique identifier for a first digital token, wherein the first digital token is a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a messaging system integrating the handling of cryptocurrency exchanges into a messaging protocol, wherein the messaging system automatically executes exchange of the cryptocurrency upon sending of a message incorporating the second digital token therein.

In embodiments, the second digital token is redeemable for a defined quantity of the first digital token.

In embodiments, the first digital token is a cryptocurrency coin.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

In embodiments, the messaging system provides a signal to a digital wallet such that the digital wallet is updated upon exchange of the second digital token without requiring the user to interact with the user interface of the digital wallet.

In embodiments, the messaging system initiates the exchange upon parsing of a code in a message from a party that controls the second digital token.

In embodiments, the messaging system initiates an exchange upon recognition of a movement of the second digital token in a user interface.

In embodiments, the messaging protocol is a short message service protocol.

According to some embodiments of the present disclosure, a system for tokenizing a token, includes an interface configured to handle a unique identifier for a first digital token, wherein the first digital token is a cryptocurrency, a cryptographic token generation system that generates a second digital token that represents a defined quantity of the cryptocurrency represented by the first digital token, wherein the second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and an email system integrating the handling of cryptocurrency exchanges into an email protocol, wherein the email system automatically executes the exchange upon incorporation of the second digital token representing the defined quantity of the cryptocurrency into an email message.

In embodiments, the second digital token is redeemable for a defined quantity of the first digital token.

In embodiments, the first digital token is a cryptocurrency coin.

In embodiments, the linking system uses a blockchain.

In embodiments, ownership of the second digital token is recorded in an ownership record system.

In embodiments, the ownership record system uses a distributed ledger.

In embodiments, the second digital token is exchangeable among accounts via a user interface of the system.

In embodiments, the email system provides a signal to a digital wallet such that the digital wallet is updated upon exchange of the second digital token without requiring the user to interact with the user interface of the digital wallet.

In embodiments, the email system initiates the exchange upon parsing of a code in a message from a party that controls the second digital token.

In embodiments, the email system initiates an exchange upon recognition of a movement of the second digital token in a user interface.

According to some embodiments of the present disclosure, a system for tokenizing a token, includes an interface configured to handle a unique identifier for a first digital token, wherein the first digital token is cryptographically secure, a cryptographic token generation system that generates a second digital token includes the first digital token within a secure cryptographic wrapper, wherein the second digital token is unique and cryptographically secure, and a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure.

In embodiments, the second digital token is redeemable for a defined quantity of the first digital token.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the tokenized token is recorded in an ownership record system.

In embodiments, the ownership record system uses a distributed ledger.

In embodiments, the second digital token is exchangeable among accounts via a user interface of the system.

In embodiments, the system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the system executes an exchange of the second digital token upon parsing of a code in a message from a party that controls the second digital token.

In embodiments, the system executes an exchange of the second digital token upon recognition of a movement of the second digital token in a user interface.

According to some embodiments of the present disclosure, a system for tokenizing a token, includes an interface configured to handle a unique identifier for a first digital token, a cryptographic token generation system that generates a second digital token that is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a rule system configured to manage and apply a set of rules to the second digital token, wherein the set of rules includes a lock rule that restricts one or more transaction actions involving the second digital token and an unlock rule that removes the restriction of the one or more transaction actions involving the second digital token.

In embodiments, the lock rule and the unlock rule are configurable by a host of the system configured to tokenize a token.

In embodiments, the lock rule and the unlock rule are configurable by a user of the system configured to tokenize a token in a user interface of the system.

In embodiments, the lock rule and the unlock rule are automatically configured to enable compatibility with a set of exchange rules governing the first digital token.

In embodiments, the second digital token is redeemable for a defined quantity of the first digital token.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the second token is recorded in an ownership record system.

In embodiments, the ownership record system uses a distributed ledger.

In embodiments, the second digital token is exchangeable among accounts via a user interface of the system.

In embodiments, the system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the system executes an exchange of tokens upon parsing of a code in a message from a party that controls the second digital token.

In embodiments, the system executes an exchange of tokens upon recognition of a movement of the second digital token in a user interface.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the cryptographically secure token generated by the cryptographic token generation system and the unique identifier for the unique unit of the item, such that the cryptographically secure digital token provides a unique digital representation of the unique unit of the item, and a secure data storage system configured to store the unique identifier of the item, the cryptographically secure one-to-at-least-one link, and an identifier of an owner of the digital token.

In embodiments, the data storage system uses a blockchain.

In embodiments, the data storage system stores a ledger that provides a record of ownership of the digital token.

In embodiments, upon transfer of the digital token. The ledger is updated to reflect the change of ownership of the digital token.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the token is redeemable for the right to possess the item.

In embodiments, possession of the token represents ownership of the item.

In embodiments, the token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the token include a data structure that represents the physical attributes of the item.

In embodiments, the digital attributes of the token include a data structure that supports a visual representation of the item.

In embodiments, the digital attributes of the token include an image of the item.

In embodiments, the digital attributes of the token include a data structure that represents an animation of the item.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and an ownership record system that provides transfer of ownership of the unique digital token and provides a secure system of record of ownership of a set of digital tokens that each uniquely tokenize a respective item. The set of digital tokens includes the unique digital token. The item has a set of item attributes.

In embodiments, the ownership record system uses a blockchain.

In embodiments, the ownership record system uses a ledger.

In embodiments, the ownership record systems uses a distributed ledger.

In embodiments, upon transfer of the unique digital token within a coded message in a messaging environment. The ownership of the unique digital token is automatically transferred in the ownership record system.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the item attributes include a set of origination attributes.

In embodiments, the origination attributes include limited edition attributes.

In embodiments, the origination attributes include celebrity signature attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and a messaging system configured to integrate handling of a set of digital tokens into a short messaging service, whereby exchange of the unique digital token is automatically executed upon sending a short message service message that incorporates the unique digital token therein. The item has a set of item attributes.

In embodiments, the messaging system configured to parse a set of short message service messages for a set of codes that represent instructions to process a set of actions with respect to the set of digital tokens identified in the short message service messages.

In embodiments, a code provides an instruction to exchange the unique digital token with a recipient of the short message service message.

In embodiments, a code provides an instruction to transfer ownership of the unique digital token to a recipient of the short message service message.

In embodiments, a code provides an instruction to gift the unique digital token to a recipient of the short message service message.

In embodiments, a code provides an instruction to redeem unique digital token for the item.

In embodiments, a code provides an instruction to move the unique digital token to a different account of the sender of the short message service message.

In embodiments, a code provides an instruction to move the unique digital token to a digital wallet of the recipient of the short message service message.

In embodiments, a code provides an instruction to move the unique digital token to a digital wallet of the sender of the short message service message.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes. In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the cryptographically secure digital token provides a unique digital representation of the unique unit of the item, and an email system configured to integrate handling of a set of digital tokens into email messages, whereby exchange of the unique digital token is automatically executed upon sending an email message that incorporates the unique digital token therein. The item has a set of item attributes.

In embodiments, the email system configured to parse a set of email messages for a set of codes that represent instructions to process a set of actions with respect to the set of digital tokens identified in the email messages.

In embodiments, a code provides an instruction to exchange the unique digital token with a recipient of the email message.

In embodiments, a code provides an instruction to transfer ownership of the unique digital token to a recipient of the email message.

In embodiments, a code provides an instruction to gift the unique digital token to a recipient of the email message.

In embodiments, a code provides an instruction to redeem the unique digital token for the item.

In embodiments, a code provides an instruction to move the unique digital token to a different account of the sender of the email message.

In embodiments, a code provides an instruction to move the unique digital token to a digital wallet of the recipient of the email message.

In embodiments, a code provides an instruction to move the unique digital token to a digital wallet of the sender of the email message.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

In embodiments, the item is a consumer product.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token provides a unique digital representation of the unique unit of the item, and a system configured to enable gifting of the digital token that uniquely tokenizes an item, wherein upon recognition of a gift instruction, the system records the gift in a secure system of record of ownership. The item has a set of item attributes.

In embodiments, the ownership record system uses a blockchain.

In embodiments, the ownership record system uses a ledger.

In embodiments, the ownership record systems uses a distributed ledger.

In embodiments, upon transfer of the digital token within a coded message in a messaging environment that indicates intent to gift the digital token, the ownership of the digital token is automatically transferred in the ownership record system to the recipient of the gift.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the token is redeemable for the right to possess the item.

In embodiments, possession of the token represents ownership of the item.

In embodiments, the token is transferable.

In embodiments, the attributes of the item include a set of physical attributes.

In embodiments, the attributes of the item include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the token include a data structure that represents the physical attributes of the item.

In embodiments, the digital attributes of the token include a data structure that supports a visual representation of the item.

In embodiments, the digital attributes of the token include an image of the item.

In embodiments, the digital attributes of the token include a data structure that represents an animation of the item.

According to some embodiments of the present disclosure, a system for handling a set of secure digital tokens, each of which uniquely represents a respective item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and a system configured to process a redemption instruction for unique digital token that uniquely tokenizes an item, wherein upon receipt of a redemption instruction the system automatically initiates a process for delivery of an item to a party redeeming unique digital token that uniquely tokenizes the item. The item has a set of item attributes.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

According to some embodiments of the present disclosure, a method includes receiving, by a processing system, a request to tokenize an item, receiving, by the processing system, one or more photographs of the item, receiving, by the processing system, item information corresponding to the item includes a description of the item, generating, by the processing system, a virtual representation of the item based on the one or more photographs and the item information, requesting, by the processing system, an authentication of the item via a portal that is accessible by subject-matter authentication experts, wherein the portal displays the virtual representation of the item in the portal, receiving, by the processing system, an authentication report from a subject-matter authentication expert includes an opinion indicating whether the subject-matter authentication expert deemed the item authentic or not-authentic and one or more reasons for the opinion, and in response to an opinion indicating that the item is deemed authentic, generating a digital token based on a virtual representation of the item and assigning an ownership of the token to an owner of the item.

In embodiments, the request to tokenize the item is received in connection with a request to collateralize the item.

In embodiments, the request to authenticate an item is requested via the portal in response to the machine-learned prediction model is unable to predict that the item is likely not authentic.

In embodiments, the authentication report further includes an appraisal value by the subject-matter authentication expert.

In embodiments, transfer of the token is restricted until the loan is paid or in default.

In embodiments, the smart contract defines whether the loan is transferable to another lender and, if the smart contract allows transfers of the loan. The smart contract further includes one or more conditions that when met. cause the smart contract to initiate a transfer of the loan to the other lender.

In embodiments, the smart contract updates a ledger to indicate a change in an ownership interest with respect to the token in response to the one or more conditions is met.

According to some embodiments of the present disclosure, a system for tracking a set of secure digital tokens, each of which uniquely represents an item, includes an interface configured to handle a set of unique identifiers, each of the set of unique identifiers corresponding to a unique unit of an item, a cryptographic token generation system that generates a set of unique digital tokens, each of the set of unique digital tokens includes a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and an escrow system configured to handle the items that are represented by the set of unique digital tokens pending redemption of a respective one or more unique digital tokens from the set of unique digital tokens.

In embodiments, the escrow system uses a blockchain to record ownership of the items represented by the set of unique digital tokens.

In embodiments, the escrow system uses a distributed ledger to provide a record of ownership of the unique digital tokens.

In embodiments, the control of the unique digital token represents the right to receive the item from escrow.

In embodiments, the escrow system provides physical security for the item pending occurrence of an escrow release condition.

In embodiments, the unique digital token is redeemable for the release of the item from escrow.

In embodiments, the unique digital token provides an authentication mechanism for an access control system that permits physical release of the item from escrow.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the attributes of the item include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

According to some embodiments of the present disclosure, a system for handling a set of secure digital tokens, each of which uniquely represents an item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and a collateral-validation system configured to validate the set of item attributes, each item attribute of the set of item attributes is uniquely represented by one or more digital attributes of the set of digital attributes of the unique digital token. The item has a set of item attributes.

In embodiments, the collateral-validation system includes an interface by which an expert evaluator characterizes a set of the item attributes.

In embodiments, the collateral-validation system includes a location system that validates a physical location of the item.

In embodiments, the location system validates that the item is located in a secured location controlled by a host of the system.

In embodiments, the validation system includes a set of sensors configured to detect a set of attributes of the item.

In embodiments, the validation system includes an image capture system configured to capture a set of attributes of the item.

In embodiments, the item is a consumer product.

In embodiments, the item is a unique instance of a digital item.

In embodiments, the item is a gift card.

In embodiments, the item is already in existence

In embodiments, the item has a defined type and a defined set of characteristics but is not yet in existence.

In embodiments, the unique digital token is redeemable for the right to possess the item.

In embodiments, possession of the unique digital token represents ownership of the item.

In embodiments, the unique digital token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

According to some embodiments of the present disclosure, a system for handling a set of secure digital tokens, each of which uniquely represents an item, includes an interface configured to handle a unique identifier for a unique unit of an item, a cryptographic token generation system that generates a unique digital token that has a set of digital attributes that correspond to the set of item attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the item, such that the unique digital token provides a unique digital representation of the unique unit of the item, and a user interface enabling a set of workflows configured to purchase the unique digital token. The item has a set of item attributes.

In embodiments, the set of workflows includes a workflow configured to search for a category of unique digital token.

In embodiments, the set of workflows includes a workflow configured to set a price for the unique digital token.

In embodiments, the set of workflows includes a workflow configured to bid for the unique digital token.

In embodiments, the set of workflows includes a workflow configured to solicit a bid for the unique digital token.

In embodiments, the set of workflows includes a workflow configured to advertise the attributes of the unique digital token.

In embodiments, the set of workflows includes a workflow configured to view an image of the item.

In embodiments, the item is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for the right to possess the real-world object.

In embodiments, possession of the unique digital token represents ownership of the real-world object.

In embodiments, the unique digital token is transferable.

In embodiments, the item attributes include a set of physical attributes.

In embodiments, the item attributes include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the item.

In embodiments, the digital attributes of the unique digital token include a data structure that supports a visual representation of the item.

In embodiments, the digital attributes of the unique digital token include an image of the item.

In embodiments, the digital attributes of the unique digital token include a data structure that represents an animation of the item.

According to some embodiments of the present disclosure, a system for handling a set of secure digital tokens, each of which uniquely represents a real-world object, includes an interface configured to handle a unique identifier for a unique unit of a real-world object, a cryptographic token generation system that generates a unique digital token that has a set of digital attributes that correspond to the set of real-world object attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the real-world object, such that the unique digital token provides a unique digital representation of the unique unit of the real-world object, and a user interface enabling a set of workflows configured to exchange unique digital token that uniquely tokenizes a real-world object. The object has a set of real-world object attributes.

In embodiments, the user interface includes a set of elements configured to identify a party to an exchange.

In embodiments, the user interface includes a set of elements configured to set a value for an exchange.

In embodiments, the user interface includes a set of elements configured to initiate an exchange and upon such initiation the system records a change of ownership in an ownership record system for the unique digital token.

In embodiments, the real-world object is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for the right to possess the real-world object.

In embodiments, possession of the unique digital token represents ownership of the real-world object.

In embodiments, the unique digital token is transferable.

In embodiments, the attributes of the real-world object include a set of physical attributes.

In embodiments, the attributes of the real-world object include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the real-world object.

In embodiments, the digital attributes of the unique digital token include a data structure that supports a visual representation of the real-world object.

In embodiments, the digital attributes of the unique digital token include an image of the real-world object.

In embodiments, the digital attributes of the unique digital token include a data structure that represents an animation of the real-world object.

In embodiments, the digital attributes of the token include a data structure that represents a media content depicting the real-world object According to some embodiments of the present disclosure, a system for handling a set of secure digital tokens, each of which uniquely represents a real-world object, includes an interface configured to handle a unique identifier for a unique unit of a real-world object a cryptographic token generation system that generates a unique digital token that has a set of digital attributes that correspond to the set of real-world object attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the real-world object, such that the unique digital token provides a unique digital representation of the unique unit of the real-world object, and a user interface enabling a set of workflows configured to gift unique digital token that uniquely tokenizes the item.

In embodiments, the user interface includes a set of elements configured to identify a recipient of a gift.

In embodiments, the user interface includes a set of elements configured to set a value for the gift.

In embodiments, the user interface includes a set of elements configured to search for a category of unique digital token that can be provided as a gift.

In embodiments, the user interface includes a set of elements configured to configure a type and quantity of unique digital token that can be gifted.

In embodiments, the user interface includes a set of elements configured to initiate a gift and upon such initiation the system records a change of ownership in an ownership record system for the unique digital token.

In embodiments, the real-world object is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for the right to possess the real-world object.

In embodiments, possession of the unique digital token represents ownership of the real-world object.

In embodiments, the unique digital token is transferable.

In embodiments, the attributes of the real-world object include a set of physical attributes.

In embodiments, the attributes of the real-world object include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the real-world object.

In embodiments, the digital attributes of the unique digital token include a data structure that supports a visual representation of the real-world object.

In embodiments, the digital attributes of the unique digital token include an image of the real-world object.

In embodiments, the digital attributes of the unique digital token include a data structure that represents an animation of the real-world object.

According to some embodiments of the present disclosure, a system for handling a set of secure digital tokens, each of which uniquely represents a real-world object, includes an interface configured to handle a unique identifier for a unique unit of a real-world object a cryptographic token generation system that generates a unique digital token that has a set of digital attributes that correspond to the set of real-world object attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the real-world object, such that the unique digital token provides a unique digital representation of the unique unit of the real-world object, and a user interface enabling a set of workflows configured to redeem the unique digital token for the real-world object.

In embodiments, the user interface includes a set of elements representing a set of digital tokens that are eligible for redemption. The set of digital tokens includes the unique digital token.

In embodiments, the user interface includes a set of elements representing attributes of the real-world objects that can be obtained upon redemption.

In embodiments, the user interface includes a set of elements configured to initiate redemption and wherein upon such initiation a workflow is triggered for delivery of the real-world object to the redeeming party.

In embodiments, the real-world object is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for the right to possess the real-world object.

In embodiments, possession of the unique digital token represents ownership of the real-world object.

In embodiments, the unique digital token is transferable.

In embodiments, the attributes of the real-world object include a set of physical attributes.

In embodiments, the attributes of the real-world object include a set of origination attributes.

In embodiments, the origination attributes include limited edition attributes.

In embodiments, the origination attributes include celebrity signature attributes.

In embodiments, the origination attributes include certification of originality attributes.

In embodiments, the origination attributes include location of origin attributes.

In embodiments, the origination attributes include certification of ethical production attributes.

In embodiments, the digital attributes of the unique digital token include a data structure that represents the physical attributes of the real-world object.

In embodiments, the digital attributes of the unique digital token include a data structure that supports a visual representation of the real-world object.

In embodiments, the digital attributes of the unique digital token include an image of the real-world object.

In embodiments, the digital attributes of the unique digital token include a data structure that represents an animation of the real-world object.

According to some embodiments of the present disclosure, a system for handling a set of secure digital tokens, each of which uniquely represents a real-world object, includes an interface configured to handle a unique identifier for a unique unit of a real-world object, a cryptographic token generation system that generates a unique digital token that has a set of digital attributes that correspond to the set of real-world object attributes, wherein the unique digital token is cryptographically secure, a cryptographic linking system configured to generate a cryptographically secure, one-to-at-least-one link between the unique digital token generated by the cryptographic token generation system and the unique identifier for the unique unit of the real-world object, such that the unique digital token provides a unique digital representation of the unique unit of the real-world object, and an analytics system configured to monitor, track, and report on a set of states, events, and activities of the unique digital token. The object has a set of real-world object attributes.

In embodiments, the analytics system reports on aggregated ownership attributes of a set of digital tokens includes the unique digital token.

In embodiments, the analytic system reports on price attributes of a set of digital tokens includes the unique digital token.

In embodiments, the analytics system reports on redemption activities with respect to a category of digital tokens includes the unique digital token.

In embodiments, the analytics system reports on gifting activities with respect to a category of digital tokens includes the unique digital token.

In embodiments, the analytics system reports on exchange activities with respect to a category of digital tokens includes the unique digital token.

In embodiments, the analytics system reports on search activities with respect to a category of digital tokens includes the unique digital token.

In embodiments, the analytics system reports on escrow activities with respect to a category of digital tokens includes the unique digital token.

In embodiments, the analytics system reports on financial performance with respect to a category of digital tokens includes the unique digital token.

In embodiments, the analytics system reports on financial performance with respect to a category of real-world objects.

In embodiments, the analytics system reports on activities with respect to a set of real-world objects.

In embodiments, the analytics system reports on physical attributes with respect to a category of real-world objects.

In embodiments, the real-world object is a consumer product.

In embodiments, the real-world object is a unique instance of a digital item.

In embodiments, the real-world object is a gift card.

In embodiments, the real-world object is already in existence

In embodiments, the real-world object has a defined type and a defined set of characteristics but is not yet in existence.

In embodiments, the unique digital token is redeemable for the right to possess the real-world object.

In embodiments, possession of the unique digital token represents ownership of the real-world object.

In embodiments, the unique digital token is transferable.

In embodiments, the attributes of the real-world object include a set of physical attributes.

In embodiments, the attributes of the real-world object include a set of origination attributes.

In embodiments, the origination attributes include limited edition attributes.

In embodiments, the origination attributes include celebrity signature attributes.

In embodiments, the origination attributes include certification of originality attributes. In embodiments, the origination attributes include location of origin attributes.

In embodiments, the origination attributes include certification of ethical production attributes.

In embodiments, the digital attributes of the unique digital token include a data structure that represents the physical attributes of the real-world object.

In embodiments, the digital attributes of the unique digital token include a data structure that supports a visual representation of the real-world object.

In embodiments, the digital attributes of the unique digital token include an image of the real-world object.

In embodiments, the digital attributes of the unique digital token include a data structure that represents an animation of the real-world object.

In embodiments, the digital attributes of the token include a data structure that represents a media content depicting the real-world object.

According to some embodiments of the present disclosure, a method for facilitating transactions via a tokenization platform includes maintaining a plurality of public addresses, a plurality of virtual representations of a plurality of respective items, a set of digital tokes for each virtual representation, and ownership data of each respective token, receiving a redemption request to redeem a digital token of the set of digital tokens from a user device of a user, in response to receiving the redemption request, verifying that the user is the owner of the digital token based on the plurality of public addresses, the set of tokens, and the redemption request, in response to verifying that the user is the owner of the digital token, requesting delivery details pertaining to the item from the user, receiving the delivery details from the user device of the user, and in response to receiving the delivery details from the user device, outputting the delivery details to a delivery system that facilitates delivery of the item. The digital token corresponding to an instance of an item to be redeemed.

In embodiments, requesting the delivery details pertaining to the item includes requesting a current location of the user.

In embodiments, the item is redeemed is one of a food item or a ride share.

In embodiments, the user device provides a geolocation of the user device.

In embodiments, the user device provides an address provided by the user.

In embodiments, the item is redeemed is a tangible good.

In embodiments, the delivery details include a current geolocation of the user device captured by the user device.

In embodiments, the delivery details include a current address of the user provided to the user device by the user via a graphical user interface of the user device.

In embodiments, the set of tokens corresponding to a virtual representation are transferrable to other users.

In embodiments, a transaction for an instance of an item is one of a sale of the instance of the item, a lease of the instance of the item, a gifting of the instance of the item, and a giveaway of the instance of the item.

In embodiments, the plurality of public addresses, the plurality of virtual representations, and the respective set of tokens corresponding to each of the plurality of virtual representations are maintained in a ledger.

In embodiments, the ledger is a distributed ledger.

In embodiments, the digital token is associated with the account of the user in the ledger.

According to some embodiments of the present disclosure, a method for facilitating transactions via a tokenization platform includes maintaining a plurality of public addresses, a plurality of virtual representations of a plurality of respective items, a set of digital tokes for each virtual representation, and ownership data of each respective token, receiving a redemption request to redeem a digital token of the set of tokens from a user device of a user, in response to receiving the redemption request, verifying that the user is the owner of the digital token based on the plurality of public addresses, the ownership data of the set of digital tokens, and the redemption request, in response to verifying that the user is the owner of the digital token, requesting fulfilment details pertaining to the item from the user, wherein the fulfilment details include information needed to satisfy the transaction for the item that were not provided at a time when the digital token was transacted for, receiving the fulfilment details from the user device of the user, and in response to receiving the fulfilment details from the user device, outputting the fulfilment details to a fulfilment system that satisfies transactions for items. The digital token corresponding to an instance of an item to be redeemed. Each respective public address corresponds to a respective account of a respective user of the tokenization platform. The set of digital tokens each respectively correspond to a respective instance of the item represented by the virtual representation.

In embodiments, the item is an article of clothing.

In embodiments, requesting the fulfilment details pertaining to the item includes requesting a size of the item.

In embodiments, requesting the fulfilment details pertaining to the item includes requesting a color of the item.

In embodiments, requesting the fulfilment details pertaining to the item includes requesting a delivery date of the item.

In embodiments, the set of tokens corresponding to a virtual representation are transferrable to other users.

In embodiments, a transaction for an instance of an item is one of a sale of the instance of the item, a lease of the instance of the item, a gifting of the instance of the item, and a giveaway of the instance of the item.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, the plurality of public addresses, the plurality of virtual representations, and the respective set of tokens corresponding to each of the plurality of virtual representations are maintained in a ledger.

In embodiments, the ledger is a distributed ledger.

In embodiments, the digital token is associated with the account of the user in the ledger.

According to some embodiments of the present disclosure, a method includes receiving, by a processing system, a request to securitize an asset of a user, receiving, by the processing system, one or more photographs of the asset, receiving, by the processing system, item information relating to the asset, receiving, by the processing system, a holding location of the asset, generating, by the processing system, a virtual representation of the asset based on the one or more photographs, the item information, and the hold location, generating, by the processing system, a digital token based on the virtual representation, assigning, by the processing system, ownership of the digital token to the user, receiving, by the processing system, an agreement to provide a service for the user by a provider using the asset as collateral, generating, by the processing system, an instance of a smart contract governing the service, the instance of the smart contract indicating an amount to be provided by the user to the provider and one or more conditions that cause ownership of the digital token to be transferred to the provider, and deploying, by the processing system, the instance of the smart contract. The item information includes a description of the asset and an appraisal value of the asset.

In embodiments, the smart contract initiates the transfer of the digital token to an account of the lender upon determining that the user failed to provide the amount.

In embodiments, the service is transferrable to another provider.

In embodiments, the item information includes a weight of the collateralization item.

In embodiments, the instance of the smart contract is deployed to a ledger.

In embodiments, the ledger is a distributed ledger.

In embodiments, the distributed ledger is a blockchain.

According to some embodiments of the present disclosure, a method includes receiving, by a processing system, a request to collateralize a collateralization item of a user seeking a loan, receiving, by the processing system, one or more photographs of the collateralization item, receiving, by the processing system, item information relating to the collateralization item, the item information includes a description of the collateralization item and an appraisal value of the collateralization item, receiving, by the processing system, a holding location of the collateralization item, generating, by the processing system, a virtual representation of the collateralization item based on the one or more photographs, the item information, and the hold location, generating, by the processing system, a digital token based on the virtual representation, assigning, by the processing system, ownership of the digital token to the user seeking the loan, receiving, by the processing system, an agreement to lend a defined amount of funds to the user by a lender using the collateralization item as collateral, generating, by the processing system, an instance of a smart contract governing the loan, the instance of the smart contract indicating an amount to be paid back by the user to the lender and one or more conditions that cause ownership of the digital token to be transferred to the lender, and deploying, by the processing system, the instance of the smart contract.

In embodiments, the smart contract initiates the transfer of the digital token to an account of the lender upon determining that the user is in default of the loan.

In embodiments, the loan is transferrable to another lender.

In embodiments, the item information includes a weight of the collateralization item.

In embodiments, the instance of the smart contract is deployed to a ledger.

In embodiments, the ledger is a distributed ledger.

According to some embodiments of the present disclosure, a method for facilitating transactions via a tokenization platform includes maintaining a plurality of public addresses, a plurality of virtual representations of a plurality of respective items, a set of digital tokes for each virtual representation, and ownership data of each respective token, rendering a virtual reality store environment, wherein the virtual reality store environment provides an interface that allows users to view virtual reality visualizations of available items that are available for transaction and to transact for instances of the available items, rendering a virtual reality visualization of an item represented by a virtual representation of the plurality of virtual representations based on the virtual reality content in in the virtual representation, wherein the virtual reality visualization of the item is presented in the virtual reality store environment, receiving a request to participate in a transaction for an instance of the item represented by the virtual reality representation of the item from a user device of a transacting user, wherein the request to participate in the transaction is received in response to the transacting user viewing the virtual reality representation of the item in the virtual reality store environment, and in response to verifying the request to participate in the transaction, associating a specific token corresponding to the virtual representation with an account of the transacting user. Each respective public address corresponds to a respective account of a respective user of the tokenization platform. The set of digital tokens each respectively correspond to a respective instance of the item represented by the virtual representation.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the plurality of public addresses, the plurality of virtual representations, and the respective set of tokens for each of the plurality of virtual representations are maintained in a distributed ledger.

In embodiments, the ledger is a distributed ledger.

In embodiments, the digital token is associated with the account of the user in the ledger.

According to some embodiments of the present disclosure, a method for facilitating transactions via a tokenization platform includes maintaining a ledger that includes a main chain of blocks and a first side chain of blocks, receiving a request to participate in a transaction for an instance of an item represented by a virtual representation of the plurality of virtual representations from a user device of a transacting user, and in response to verifying the request to participate in the transaction, updating ownership data of a specific token corresponding to the virtual representation in the first side chain of blocks to indicate that the transacting user owns the specific token. The blocks of the main chain collectively store information relating to a plurality of users, including item providers and consumers. The information relating to the plurality of users includes a plurality of public addresses, and each respective public address corresponds to a respective account of a respective user of the tokenization platform. The first side chain of blocks collectively stores a plurality of virtual representations of a plurality of respective items, a set of tokens that respectively correspond to a respective instance of the item represented by the virtual representation for each virtual representation, and ownership data of each respective token. Each virtual representation includes virtual reality content to render a virtual reality visualization of the respective item.

In embodiments, the ledger further includes a second side chain of blocks that collectively store one or more respective media contents relating to respective virtual representations of the plurality of virtual representations.

In embodiments, the one or more respective media contents include an image of a respective item represented by a respective virtual representation.

In embodiments, the one or more respective media contents include a video of a respective item represented by a respective virtual representation.

In embodiments, the one or more respective media contents include virtual reality content depicting a respective item represented by a respective virtual representation.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the ledger is a distributed ledger.

According to some embodiments of the present disclosure, a method for facilitating transactions via a tokenization platform includes maintaining a ledger that includes a main chain of blocks and a first side chain of blocks, receiving a transfer request to transfer the specific token from an owner of the specific token to a different user, wherein the transfer request includes a digital-token identifier that identifies the specific token and a public address of the different user, validating the specific token based on the digital-token identifier and the first chain of blocks, verifying that the different user has a valid account on the tokenization platform based on the public address of the user and the main chain of blocks, and in response to validating the specific token and verifying the different user, updating the second chain of blocks with a new block that includes ownership data that indicates that the specific token corresponding to the virtual representation is owned by the different user. The blocks of the main chain collectively store information relating to plurality of users, including item providers and consumers, wherein the information relating to the plurality of users includes a plurality of public addresses, and each respective public address corresponds to a respective account of a respective user of the tokenization platform. The blocks of the first side chain collectively store a plurality of virtual representations of a plurality of respective items, a set of tokens that respectively correspond to a respective instance of the item represented by the virtual representation for each virtual representation, and ownership data of each respective token. Each virtual representation includes virtual reality content to render a virtual reality visualization of the respective item.

In embodiments, the ledger further includes: a second side chain of blocks that collectively store one or more respective media contents relating to respective virtual representations of the plurality of virtual representations.

In embodiments, the one or more respective media contents include an image of a respective item represented by a respective virtual representation.

In embodiments, the one or more respective media contents include a video of a respective item represented by a respective virtual representation.

In embodiments, the one or more respective media contents include virtual reality content depicting a respective item represented by a respective virtual representation.

In embodiments, the set of tokens corresponding to a virtual representation includes non-fungible tokens.

In embodiments, the set of tokens corresponding to a virtual representation includes fungible tokens.

In embodiments, the set of tokens corresponding to a virtual representation are transferrable to other users.

In embodiments, the item is one of a digital good, a physical good, a digital service, a physical service, a digital experience, or a digital experience.

In embodiments, a transaction for an instance of an item is one of a sale of the instance of the item, a lease of the instance of the item, a gifting of the instance of the item, and a giveaway of the instance of the item.

In embodiments, the ledger is a distributed ledger.

According to some embodiments of the present disclosure, a method includes generating, by a processing system of a tokenization platform, a referral code corresponding to a user of the tokenization platform, generating, by the processing system, an instance of a smart contract corresponding to the user of the tokenization platform, the instance of the smart contract indicating an incentive to be provided to the user when the user successfully refers the tokenization platform, deploying, by the processing system, the instance of the smart contract, receiving, by the processing system, a request to create a new account from a new user, creating, by the processing system, the new account for the new user, and providing, by the processing system, a notification of the new account to the instance of the smart contract corresponding to the user, wherein the instance of the smart contract facilitates the transfer of a token representing the incentive in response to the notification. The request includes the referral code of the user.

In embodiments, the incentive is a monetary incentive represented by the token.

In embodiments, an amount of monetary incentive is selected based on a social media reach of the user.

In embodiments, the incentive is an item represented by the token.

In embodiments, the instance of the smart contract is deployed to a ledger.

In embodiments, the ledger is a distributed ledger.

According to some embodiments of the present disclosure, a method includes receiving, by a processing system, a request to create a mystery box, receiving, by the processing system, a set of tokens to be included in the mystery box, each token in the set of tokens representing a respective item and has a probability assigned thereto, generating, by the processing system. generating, by the processing system, an instance of a smart contract associated with the mystery box that governs the transfer of tokens from the set of tokens in support of the mystery box, and deploying, by the processing system, the instance of the smart contract. The probability indicates a probability of winning the respective item. The mystery box is based on the set of tokens and the probabilities assigned thereto. Each token in the set of tokens is assigned a range of values within an interval of values such that the range of values with respect to the interval of values is proportionate to the probability assigned to the token.

In embodiments, the request to play the mystery box is received from a gaming device in a brink-and-mortar location via an API.

In embodiments, the request to play the mystery box is received from a user device via a graphical user interface presented by the user device.

In embodiments, the set of tokens includes fungible tokens representing fungible items.

In embodiments, the set of tokens includes at least one non-fungible token, wherein each non-fungible token represents a non-fungible item.

In embodiments, the instance of the smart contract is deployed to a ledger.

In embodiments, the ledger is a distributed ledger.

According to some embodiments of the present disclosure, a method includes maintaining, by a processing system, an inventory of available tokens that are available for integration in a video game, wherein each token in the inventory of tokens represents a respective item, receiving, by the processing system, a token request for a digital token from an instance of the video game via an API, selecting, by the processing system, the digital token from the inventory of available tokens based on the token request, providing, by the processing system, an indicator of the digital token to the instance of the video game, receiving, by the processing system, a transaction request from the instance of the video game, the transaction request requesting a transfer of the digital token provided to the instance of the video game to an account of a user of the instance of the video game, and updating, by the processing system, a ledger to reflect that the user is the owner of the digital token.

In embodiments, the digital token request indicates a geolocation of the user device.

In embodiments, the digital token is selected based on the geolocation of the user device.

In embodiments, the item represented by the digital token may be used by the user in the video game.

In embodiments, the item represented by the digital token is a food item.

In embodiments, the ledger is a distributed ledger.

According to some embodiments of the present disclosure, a system for tokenizing a token, includes an interface configured to handle a unique identifier for each first digital token within a set of first digital tokens, a cryptographic token generation system that generates a set of second digital tokens, each second digital token is unique and cryptographically secure, a linking system configured to generate a one-to-at-least-one link between the second digital token generated by the cryptographic token generation system and the first digital token, such that the second digital token provides a unique digital tokenization of the first digital token, wherein the one-to-at-least-one link is cryptographically secure, and a trading system providing a set of tradeable derivatives of the set of the first digital tokens by enabling trading of the second digital tokens, where each of the set of second digital tokens represent a respective defined quantity of the first digital tokens.

In embodiments, each second digital token is redeemable for the respective defined quantity of the first digital tokens.

In embodiments, each second digital token represents a future right to redeem a defined quantity of the first digital tokens.

In embodiments, each second digital token represents a future right to purchase a defined quantity of the first digital tokens.

In embodiments, each second digital token represents a future right to sell a defined quantity of the first digital tokens.

In embodiments, each second digital token represents a future right to put a transfer of a defined quantity of the first digital tokens to a defined party.

In embodiments, each second digital token represents an option to purchase a defined quantity of the first digital tokens.

In embodiments, each second digital token represents an option to sell a defined quantity of the first digital tokens.

In embodiments, each second digital token represents a tradeable financial derivative of a set of attributes of the first digital tokens.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the tokenized token is recorded in an ownership record system.

In embodiments, the ownership record system uses a distributed ledger.

In embodiments, the second digital token is exchangeable among accounts via a user interface of the system.

In embodiments, the system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the system executes an exchange of respective second digital tokens upon parsing of a code in a message from a party that controls the set of second digital tokens.

In embodiments, the system executes an exchange of respective second digital tokens upon recognition of a movement of the respective second digital tokens in a user interface.

According to some embodiments of the present disclosure, a system for tokenizing a token, includes an interface configured to handle a unique identifier for a first digital token, wherein the first digital token associated with a cryptocurrency, a cryptographic token generation system that generates a second digital token that represents a defined quantity of the cryptocurrency represented by the first digital token, wherein the second digital token is unique and cryptographically secure and the second digital token uses a data object that represents a set of attributes, each attribute of the set of attributes has a defined range of parameters, and the data object provides a secure, digital, tradeable derivative of a cryptocurrency in an amount represented by the second digital token, and a linking system configured to generate a one-to-at-least-one link between the second digital token generated by the cryptographic token generation system and the first digital token, such that the second digital token provides a unique digital tokenization of the tradeable derivative of the first digital token.

In embodiments, the second digital token is redeemable for the defined quantity of the first digital token.

In embodiments, the second digital token represents a future right to redeem the defined quantity of the first digital token.

In embodiments, the second digital token represents a future right to purchase the defined quantity of the first digital token.

In embodiments, the second digital token represents a future right to sell the defined quantity of the first digital token.

In embodiments, the second digital token represents a future right to put a transfer of the defined quantity of the first digital token to a defined party.

In embodiments, the second digital token represents an option to purchase the defined quantity of the first digital token.

In embodiments, the second digital token represents an option to sell the defined quantity of the first digital token.

In embodiments, the second digital token represents a tradeable financial derivative of a set of attributes of first digital token.

In embodiments, the second digital token is redeemable for the defined quantity of the first digital token.

In embodiments, the first digital token is a fungible token.

In embodiments, the first digital token is a non-fungible token.

In embodiments, the first digital token is a cryptocurrency coin.

In embodiments, the first digital token is a digital ticket to an event.

In embodiments, the first digital token is a gift card.

In embodiments, the first digital token is a gift certificate.

In embodiments, the first digital token is a digital representation of a security.

In embodiments, the first digital token is an access token to a secure location.

In embodiments, the linking system uses a blockchain.

In embodiments, ownership of the tokenized token is recorded in an ownership record system.

In embodiments, the ownership record system uses a distributed ledger.

In embodiments, the second digital token is exchangeable among accounts via a user interface of the system.

In embodiments, the system is integrated with a messaging system.

In embodiments, the messaging system is a short message service.

In embodiments, the messaging system is a chat message system.

In embodiments, the messaging system is an email system.

In embodiments, the messaging system is integrated in a social networking site.

In embodiments, the messaging system provides a signal to a digital wallet such that the digital wallet is updated upon exchange of the second digital token without requiring the user to interact with the user interface of the digital wallet.

In embodiments, the system executes an exchange of the second digital token upon parsing of a code in a message from a party that controls the second digital token.

In embodiments, the system executes an exchange of the second digital token upon recognition of a movement of the second digital token in a user interface.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings.

DETAILED DESCRIPTION

Figure 1:
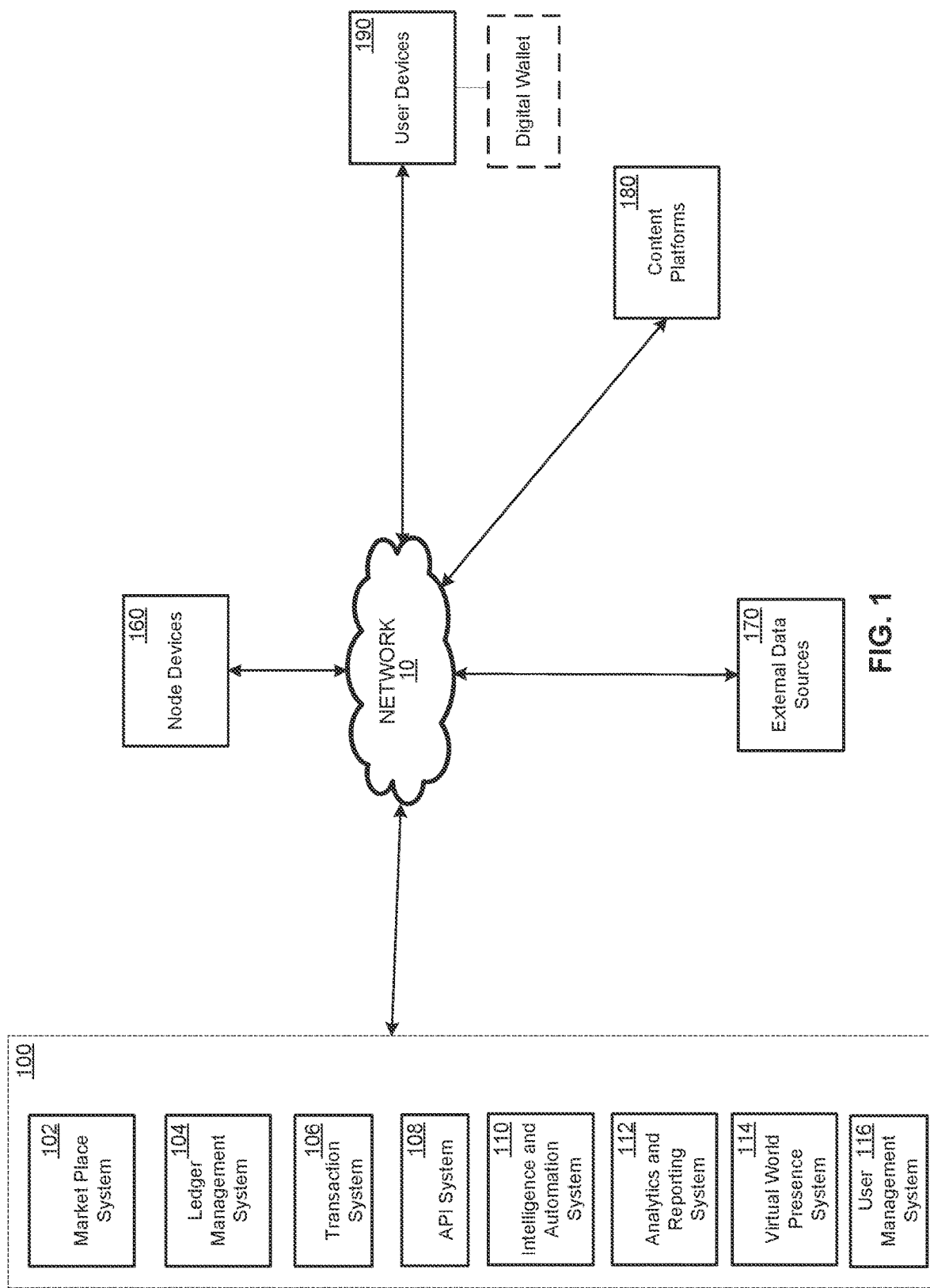
FIG. 1 is a schematic illustrating an example environment of a tokenization platform according to some embodiments of the present disclosure.

The present disclosure relates to a tokenization platform that enables the creation of virtual representations of merchandised items, such as goods, services, and/or experiences. As used herein the term "item" may refer to a digital asset (e.g., gift card, digital music file, digital video file, software, digital photograph, etc.), physical good, digital service (e.g., video streaming subscription), physical service (e.g., chauffer service, maid service, dry cleaning service), and/or purchased experience (e.g., hotel package, concert ticket, airlines ticket, etc.), or any combination thereof. It is noted that an item may refer to goods that already exist or that can be produced at a later time. For example, an item may be an unmade pizza or article of clothing. A purchaser of such an item may purchase the item, and the item may be produced at a time after the purchase. The term virtual item may refer to a virtual representation of a merchandised item. In creating a virtual representation to an item, many of the purchase-time decisions required for traditional ecommerce transactions can be postponed and bifurcated from the transaction itself, thereby creating additional value for the purchaser. For example, a purchaser may wish to order a pair of shoes, but is not yet sure when the shoes will be needed or where the delivery location should be. The purchaser may purchase the virtual representation of the shoes. The virtual representation may be redeemed at a later time, such that the redeemer (e.g., the purchaser or a recipient of a gift) may specify the delivery time and delivery location when the redeemer so chooses. By creating virtual items, new value is created for purchasers or any recipients, as a series of choices that can be put on hold until redemption time.

Furthermore, in conventional ecommerce platforms, there are no recordation mechanisms of an item being transferred between unknown parties that can be checked and trusted. Additionally, there is also no way of storing sensitive financial information without a centralized entity. Thus in embodiments, the tokenization platform may be configured to issue electronic tokens (or "tokens") that are configured to be stored on a cryptographically secure ledger to provide a process by which virtual representations allow the transfer of the item between unknown parties, while also allowing anyone to check the status of the token at any time and trust that it is correct. As used herein, unless otherwise indicated by context, "cryptographically" indicates use of a cryptographic algorithm, such as a hashing algorithm.

The ecommerce platform may be configured to support additional or alternative ecosystems. In embodiments, the tokenization platform is configured to support a token-based lending system, whereby lenders may create virtual items corresponding to collateral (e.g., jewelry, collectible items, artwork, and the like). The ecommerce platform may tokenize the virtual item and may store the token on a distributed ledger. In this way, the loan may be sold and only the token needs to be transferred between lenders. In some embodiments, a smart contract may be used to manage the loan, possession of the token, and other transactions corresponding to the loan.

In some embodiments, the tokenization platform is configured to authenticate real world items. In some of these embodiments, the tokenization platform may enlist subject matter experts to authenticate items using a virtual representation of the items. A subject matter expert may provide an authentication report that includes notes for the expert's underlying opinion. The authentication report may be used to deny or allow an item to be used for collateral or sold on the platform. Additionally, in some embodiments, the authentication reports can be used to train machine learned models, such that the platform may use machine vision, machine learning, sensors (e.g., scales), and/or other suitable techniques to authenticate items.

In embodiments, the tokenization platform is configured to support a "mystery box" game. The mystery box game is a game of change, where users can win tokens from the mystery box, such that the tokens represent items and the tokens can be redeemed, traded, sold, gifted, and the like. In some of these embodiments, the tokenization platform supports casino-style gaming, whereby the mystery box game may be played at casinos and other brick and mortar locations.

In embodiments, the tokenization platform is configured to support in-video game streaming. In some of these embodiments, the tokenization platform may provide indicators of tokens to instances of video games, whereby the video game makers can use the tokens in a number of different ways. For example, tokens may appear in a video game to allow a food delivery service to sell deliverable food in game. In another example, a token may represent a digital item that can be used in the game, but then later can be redeemed to obtain a real-world item corresponding to the digital item.

In embodiments, the tokenization platform may provide a rewards-based user acquisition program, whereby users can enlist for referral codes. When the user successfully refers a user to the tokenization platform, the user is rewarded with a token. The token can represent monetary compensation or an item (e.g., a gift card, a pair of shoes, a music album, a DVD, or the like).

FIG. 1 illustrates an example ecosystem of a tokenization platform 100 (or the "platform") according to some embodiments of the present disclosure. The environment includes the platform 100, node computing devices 160, external data sources 170, content platforms 180, and user devices 190. The platform 100, the node computing devices 160, the external data sources 170, the content platforms 180, and the user devices 190 may communicate via a communication network 10 (e.g., the Internet and/or a cellular network).

In embodiments, the tokenization platform 100 manages one or more cryptographic ledgers (or "distributed ledgers") and provides flexible functionality of virtual representations of items such as goods, services, and/or experiences with the fulfillment and satisfaction of said items. In embodiments, the platform 100 provides a marketplace for the 3rd party sellers to transact for items using tokens, whereby a token is a digital marker that defines an ownership right in a particular item. Additionally, or alternatively, the provider of the platform 100 may sell, lease, give away, or otherwise transact items offered by the provider. As used herein, the term "transaction" may refer to the sale/purchase, the leasing, the gifting, collateralization, or any other action that affects an ownership of a token. As will be discussed, in some embodiments a token may be redeemed by an owner of the token, such that the owner of the token may take possession of the item upon redemption of the token.

In some embodiments, the seller of an item (or any other suitable user) may access the platform 100 to define a virtual representation of the item that the seller is offering for transaction. The virtual representation of the item may include information that identifies the item (e.g., a serial number corresponding to the item, a model number of the item, and the like), information relating to the item (e.g., a classification of the item, textual descriptions, images, audio, video, virtual reality data, augmented reality data, and the like), and/or code that may be used to facilitate or verify transactions involving the item (e.g., smart contracts). In some embodiments, the platform may "tokenize" an item on behalf of a seller of the item by generating a set of tokens based on the virtual representation of the item and storing the tokens and associated metadata in a cryptographically secure distributed ledger, thereby making the tokens (and the virtual representation) verifiable, transferable, and trackable.

In embodiments, the platform 100 may receive data from one or more external data sources 170. An external data source 170 may refer to any system or device that can provide data to the platform. In embodiments, data sources may include merchant, manufacturer, or service provider systems and/or databases that provide the platform 100 with data related to an available item. External data sources may also include user devices 190, such that the user devices 190 may provide relevant data (e.g., contacts, cookies, and the like). Examples of external data sources 170 may include e-Commerce websites, organizational websites, software applications, and contact lists (e.g., phone contacts, email contacts, messenger client contacts, and the like). The platform 100 may access an external data source 170 via a network 10 (e.g., the Internet) in any suitable manner (e.g., crawlers, user permission/API, and the like).

In embodiments, the platform 100 interacts with content publishing platforms 180. A content publishing platform 190 may refer to any system that publishes content on behalf of individuals and/or organizations. Content publishing platforms may include social networking platforms, blogging platforms, news sites, and the like. In embodiments, a consumer may output content corresponding to an item via a content publishing platform 190. For example, the consumer may post content related to a purchased item to a social networking platform or may embed the content into a blog post. The content may include links to the item (e.g., a link to a webpage or application state corresponding to the item).

In embodiments, the platform 100 interfaces with various user devices 190. User devices 190 can refer to any computing device with which a user (e.g., consumer, merchant, manufacturer, provider and the like) can access the platform. Examples of user devices include, but are not limited to, smartphones, tablet computer devices, laptop computing devices, personal computing devices, smart televisions, gaming consoles, and the like. A user device may access the platform 100 via a website, a web application, a native application, or the like. In embodiments, the platform 100 may provide a first graphical user interface to user devices 190 associated with a seller and a second graphical user interface to a user device 190 associated with an end user. The first graphical user interface may allow a user associated with a seller to offer items for sale and to create new virtual representations corresponding to the items for sale. The second user interface may allow users to purchase tokens corresponding to items for sale, to transfer tokens, and/or redeem tokens. In some embodiments, the platform 100 may support a digital wallet that stores the tokens of a user. The digital wallet may be a client application that is provided and/or supported by the platform 100. In embodiments, the digital wallet stores any tokens that are owned by the user associated with the digital wallet and provides an interface that allows the user to redeem, transfer, sell, exchange, or otherwise participate in transactions involving the token.

In embodiments, the tokenization of items provides a framework for securely transacting with respect to an item represented by the token. For example, a token provides a mechanism by which an item may be traded, rented, purchased, sold, exchanged, gifted, swapped, or transferred in transactions involving trusted or untrusted parties. In some embodiments, a token represents a single unit to be transacted (e.g., sold, traded, leased, gifted, or the like). For example, if a merchant is selling ten widgets, the platform 100 may generate ten tokens, where each token corresponds to a different widget. In this scenario, all ten widgets may correspond to the same virtual representation of the widget, and the ten tokens may represent instances of the virtual representation (also referred to as a "virtual asset"). In embodiments, a token may be a digitally signed instance of the virtual representation of an item, whereby the digital signature may be used to verify the validity of the token.

In embodiments, each virtual representation of an item may include or be associated with a smart contract that, for example, provides a set of verifiable conditions that must be satisfied in order to self-execute a transaction (e.g., transfer of ownership or expiration) relating to an item represented by the virtual representation. In embodiments, each token corresponding to a virtual representation may be associated with the smart contract that corresponds to the virtual representation. In embodiments, a smart contract corresponding to a virtual representation may define the conditions that must be verified to generate new tokens, conditions that must be verified in order to transfer ownership of tokens, conditions that must be verified to redeem a token, and/or conditions that must be met to destroy a token. A smart contract may also contain code that defines actions to be taken when certain conditions are met. When implicated, the smart contract may determine whether the conditions defined therein are satisfied, and if so, to self-execute the actions corresponding to the conditions. In embodiments, each smart contract may be stored on and accessed on the distributed ledger. In some embodiments, tokens that do not have a smart contract associated therewith may be referred to as placeholder tokens, such that a placeholder token may not be involved in a transaction. In embodiments, tokens can be gifted. In embodiments, recipients of a gifted token may redeem the token, customize the virtual asset represented by the token before redemption, exchange it for another token, obtain the cash value equivalent, and the like.

Once the platform 100 generates a token, the platform may update the distributed ledger to indicate the existence of a new token. As used herein, a distributed ledger may refer to an electronic ledger that records transactions. A distributed ledger may be public or private. In embodiments where the distributed ledger is private, the platform 100 may maintain and store the entire distributed ledger on computing device nodes 160 associated with the platform. In embodiments where the distributed ledger is public, one or more 3rd party computing node devices 160 (or "computing nodes") that are not associated with the platform 100 may collectively store the distributed ledger. In some of these embodiments, the platform 100 may also locally store the distributed leger and/or a portion thereof. In embodiments, the distributed ledger is a blockchain (e.g., an Ethereum blockchain). Alternatively, the distributed ledger may comport to other suitable protocols (e.g., hashgraph, Byteball, Nano-Block Lattice, and IOTA). By storing tokens on a distributed ledger, the status of that token can be verified at any time by querying the ledger and trust that it is correct. By using the token approach to implementation, tokens cannot be copied and redeemed without permission.

In some embodiments, the platform 100 is configured to shard the distributed ledger, such that there are side chains that fork from a main chain of a distributed ledger. In some of these embodiments, a side chain may store virtual representations of items having a particular category or class. In embodiments, a side chain corresponding to a particular class of items may store tokens corresponding to items belonging to the particular class and ownership records that indicate the current and previous ownerships of those tokens. Each time ownership of a token changes, the side chain containing the implicated token may be amended to indicate the new owner of the token. In embodiments, side chains may store media contents that are associated with virtual representations. For example, a side chain may store videos, photographs, audio clips, and other suitable media contents that are referenced by respective virtual representations.

In addition to item data (e.g., virtual representations), tokens, and transaction data relating to the tokens, the distributed ledger may further store account information. For example, in embodiments the distributed ledger may store the public addresses of each valid account. In embodiments, a valid account may belong to an entity that is verified and authorized by the platform to participate in a transaction. Thus, in embodiments, a party may only sell, purchase, gift, receive, or otherwise transfer a token if the party has a known account. Each account may be assigned a public key and a private key that may be used to transact on the platform 100. In embodiments, the address of an account may be based on the public key of the account (e.g., the address may be a hash value of the public key). These addresses may be stored in the distributed ledger, such that addresses involved in a transaction may be verified as corresponding to valid accounts using the distributed ledger.

In operation, a seller may instruct the platform 100 to generate virtual representations of one or more respective items, such that each virtual representation represents a respective item that is available for a transaction. It is noted that while many of the examples of transactions in the disclosure relate to purchases of goods, services, and/or experiences, transactions may also include leases, rentals, loans, gifts, trades, rewards, or giveaways. In embodiments, the seller may provide item attributes relating to a set of one or more items, such as a number of items available for transaction, pricing information of an item, delivery restrictions for the item, expiries relating to the item (e.g., how long is the transaction valid), an item description, a serial number (e.g., of physical items), media relating to the item (e.g., photographs, videos, and/or audio content), and the like. In response to the seller providing the item information, the platform 100 generates a set of tokens corresponding to the number of items available for transaction. For example, if the seller indicates that there are 100 Model X widgets available for sale, the platform 100 may generate a virtual representation of the Model X widget and may generate 100 non-fungible tokens corresponding to the virtual representation, whereby each token corresponds to a respective instance of the virtual representation. The virtual representation may include a description of the widgets, a description of the widgets, a price of the widget, shipping restrictions relating to the widgets, photographs of the widgets, videos of the widget, virtual reality data relating to the widget, and the like. The platform 100 may then store the virtual representation and the corresponding tokens on the distributed ledger. For each token, the distributed ledger may store the token, ownership data relating to the token, media content corresponding to the token (or the virtual representation to which the token corresponds), and/or other suitable data relating to the token on the distributed ledger. Initially, the ownership of the token may be assigned to the seller. As such, the distributed ledger may indicate the existence of the token and that the seller owns the token. Once tokenized, end users (e.g., buyers) may participate in transactions for the item using the corresponding token. For example, the user may purchase a token corresponding to the item from the seller via a web interface or application that is provided or supported by the provider of the platform 100. In response to the transaction, the platform 100 may update the distributed ledger to indicate an assignment of the token to the user (e.g., to a wallet associated with an account of the user). In embodiments, a copy of the token may be stored in a digital wallet corresponding to the new owner of the token (e.g., the buyer).

A token may be transmitted amongst users in any suitable manner. For example, a token may be transmitted via email, instant message, text message, digital transfer, social media platforms, and the like. In some of these embodiments, the token may be transmitted directly from the sender's user device 190 (e.g., from the user's digital wallet) to a user device 190 (e.g., smartphone) or account (e.g., email account or messaging application) associated with the intended recipient. Upon initiating the transmission, the digital wallet may transmit a transfer request to the platform 100 and may transmit a copy of the token to the recipient's user device 190 or specified account. In some embodiments, the transmitted token may be embedded in a media content, such as an image, emoji, or video, such that the recipient receives the media content and may opt to accept the token. In this example, the token may be accompanied by a link and/or software instructions that cause the user device 190 that receives the token to add the token to the recipient's account upon the recipient accepting the token. Upon electing to accept the token, the user device 190 of the recipient may transmit a request to the platform to add the token to an account of the recipient. The platform 100 may receive the request and may update the ownership record of the token in the distributed ledger to indicate the transfer of ownership.

In embodiments, an owner of a token may redeem a token. In embodiments, a user may select a token to redeem from a digital wallet of the user. In response to the selection, the digital wallet may transmit a redeem request to the platform 100. The redeem request may include the token (or an identifier thereof) and a public address of the user (or any other suitable identifier of the user). The platform 100 receives the redeem request and verifies the validity of the token and/or the ownership of the token. Once verified, the user is granted permission to redeem the token. In some scenarios, the user may be redeeming a token corresponding to a digital item (e.g., a gift card, an mp3, a movie, a digital photograph). In these scenarios, the platform 100 may determine a workflow for satisfying the digital item. For example, the platform 100 may request an email address from the user or may look up an email address of the user from the distributed ledger. In this example, the platform 100 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the platform 100 may determine a workflow for satisfying the physical item. For example, the platform 100 may request shipping information from the user or may look up the shipping information of the user from the distributed ledger. The platform 100 may then initiate shipment of the physical good. For example, the platform 100 may transmit a shipping request to a warehouse that handles shipments of the good indicating the shipping information. The foregoing are examples of how a token may be redeemed. The platform 100 may execute additional or alternative workflows to handle redemption of a token.

In embodiments, the token may be printed in physical media, such that the token may be redeemed at a brick and mortar location. For example, the token (e.g., an alphanumerical string) may be encoded into a QR-code or barcode. In these embodiments, the public key of the party that was used to digitally sign the token (e.g., a public key associated with the platform 100) may also be provided in the physical media. In this way, the token may be verified by scanning the QR-code or barcode using a client application associated with the platform 100. The client application may provide the token and the public key to the platform 100, which may verify the validity of the token based on the token and the public key. If the token and ownership are verified, the platform 100 may transmit a confirmation of the verification to the client application. A clerk may then allow the user to complete the transaction (e.g., take possession of the item).

In some embodiments, tokens may be perishable, in that they lose all value at a predetermined time or upon the occurrence of a predetermined event. In these embodiments, the seller may provide an expiry in the virtual representation that indicates a date and time that the virtual representation is no longer valid, such that when the expiry is reached, the token may be deemed invalid.

Tokens may be fungible tokens or non-fungible tokens. Fungible tokens may refer to tokens that are interchangeable. For example, fungible tokens may all have the same identifier. Non-fungible tokens are unique tokens. Non-fungible tokens are transferrable but not interchangeable.

In embodiments, the platform 100 may execute one or more of: a marketplace system 102, a ledger management system 104, a transaction system 106, an API system 108, an intelligence and automation system 110, an analytics and reporting system 112, and/or virtual world presence system 114, all of which are discussed in greater detail throughout this disclosure.

In embodiments, the platform 100 provides a marketplace system 102 that allows virtual representations of items to be defined, generated, viewed, and/or redeemed. In embodiments, the marketplace system 102 may include graphical user interfaces that: allow sellers to define virtual representations, allow consumers to view virtual representations of items and to transact for tokens corresponding to the items, and allow token owners to redeem tokens, thereby completing transactions for items indicated by the redeemed tokens. The marketplace system 102 may further include backend functionality for supporting these operations.

In embodiments, the platform 100 provides a ledger management system 104 that generates tokens and manages one or more distributed ledgers, including managing the ownership rights of the generated tokens. In embodiments, the ledger management system 104 may also interface with one or more smart contracts that implicate the distributed ledgers.

In embodiments, the platform 100 includes an API system 106 that manages one or more application programming interfaces (APIs) of the platform, so as to expose the APIs to one or more related applications (e.g., native and/or web applications provided by the platform 100 provider), third party systems that are supported by or otherwise interact with the platform 100, and smart contracts that are configured to interface with the platform 100. The API system 106 may expose one or more APIs, such that the API system 106 may receive API calls from requesting devices or systems and/or may push data to subscribing devices or systems. The API system 106 may implement any suitable types of APIs, including REST, SOAP, and the like. In embodiments, the API system 106 may include a smart contract API that allows smart contracts to interface with the platform, a utility API, a merchant API that allows merchants to create tokens corresponding to virtual representations of items, and any other suitable APIs. In embodiments, the platform 100 may implement a micro services architecture such that services may be accessed by clients, such as by APIs and/or software development kits (SDKs). The services abstract away the complexities of blockchain creation, object handling, ownership transfers, data integration, identity management, and the like, so that platform users can easily build, deliver and/or consume platform capabilities. In embodiments, SDK types include, but are not limited to: an Android SDK, aniOS SDK, a Windows SDK, a JavaScript SDK, a PHP SDK, a Python SDK, a Swift SDK, a Ruby SDK, and the like.

In embodiments, the platform 100 includes a transaction system 108 that supports any suitable transactions relating to the platform, including the buying, selling, trading, renting, leasing, exchanging, swapping, transferring, and/or redeeming of tokens that represent corresponding items.

In embodiments, the platform 100 includes an intelligence and automation system 110 that performs machine learning and artificial intelligence tasks. For example, the intelligence and automation system 110 may train machine learned models, make classifications and predictions based on the machine learned models, recommend products to users, identify advertisements to target to specific users, match service providers to service seekers, and/or automate notifications to users.

In embodiments, the analytics and reporting system 112 performs analytics-related tasks relating to various aspects of the tokenization platform 100 and may report the resultant analytics to interested parties (e.g., employees of the platform provider 100 and/or sellers on the platform 100).

In embodiments, the platform includes or supports a virtual world presence system 114 that provides presents virtual representations of items in virtual world environments. For example, the virtual world presence system 114 may present a virtual reality store to a user, whereby virtual representations of items are presented in the store and users can "shop" for the virtual items in the virtual world environment. In these embodiments, the virtual world presence system 114 may render a virtual world environment, which may be displayed at a client application. The virtual world environment may be associated with a seller or a group of sellers, whereby items that are sold by the seller or sellers are made available in the virtual world environment. In these embodiments, the virtual world presence system 114 may further render 3D representations of items that are available from the seller or sellers based on the virtual representations of the items. The 3D representations may then be presented in the virtual world environments, such that users can examine the 3D representations of the items (e.g., look at the representations from different angles). In the event a user wishes to purchase an item, the user may initiate a transaction (e.g., selecting a "buy" button in the virtual representation). Upon the user initiating the transaction, the virtual world presence system 114 may notify the transaction system 106 of the user's selection, and the transaction may precede in the manner described above.

In embodiments, the platform 100 includes a user management system 116. In embodiments, the user management system 116 may create new user accounts, assess risk associated with users, provide conditions for users based on respective risk associated with the users when participating in a transaction, and the like.

In some embodiments, the user management system 116 creates new accounts for users. In these embodiments, a new user may access the platform 100 and may request a new account. In embodiments, the platform 100 may allow a user to link their account to an account of an external system (e.g., Google®, Facebook®, Twitter®, etc.). Additionally, or alternatively, a user can provide an email address and login. In embodiments, the user management system 116 may request a user to provide additional authenticating information, such as a home address or business address, a passport number (and/or image of the passport), driver's license number (and/or an image thereof), state ID card (and/or an image thereof). The user management system 116 may further provide a mechanism for a user to link any financial information to the platform, including entering credit card numbers, banking information, cryptocurrency wallets (e.g., Coinbase® account), and the like. Upon receiving the requested information, the user management system 116 creates a new account for the user, including creating a new public address of the account corresponding to the user. Once the account is created, the user may begin participating in transactions on the platform 100.

In embodiments, the user management system 116 determines a risk score of a user each time the user attempts to participate in a transaction using the platform 100. A risk score of a user may indicate a degree of risk associated with facilitating a particular transaction involving the user. Examples of risks may include a risk that a seller will not deliver an item purchased by another user, a risk that the seller will deliver a fake or substandard item to another user, a risk that a user will default on a loan, a risk that the user will engage in fraud, and the like. Factors that may be relevant to a user's risk score may include, but are not limited to, whether the user has provided secondary authentication information (e.g., passport or driver's license), whether the user has provided banking information, how many purchases or sales the user has made on the platform 100, the size of those transactions, how many issues the user has had with previous transactions (e.g., how many non-payments or non-deliveries, complaints, etc.), whether the user has defaulted on a loan facilitated by the platform, and the like.

In some embodiments, the user management system 116 may determine the risk score using a risk scoring model trained to assess risks associated with the user given a transaction. Upon a user attempting to engage in a transaction, the user management system 116 may determine the features of the transaction (e.g., type of transaction, the size of the transaction, etc.) and the features of the user (the outcomes of the user's previous transactions, the types of those transactions, whether the user has provided secondary authentication information, whether the user has provided banking information, whether the user has had issues in the past, etc.). For example, when a user requests to sell an item, requests a collateralized loan, or the like, the user management system 116 may determine a risk score. The user management system 116 may provide the features to the intelligence and automation system 110, which may input the features into the risk scoring model. The risk scoring model may output a risk score based on the features, where the risk score indicates a probability that the transaction will be successful given the transaction features and user features. In embodiments, the risk scoring model may be trained by the intelligence and automation system 110 (e.g., the machine learning system 502 of FIG. 5), as is discussed below.

In embodiments, the user management system 116 may impose a set of conditions on a user requesting to participate in a transaction based on the risk associated with the user. Examples of conditions may include requiring a user to place funds in escrow equal to the sale price of an item to be sold on the platform (e.g., an amount to be refunded if a seller does not provide an item or provides a fake item), requiring a user to provide collateral in excess of a loan amount if there is significant risk that the user defaults on a loan, requiring a user to provide secondary authentication information if the user is requesting a loan and has not provided such information, and the like, For example, if the user is requesting to sell an item on the platform 100, but the user does not have a history of selling items, the risk score associated with the potential transaction may indicate that there is a risk that the seller will not successfully deliver an item or that the item may be fake or in an unsatisfactory condition transaction. In this example, the platform 100 may require that the user deposit (or have in his or her account) an amount of funds that are equal to or greater than sale price of the item or items that the user wishes to sell. In this way, the platform 100 may issue a refund to a buyer if the user (i.e., seller) does not successfully complete the transaction. In embodiments, the user management system 116 may implement a set of rules to determine the conditions, if any, to place on a user with respect to a particular transaction if the user wishes to engage in the transaction. In embodiments, a rule may define one or more conditions that correspond to particular types of transactions (e.g., selling, trading, borrowing, etc.) and may define risk score thresholds that trigger the one or more conditions.

The platform 100 may execute additional or alternative systems as well. For example, in embodiments, the platform 100 may include a gamification system (not shown) that gamifies aspects of the platform 100 and/or a rewards system (not shown) that rewards users for participating in certain activities. For example, the gamification system may provide an environment where users are challenged to compete for the most shared virtual items on social media platforms. In this example, the rewards system may reward users with tokens to redeem items when the users are deemed to have shared the most virtual items on the social media platforms. In another example, the rewards system may issue rewards (e.g., tokens to certain items) to a user when the user purchases a certain value or amount of virtual items.

In embodiments, the platform 100 can include a logistics system (not shown) that enables the physical delivery of an item, such as a good or food. The logistics system may be configured to manage the logistics from the source location of the item (e.g., a warehouse or restaurant) to the redeemer of the token (e.g., the house or current location of the redeemer). In embodiments, the logistics system may include a geolocation system (not shown) for determining delivery location. For example, if an owner of a token corresponding to a pizza with one topping from a pizza delivery chain redeems the token, the geolocation system may determine the recipient's current location for delivery. Geolocation information may be acquired by a smart phone, web browser (e.g., IP address), or the like. In this example, the logistics system may generate an electronic notification based on the user's geolocation (or a selected delivery location) and the user's order (e.g., the user's selected topping) and may transmit the electronic notification to a location of the pizza delivery chain that is closest to the intended delivery location.

Figure 2:
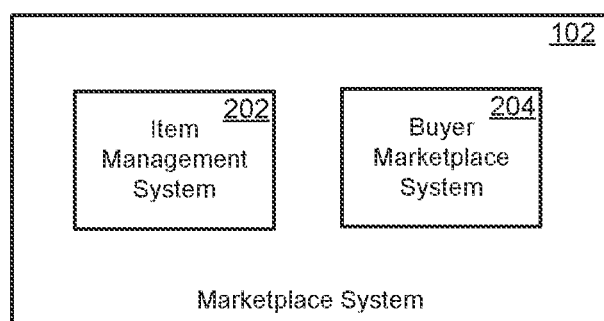
FIG. 2 is a schematic illustrating an example marketplace system according to some embodiments of the present disclosure.

FIG. 2 illustrates an example of a marketplace system 102 according to some embodiments of the present disclosure. In embodiments, marketplace system 102 may include an item management system 202, a buyer marketplace system 204, and a redemption system 206.

The item management system 202 allows a seller of an item to define a virtual representation of an item. In embodiments, the item management system 202 presents a GUI to a user device 190 of the seller that allows the seller to define the attributes of the item. In the case that the item has never been sold on the platform 100, the seller can select an option to add a new item. In response to doing so, the seller may provide an item classification that indicates the type of item (e.g., "shoes," "pizza," "photograph," "movie," "concert tickets," "gift card," and the like) and a name of the item. The seller may then define one or more additional attributes of the item. For example, in embodiments, the seller may provide an item description, media contents associated with the item (e.g., photographs, videos, audio clips, and the like), relevant links (e.g., a link to a website of the seller), a price of the item, restrictions relating to the item (e.g., "US shipping only" or "seller store hours are 10-6"), redemption instructions (e.g., whether in store redemption is allowed, permitted, or mandatory, whether digital assets are downloaded or emailed, whether the items are transferrable, and the like), a number of the item that are available for transaction (e.g., how many units are available), and/or any other suitable attributes. In response to the seller providing the item attributes, the item management system 202 may generate a virtual representation of the item. In embodiments, the virtual representation may be a data record that includes the attributes of the item. In the scenario where the virtual representation was previously defined, the seller may select the previously defined item and may update one or more attributes. For example, the seller may provide additional media contents, may alter the price, and/or may update the number of items that are available. Whether an updated virtual representation or a newly defined virtual representation, the item management system 202 may output the virtual representation to the ledger management system 104, where the ledger management system 104 may tokenize instances of the virtual representation to obtain a set of tokens.

In some embodiments, the item management system 202 may allow the seller to provide seller attributes as well. The seller may provide information such as a physical location where physical items may be shipped from, a digital location where digital items may be retrieved from, physical locations of the seller's brick and mortar stores, hours of operation of the seller, and the like. These attributes may be included in the virtual representation or may be stored in an alternate date record.

In embodiments, the item management system 202 may include an asset type manager for creating and defining new types of items to enable the platform 100 to support the sale and trade of the new type of asset. In these embodiments, the asset type manager may provide a GUI that allows a user to define a new type of asset. In these embodiments, an asset type attributes field allows users to add information specific to new asset types as they are being defined. Attribute information can be understood as information material to purchasers in making a buying decision and must be information specific to an asset type and information capable of being displayed on the platform. Asset type attribute fields include, but are not limited to, an asset type name, an asset type image, an asset redemption URL, an asset descriptor (e.g., physical or digital), and the like.

In embodiments, the item management system 202 may include an item type definition manager for defining new types of items so that they can be listed on the platform. In embodiments, the item type definition manager may provide a GUI that allows a user to define attributes of a new item. To define a new item type, a user may be prompted to select an appropriate asset type from the dropdown menu. The GUI may then allow a user to define the item attributes in item attribute fields. Item attribute fields may include, but are not limited to, an item name, an item description, item notes, an item image, item pricing data (e.g., suggested price, suggested floor price), an instant sell flag, an item URL that links to a webpage for purchasing the item, a quantity of items, and the like. When a user provides the requisite item attributes, the item management system 202 may create a new virtual representation defining the new item.

In some embodiments, the item management system 202 may require sellers without adequate history to escrow an amount of funds equal to the value of the goods being sold on the tokenization platform 100. The seller may sell a token representing an item, and when the token is redeemed by the token owner (e.g., the buyer or downstream recipient), the funds are removed from escrow and returned to an account of the seller. In these embodiments, the seller does not need to escrow the physical item, which requires at least one additional shipment to be made to a warehouse or other storage facility.

In embodiments, the buyer marketplace system 204 allows a consumer to browse or search for items, view virtual representations of items, and engage in transactions for the items. In embodiments, the buyer marketplace system 204 presents a GUI that includes a search bar that allows users to enter a search query comprised of one or more search terms. In response to receiving the search query, the buyer marketplace system 204 may query one or more indexes that index virtual representations using one or more of the search terms. The buyer marketplace system 204 may process the search query and perform the subsequent search using any suitable search techniques. In response to performing the search, the buyer market place system 204 may retrieve the virtual representations implicated by the search and may present the virtual representations in a visual manner. For example, the GUI may display a search engine results page (SERP) that displays one or more search results, where each search result corresponds to a different virtual representation and links to a respective page where the user can view the attributes of the item as defined in the virtual representation of the item, including any media contents associated with the item and the price of the item, and can elect to purchase a token corresponding to the item.

In embodiments, the buyer marketplace system 204 may allow users to browse virtual items offered on the platform. For example, the buyer marketplace system 204 may present a GUI that allows a consumer to filter items by category or by other attributes. The GUI may allow a user to select a link corresponding to an item, which directs the user to a page where the user can view the attributes of the item as defined in the virtual representation of the item, including any media contents associated with the item and the price of the item, and can elect to purchase a token corresponding to the item.

In embodiments, when the consumer elects to purchase an item, the buyer marketplace system 204 may notify the ledger management system 104 regarding the purchase. The buyer marketplace system 204 may provide the ledger management system 104 with the public address of the user and an identifier of the virtual representation of the selected item. The ledger management system 104 may effectuate the transaction by assigning a token from the set of tokens corresponding to the virtual representation to the account associated with the public address of the user and updating the distributed ledger to indicate the change of ownership of the assigned token to the public address of the user. For example, the buyer marketplace system 204 (or the transaction system 106) may identify a token that is currently owned by the seller and may transfer ownership of the token to an account of the buyer. Once this occurs, a copy of the token may be deposited into an account of the user. For example, the token may be deposited in a digital wallet of the user.

In embodiments, the buyer marketplace system 205 may depict items as individual thumbnail images. In some of these embodiments, a simple box style user interface element can be added to the Item detail pages to display the attributes of an item, including an item description attribute, item notes attributes, and a seller URL attribute. An item description field on the GUI can support clickable URLs that can redirect platform users to pages with more information about the product or other relevant pages. The item description textbox can be displayed and support links to third-party domains.

In embodiments, the buyer marketplace system 204 may allow users to purchase made-to-order items. For example, a user may order a customized pizza, piece of furniture, flower arrangement, or the like. Users can digitally build items consisting of multiple items from multiple merchants and have it 3D printed at a 3D printing station.

Figure 3:
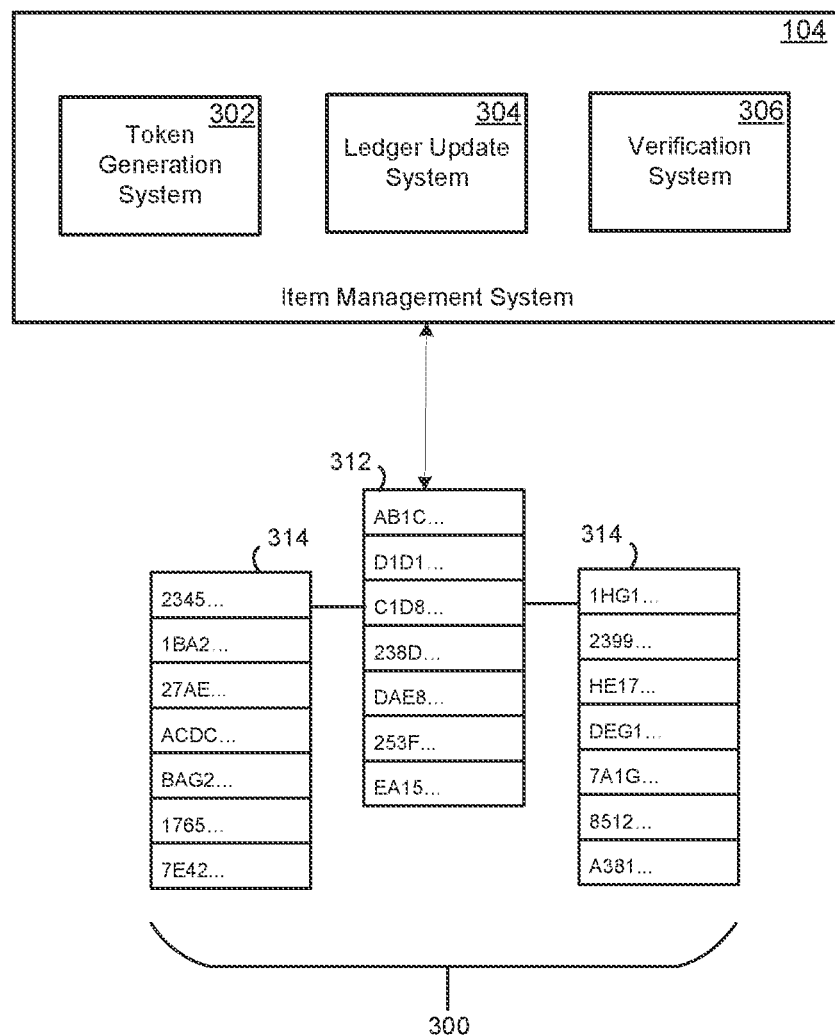
FIG. 3 is a schematic illustrating an example ledger management system according to some embodiments of the present disclosure.

FIG. 3 illustrates an example of a ledger management system 104 of the tokenization platform 100 that manages one or more distributed ledgers 210 in accordance with some implementations of the present disclosure. In embodiments, the ledger management system 104 includes a token generation system 302, a ledger update system 304, and a verification system 306. The token generation system 302 may be configured to generate tokens that correspond to items made available for transaction and that are based on respective virtual representations of the items. The ledger update system 304 receives requests to update the distributed ledger 310 and updates the distributed ledger accordingly 310. The verification system 306 receives requests to verify a token, an account, or the like and attempts to verify the token or account based on the distributed ledger.

In embodiments, the distributed ledger 310 may be a public ledger, such that N node computing devices 160 store N respective copies of the ledger 310, where each copy includes at least a portion of the distributed ledger 310. In other embodiments, the distributed ledger 310 is a private ledger, where the ledger is distributed amongst nodes under control of the platform 100. In embodiments, the distributed ledger 310 is a blockchain (e.g., an Ethereum blockchain comporting to the ETC protocol). Alternatively, the distributed ledger 310 may comport to other suitable protocols (e.g., Hashgraph, Byteball, Nano-Block Lattice, or IOTA). By storing tokens on a distributed ledger 310, the status of that token can be verified at any time by querying the ledger and trust that it is correct. By using the token approach to implementation, tokens cannot be copied and redeemed without permission.

The distributed ledger 310 may store any suitable data relating to an item, a user, a seller, and the like. In embodiments, the distributed ledger 310 may store item-related data. Item-related data may include, but is not limited to, item identifiers, expiration dates of items, conditions or restrictions placed on the items, item descriptions, media content related to items (e.g., photographs, logos, videos, and the like), documentation of the item, customization options, available sizes, available colors, available materials, functionality options, ingredients, prices, special offers or discounts relating to the item, location information (e.g., where an item can be delivered/provided), hours available, owner/custodian data, reviews, item type, and the like. In embodiments, the distributed ledger 310 may store user data. User data may include, but is not limited to, identifying information (e.g., user ID, email address, name, and the like), public address, financial information (e.g., credit card information), transaction history, location data (e.g., a region of the user or country of the user), preferences, a wish list, subscriptions of the user, items belonging to the user, user connections or contacts, media content relating to the user (e.g., photos or videos of the user), an avatar of the user, and the like. In embodiments, the distributed ledger 310 may store merchant-related data. Merchant-related data may include, but is not limited to, identifying information (e.g., a name of the merchant, a merchant ID, and/or the like), contact information of the merchant, experience data, location data, hours available, reviews, media content (photographs, videos, and the like), and/or any other suitable merchant-related data. A distributed ledger 310 may store additional and/or alternative data.

In embodiments, the distributed ledger 310 includes side chains 314. A side chain 314 may refer to a shard of the distributed ledger 310 that extends from a segment (e.g., a block) of a main chain 312 of the ledger 310. In embodiments, the main chain 312 may store data that is related to merchants and users with accounts (e.g., public addresses). Additionally, or alternatively, the main chain 312 may store item classification data, such as descriptions of item classifications. In embodiments, a side chain 314 may pertain to a particular classification of item. In some of these embodiments, side chains 314 may store virtual representations of items belonging to a respective genus or class of items and data relating to those items. For example, a first side chain 314-1 may store virtual representations of shoes that are available on the platform 100 and any token-related data relating to those virtual representations. In embodiments, side chains 314 may store media contents that are used in connection with items available for transaction on the platform. For example, a second side chain 314-2 may store photographs depicting shoes represented in the first side chain 314-1, video clips depicting shoes represented in the first side chain 314-1, audio clips relating to shoes represented in the first side chain 314-1, virtual reality content depicting shoes represented in the first side chain 314-1, augmented reality content depicting shoes represented in the first side chain 314-1, and the like. The foregoing is one manner to shard a distributed ledger. The distributed ledger 310 may be sharded in any other suitable manner.

In embodiments, the token generation system 302 receives a virtual representation and generates one or more tokens corresponding to the virtual representation. In embodiments, the virtual representation includes attributes of an item, including a number (if bounded) of available items (i.e., the number of items available for transaction). In embodiments, the number of available items indicates the number of tokens that the token generation system 302 generates for a particular virtual representation. The attributes may also include other restrictions relating to the item, such as an expiry of a token (e.g., how long a token may be valid). The token generation system 302 may also receive initial ownership data. The initial ownership data defines the initial owner of a token. As a default, the entity offering the item represented by the virtual representation (e.g., the merchant of the item) is the initial owner of the token. The initial ownership may, however, be assigned to a different entity.

In embodiments, the token is a wrapper that wraps an instance of a virtual representation. In some of these embodiments, the token generation system 302 may generate a token identifier that identifies the token. In scenarios where the tokens are non-fungible tokens, the token generation system 302 may generate a unique identifier for each respective token corresponding to the virtual representation. The token generation system 302 may generate the token identifier using any suitable technique. For example, the token generation system 302 may implement random number genesis, case genesis, simple genesis, and/or token bridge genesis to generate a value that identifies the token. In embodiments, the token generation system 302 may digitally sign the value using a private key/public key pair. The token generation system 302 may utilize a private key/public key pair associated with the platform 100 or the merchant to digitally sign the value that identifies the token. The token generation system 302 may implement any suitable digital signature algorithm to digitally sign the value that identifies the token, such as the Digital Signature Algorithm (DSA), developed by the National Institute of Standards and Technology. In embodiments, the resultant digital signature may be used as the token identifier. For each token, the token generation system 302 may generate a token wrapper that includes the token identifier and the virtual representation of the item. In embodiments, the token generation system 302 may embed or otherwise encode the public key used to digitally sign the token in the token. Alternatively, the token generation system 302 may store the public key apart from the token, such that the public key is communicated to an account of the token owner each time the token is transferred to a new owner. Upon generating a non-fungible token, the token generation system 302 may output the non-fungible token to the ledger update system 304. The wrapper may wrap a plurality of tokens, including fungible tokens and non-fungible tokens.

In some embodiments, the token generation system 302 may generate fungible tokens. In these embodiments, the token generation system 302 may generate identical tokens, where each token has the same token identifier. In these embodiments, the token generation system 302 may generate a single token identifier, in the manner described above, and may generate N fungible tokens using that token identifier, where N is the number of total tokens. Upon generating the N fungible tokens, the token generation system 302 may output the N fungible tokens to the ledger update system 304.

In embodiments, the ledger update system 304 is configured to update and maintain one or more distributed ledgers 310. As used herein, updating and maintaining a distributed ledger 310 may refer to the writing of data to the distributed ledger 310. In embodiments, the ledger update system 304 may generate a block in accordance with the protocol to which the distributed ledger comports, where the block contains the data to be written to the distributed ledger 310. In embodiments, the ledger update system 304 may update the distributed ledger 310 by broadcasting the generated block to the computing nodes 160 that store the distributed ledger 310. The manner by which a computing node 160 determines whether to amend the received block to its local copy of the distributed ledger 310 may be defined by the protocol to which the distributed ledger comports.

In embodiments, the ledger update system 304 receives tokens and updates the distributed ledgers 310 based thereon. In some of these embodiments, the ledger update system 304 receives a token and ownership data (e.g., a public address of the entity to which the token is to be assigned) and updates the distributed ledger 310 based thereon. For example, the ledger update system 304 may generate a block having the token embedded therein. The generated block or a subsequently generated block may include the ownership data pertaining to the token. The ledger update system 304 may then write generated block(s) to the distributed ledger 310. For example, the ledger update system 304 may amend the block(s) to a copy of the distributed ledger 310 maintained at the platform 100 and/or may broadcast the block(s) to the computing nodes 160 that store copies of the distributed ledger 310, which in turn amend the respective copies of the distributed ledger with the broadcast block(s). In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the existence of the token and the current ownership of the token.

In embodiments, the ledger update system 304 receives an ownership change request requesting to change ownership of a token to another account. For example, the ledger update system 304 may receive an ownership change request in response to a purchase of a token, a gifting of a token, a resale of the token, a trade of a token, and the like. In some embodiments, the ownership change request may define a token to be transferred and a public address of the transferee of the token (e.g., a recipient of the token). In some embodiments, the ownership change request may further include a public address of the current owner of the token (assuming the token has a current owner). The ledger update system 304 may receive the ownership change request and may generate a block to indicate the new owner of the implicated token. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the token corresponds. In these embodiments, the generated blocks are amended to the designated side chain 314 to indicate the new owner of the token.

In embodiments, the ledger update system 304 receives a new or altered virtual representation and updates the distributed ledger 310 to reflect the new or altered virtual representation. For example, the ledger update system 304 may receive a new visual representation when a seller defines a new item that is available for transaction. The ledger update system 304 may receive an altered virtual representation in response to a seller altering one or more attributes of a previously defined virtual representation. In embodiments, the ledger update system 304 receives a new or altered virtual representation and generates one or more blocks based on the received virtual representation. The ledger update system 304 may then write the generated block(s) to the distributed ledger 310 based on the generated block(s). For example, the ledger update system 304 may amend the block(s) to the distributed ledger and/or may broadcast the block(s) to the computing nodes 160 that store the distributed ledger. In embodiments where the distributed ledger 310 is sharded, media content pertaining to a virtual representation may be stored in a separate side chain 314. In some of these embodiments, the media contents may be stored in separate blocks from the virtual representation, where the block containing the virtual representation may include references to the blocks containing the corresponding media contents. The ledger update system 304 may designate a side chain 314 (e.g., an item classification) to which the virtual representation corresponds and a side chain 314 to which the media content block(s) should be corresponds. In these embodiments, the generated blocks are amended to the respective designated side chains 314 to indicate the new or amended virtual representation. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In embodiments where the distributed ledger 310 is sharded, the ledger update system 304 may designate a side chain 314 (e.g., an item classification) to which the burned token corresponds. In these embodiments, the generated blocks are amended to the designated side chain 314 to indicate the new and/or amended virtual representation(s).

In embodiments, the ledger update system 304 is further configured to "burn" tokens. Burning tokens may refer to the mechanism by which a token is deemed no longer redeemable. A token may be burned when the token expires or when the token is redeemed. In embodiments, the ledger update system 304 may update the ownership of the token to indicate that the token is not currently owned (e.g., owner=NULL) and/or may update the token state to indicate that the token is no longer valid. In some of these embodiments, the ledger update system 304 may generate a block indicating that the token is not currently owned or that the state of the token is not valid. The ledger update system 304 may then write generated block(s) to the distributed ledger 310. For example, the ledger update system 304 may amend the block(s) to the distributed ledger 310 and/or may broadcast the block(s) to the computing nodes 160 that store the distributed ledger 310. In some embodiments, the distributed ledger 310 is sharded. In these embodiments, the ledger update system 304 may designate a side chain 314 (e.g., an item classification) to which the token corresponds. In these embodiments, the generated blocks are amended to the designated side chain 314 to indicate the burned token.

The ledger update system 304 may update the distributed ledger 310 to indicate other data as well. In embodiments, the leger update system 304 may maintain and update merchant data and/or user data on the distributed ledger 310. For example, the ledger update system 304 may maintain a public address list of valid accounts. The ledger update system 304 may update the cryptographic ledger to reflect new accounts that are added to the platform 310 with the public addresses of those accounts. The ledger update system 304 may store additional or alternative merchant and user data on the distributed ledger as well.

In embodiments, the verification system 306 verifies data stored on the distributed ledger 310. In embodiments, the verification system 306 may verify the validity of tokens and/or may verify the ownership of a token. The verification system 306 may be configured to validate other types of data stored on the distributed ledger 310 as well.

In embodiments, the verification system 306 receives a token verification request. The token verification request may include a token to be verified or a token identifier thereof. In these embodiments, the verification system 306 may determine whether the token identifier of the token to be verified is stored on the distributed ledger 310. If it is not stored on the distributed ledger 310, the verification system 306 may deem the token to be invalid. In some embodiments, the token verification request may further include a public key to be used to verify the token. In these embodiments, the verification module 306 may use the received public key to determine whether the public key corresponds to a token that is stored in the distributed ledger 310. In some of these embodiments, the verification system 306 use the received public key and the private key used to encode the digital signature to determine whether the received public key is the public key used to sign the token. For example, in embodiments, the verification system 306 may attempt to decrypt the digital signature using the private key and the received public key. If the private key and the received public key enable decryption of the digital signature to obtain the value used to generate the token, then the verification system 306 may deem the token valid and may notify the requesting system of the verification.

In embodiments, the verification system 306 may be configured to verify the ownership of a token. In these embodiments, the verification system 306 may receive a public address to be verified and a token (or an identifier thereof). In some embodiments, the verification system 306 may verify that the public address corresponds to an account on the platform 100. For example, the verification system 306 may determine whether the public address is stored in the public address list on the distributed ledger 310. If so, the verification system 306 may determine whether the ownership data relating to the token is currently owned by the account indicated by the received public address. If so, the verification system 306 may verify the ownership of the token and may output the verification to the requesting system.

Figure 4:
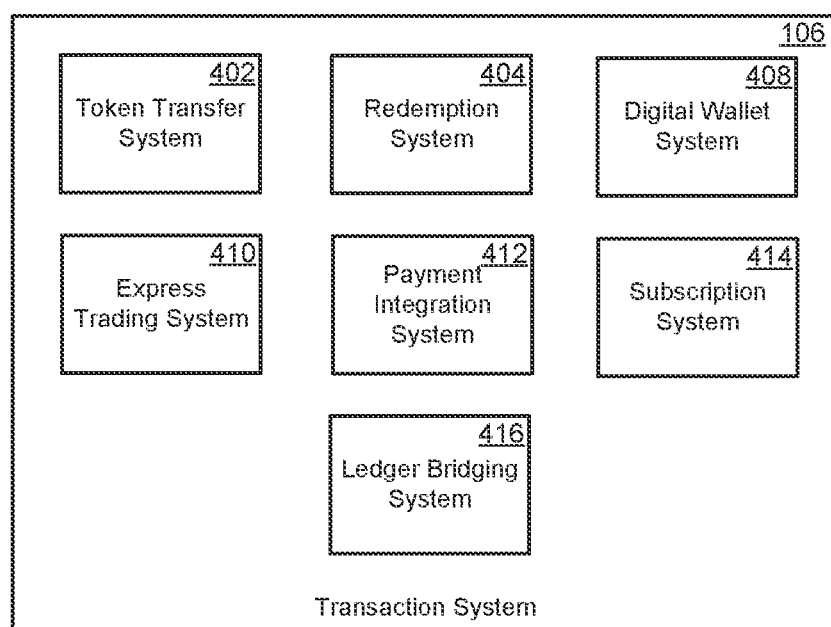
FIG. 4 is a schematic illustrating an example transactions system according to some embodiments of the present disclosure.

FIG. 4 illustrates an example of a transaction system 106 of the tokenization platform 100, according to some embodiments of the present disclosure. In some embodiments, the transaction system 106 include a token transfer system 402 and a redemption system 404. The transaction system 106 may include additional or alternative systems without departing from the scope of the disclosure. For example, the transaction system 106 may include a digital wallet system 408, an express trading system 410, a payment integration system 412, a subscription system 414, and/or a token bridging system 416.

In embodiments, the token transfer system 402 facilitates the transfer of tokens from an account of an owner of the token an account of a different user. In embodiments, token transfer system 402 may include smart contracts that define the conditions under which a token may be transferred. In some of these embodiments, smart contracts may reside in tokens, such that the smart contract may execute at a node computing device and/or from a digital wallet. In some of these embodiments, a smart contract may interface with the token transfer system 402 via a smart contract API that is exposed by the API system 108.

In embodiments, the token transfer system 402 receives a transfer request that requests a transfer of a token to an account. A transfer request may be received from an account of the token holder or from the account of the intended recipient of the token. In embodiments, the transfer request may include a public address of the account to which the token is to be transferred and may further include or indicate the token to be transferred. For example, the transfer request may include a copy of the token or a value (e.g., an alphanumeric string) that uniquely identifies the token. In some embodiments, the transfer request includes a public key of the entity that digitally signed the token. In some embodiments, the transfer request may include a public address of the token owner that is requesting to transfer the token.

The token holder may initiate the transfer of a token from the digital wallet of the token holder. In some embodiments, transfers of tokens may be performed via the platform 100. In these embodiments, the token owner may initiate a transfer of the token by instructing the digital wallet to send a transfer request to the token transfer system 402 (e.g., via a GUI of the digital wallet). In these embodiments, the token transfer system 402 may receive the transfer request and may determine whether the token is a valid token, and whether the public address of the owner and/or the recipient are valid. If the token is valid and the public addresses of the owner and/or the recipient are valid, the token transfer system 402 may transmit a copy of the token to a user device and/or account associated with the intended recipient. Once accepted by the recipient, the token transfer system 402 may instruct the ledger management system 104 to update the distributed ledger to indicate the change of ownership of the token, such that the distributed ledger indicates that the recipient is the current owner of the token.

Figure 7:
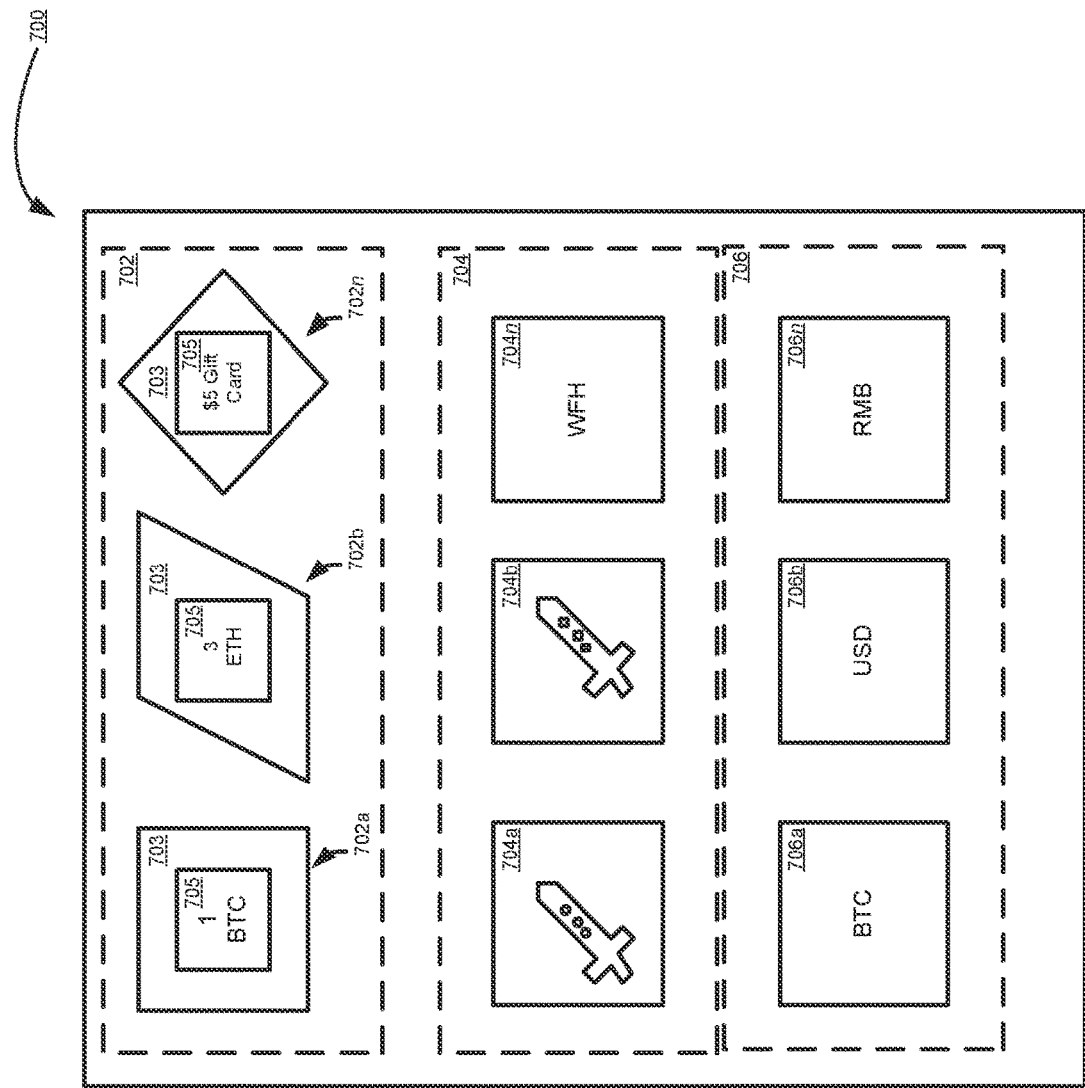
FIG. 7 is a user interface displaying tokens within a wallet, according to some embodiments of the present disclosure.

Referring now to FIG. 7A, an illustration of a wallet 700 display is shown. The display of the wallet 700 includes a plurality of tokens, such as tokenized tokens 702a-702n (generally 702), non-fungible tokens 704a-704n (generally 704), and fungible tokens 706a-706n (generally 706). As can be seen, in embodiments, the tokens are grouped by token type. The tokenized tokens 702 may include displayed indicia 703 communicating the type and, in embodiments, the amount of particular contents 705 contained within the respective tokenized token 702. For example, the user's Bitcoin within the platform 100 may split among a fungible token 706a balance and one or more tokenized tokens 702a. Moreover, the fungible Bitcoin 706a may be a consolidated balance of the user's fungible bitcoin 706a, or may be separate balances (e.g., balance equal to amount of bitcoin transferred into the platform 100 in a single transaction).

The non-fungible tokens 704 may include display indicia to communicate pertinent information related to the token. For example, a plurality of purchasable skins 704a, 704b and work-for-hire 704 may be grouped together, and each may display indicia such as an image of the good. The fungible tokens 706a-706n are tokens corresponding with fungible goods. For example, the fungible tokens 706a-706n may include currencies, cryptocurrencies, commodities, etc.

In embodiments, the digital wallet is configured to transmit the token directly to a user device 190 or account (e.g., an email account, an account on a 3rd party messaging app), whereby the recipient of the token may accept the token. In some of these embodiments, the digital wallet of the recipient may transmit a transfer request to the token transfer system 402 indicating a request to transfer the token to the recipient, in addition to sending a copy of the token to the intended recipient. In these embodiments, the token transfer system 402 may determine whether the token is a valid token and whether the public address of the owner and/or the recipient are valid. If the token is valid and the public addresses of the owner and/or the recipient are valid, the token transfer system 402 may allow the recipient to accept the token into a respective digital wallet of the recipient. Once accepted by the recipient, the token transfer system 402 may instruct the ledger management system 104 to update the distributed ledger to indicate the change of ownership of the token, such that the distributed ledger 310 indicates that the recipient is the current owner of the token.

Alternatively, in some embodiments, the digital wallet of the token owner does not transmit a transfer request to the token transfer system 402. In these embodiments, the user device 190 of the recipient of a token may present a mechanism by which the token owner may accept the token. For example, the user device 190 may present a link to accept the token. Upon the intended recipient accepting the token, the user device 190 (e.g., via an instance of the digital wallet of the recipient) may transmit the transfer request to the token transfer system 402. In this scenario, the token transfer system 402 may determine whether the token is a valid token and whether the public address of the owner and/or the recipient are valid. If the token is valid and the public address of the owner and/or the recipient are valid, the token transfer system 402 may instruct the ledger management system 104 to update the distributed ledger to indicate the change of ownership of the token, such that the distributed ledger indicates that the recipient is the current owner of the token.

As discussed, in response to a transfer request, the token transfer system 402 may determine whether the token is a valid token and whether the public address of the owner and/or the recipient are valid. In embodiments, a token may be validated using a public key associated with the token. For example, the token transfer system 402 may provide the token (or an indicator thereof) and a public key indicated in the transfer request to the ledger management system 104. The ledger management system 104 may determine whether the token identifier is stored on the distributed ledger, and if so, may verify that the public key provided with the transfer request is the public key that was used to digitally sign the token. In embodiments, the token transfer system 402 may validate the identities of the recipient and/or the token owner wishing to transfer the token using the public addresses thereof. In some of these embodiments, the token transfer system 402 may provide the public address of the recipient and/or the public address of the token owner to the ledger management system 104, which may in turn look up the respective public address to verify that the public address is stored on the distributed ledger. In response to determining that the token is valid and the public addresses of the token owner and/or the recipient are valid, the token transfer system 402 may allow the transfer of the token and may instruct the ledger management system 104 to update the distributed ledger to indicate the change of ownership of the token, such that the distributed ledger indicates that the recipient is the current owner of the token.

In embodiments, the redemption system 404 allows an owner of a token to redeem the token. The redemption system 404 may receive a request to redeem (or "redemption request") the token. The redemption request may include the token or an identifier of the token (e.g., an alphanumeric string) and may include a public address of the user attempting to redeem the token. In embodiments, the redemption request may further include the public key used to digitally sign the token. In response to receiving the redemption request, the redemption system 404 may provide the token, the public address of the user attempting to redeem the token, and the public key used to digitally sign the token to the ledger management system 104. The ledger management system 104 may then either verify or deny the token/public address combination. The ledger management system 104 may deny the combination if the token is not a valid token and/or the user is not the listed owner of the token. The ledger management system 104 may verify the token/public address combination if the token is deemed valid and the requesting user is deemed to be the owner of the token.

In response to verifying the token/public address combination, the redemption system 206 may execute a workflow corresponding to the virtual representation to which the redeemed token corresponds. For example, in some scenarios, the user may be redeeming a token corresponding to a digital item (e.g., a gift card, an mp3, a movie, a digital photograph). In these scenarios, the redemption system 404 may determine a workflow for satisfying the digital item. For example, the redemption system 404 may request an email address from the user or may look up an email address of the user from the distributed ledger. In this example, the redemption system 404 may email a link to download the digital item to the user's email account or may attach a copy of the digital item in an email that is sent to the user's email account. In another scenario, the user may be redeeming a token corresponding to a physical good (e.g., clothing, food, electronics, etc.) or a physical service (e.g., maid service). In the case of a physical good, the redemption system 404 may determine a workflow for satisfying the physical item. For example, the redemption system 404 may present a GUI to the user that allows the user to enter shipping information of the user. Alternatively, the redemption system 404 may look up the shipping information of the user from, for example, the distributed ledger or a user database. The redemption system 404 may then initiate shipment of the physical good. For example, the redemption system 404 (or a logistics system) may transmit a shipping request to a warehouse that handles shipments of the good indicating the shipping information. The foregoing are examples of how a token may be redeemed.

The redemption system 404 may execute additional or alternative workflows to handle redemption of a token. For example, in some scenarios the initial purchaser of the token may not have specified certain parameters of an item that are needed to satisfy the transaction. For example, if the item is clothing, the initial purchaser may not have specified the size and/or color of the item. In another example, if the item is a food item, the initial purchaser may not have specified side orders, toppings, drink choices, or the like. If the item is an experience such as plane tickets or a hotel reservation, the initial purchaser may not have specified dates of travel. In these scenarios, the redemption system 404 may present a GUI that allows the redeemer of the token to specify the needed parameters, so that the transaction may be specified. In response to receiving the parameters, the redemption system 404 may ascribe these parameters to the instance of the virtual representation or to any other suitable data structure corresponding to the satisfaction of the transaction (e.g., a delivery order, a purchase order, etc.), such that the transaction may be satisfied.

In embodiments, the transaction system 106 includes a digital wallet system 408 that supports digital wallets. A digital wallet may be tokens that are owned by an owner of the account associated with the digital wallet and may provide a graphical user interface that allows the user to view, redeem, trade, transfer, gift, deposit, withdraw, or otherwise transact with their tokens. In embodiments, the digital wallet system 408 provides an instant sell capability, where users can agree to sell tokens corresponding to items. For example, the instant sell capability may allow a user to sell items at the rate of 90% of the floor price. In some embodiments, other users may view some or all of the virtual representation instances owned by the account owner, in accordance with the user's privacy settings. Users may opt to hide or make private individual virtual representations or all virtual representations.

In some embodiments, the platform 100 and/or digital wallet of a user may provide visual indicia that may be associated with the token when being transferred to another person. For example, the visual indicia that may be associated with a token may include emojis, images, gifs, videos, and the like. These visual indicia may be used by the user when transmitting a token to another user. For example, if the token corresponds to a bouquet of flowers and the visual indicia is an emoji of a flower, the user may send the token in a message using the flower emoji. In this example, the user may access the token in the digital wallet (e.g., via a native application on a user device 190) and may select an option to send the token to a recipient. The user may identify the recipient (e.g., selecting from a list of contacts) and may be provided an opportunity to type a message. The client application (e.g., the digital wallet) may present a keyboard that includes the flower emoji, whereby the flower emoji represents the token. In response to the user selection of the flower emoji and subsequent "sending" of the token, the digital wallet application may initiate transmission of the message that includes the token/flower emoji. In this example, the digital wallet may also transmit a transfer request to the token transfer system 402 indicating that the transferring user has requested to transfer the token. The transfer request may include a copy of the token and a public address of the transferring user. In embodiments, the transfer request may further include a public address or other indicator (e.g., an email address, a phone number, a user id, or the like) of the intended recipient of the token.

In embodiments, the transaction system 106 includes an express trading system 410 in which users may trade one or more assets without exchanging money. In these embodiments, the express trading system 410 provides a mechanism by which users can safely trade tokens, where each token represents a different item. In an example operation, a first user may make a trade offer in a smart contract to a second user to exchange one or more tokens for one or more tokens in return. The second user may accept by transferring the requested virtual asset. The smart contract then marks the transaction as completed. In embodiments, the express trade system 410 may provide a GUI that allows a user to view an inventory of tokens, create offers, accept offers, and/or cancel offers.

In embodiments, the transaction system 106 includes a payment integration system 412. The payment integration system 412 allows a user to purchase a token corresponding to an item. The payment integration system 412 may accept credit cards, different forms of currency, and/or cryptocurrency.

In some embodiments, the transaction system 106 includes a subscription system 414. In these embodiments, users can subscribe to a service to receive items that they consume regularly via the subscription system 414.

In embodiments, the transaction system 106 includes a ledger bridging system 416. The ledger bridging system 416 provides a framework to secure or lock down an original virtual asset in a first decentralized ledger system (or any holder of currency, including traditional banks) and creating a tradeable duplicate in a second decentralized ledger system. In this way, users may fund their accounts on the tokenization platform 100 with different currencies and different transfer vehicles, and may then engage in transactions (e.g., trade, gift, or redeem) using the different currencies. In some embodiments, the decentralized ledger bridging system 416 provides an escrow function across decentralized ledger systems (e.g., ledger systems that are separate and apart from the distributed ledgers 310 of the platform 100). In embodiments, the ledger bridging system 416 or a digital wallet may provide a token deposit GUI and/or a token withdrawal GUI.

In embodiments, the ledger bridging system 416 allows a user to fund their account with one or more external currencies. For example, a user may fund an account with Bitcoin, Ethereum coins, other suitable cryptocurrencies, and/or traditional currencies (e.g., U.S. Dollars, British Pounds, Euros, Chinese Yuan, Japanese Yen, and/or the like). In the case of cryptocurrencies, a user may facilitate a transfer of cryptocurrency from an external account, for example, using a non-affiliated digital wallet that stores the user's cryptocurrency. In the case of traditional currencies, a user may transfer funds into his or her account using, for example, a credit card, a direct money transfer, an ACH transfer, or the like. In some embodiments, when the user transfers funds (cryptocurrency or traditional currency) into an account with the tokenization platform 110 (which may be referred to as a "funding transaction"), the ledger bridging system 416 may generate a record corresponding to the funding transaction and may provide the record to the ledger management system 104, which may update the distributed ledger to reflect the funding transaction. The record may indicate the account to which the funds were transferred, the account from which the funds were transferred, an amount that was transferred, a date and time of the transfer, and/or any other suitable data.

Once an account is funded, a user can then use the transferred funds to participate in any transaction on the tokenization platform 100. In some embodiments, at least a subset of the transferred funds is tokenized in a manner that comports with the protocol supported by the tokenization platform 100 and/or the distributed ledger 312 corresponding thereto. In embodiments, the ledger bridging system 416 may tokenize one or more crypto coins (e.g., a bitcoin), any fraction of crypto coins, or any amount of currency in response to a request corresponding to the user. The request to tokenize funds may be an explicit request or an implicit request. An explicit request may refer to when the user specifically requests the tokenization of a certain amount of currency. An implicit request may refer to when the user engages in a transaction on the tokenization platform 100 that implicates the transferred funds in the user's account, such that at least a portion of those funds need to be tokenized to facilitate the transaction (e.g., the user purchases an item and elects to pay for the item using some of the transferred funds in the user's account. Regardless of whether the request is implicit or explicit, the ledger bridging system 416 may tokenize the certain amount of currency.

In some of these embodiments, the ledger bridging system 416 tokenizes a specified amount of currency by minting a tokenized token that "wraps" the certain amount of currency. A tokenized token may refer to a non-fungible token that has attributes that define the type of currency and an amount of currency represented by the coin (e.g., an amount of bitcoin, ethereum, dollars, pounds, or the like). In some of these embodiments, a tokenized token may refer to a non-fungible token that has a set of attributes defining characteristics of such token in addition to having a set of fungible and/or non-fungible tokens representing digital currency balance(s) enclosed within a tokenized token and/or other digital item(s). In addition, tokenized token can contain business rules governing redemption, transfer and other tokenized token lifecycle mechanisms. In some embodiments, the ledger bridging system 416 mints the new token by requesting the generation of a new token by the token generation system 302. The ledger bridging system 416 may provide the type of currency, the amount of currency, and ownership data (e.g., the account to which the new tokenized token will belong) to the token generation system 302. In response, the token generation system 302 generates a tokenized token, for example, in the manner described above. In this way, the token generation system 302 treats the currency as an "item." In this way, a tokenized token may be exchanged (e.g., for other tokenized tokens or tokenized items), gifted, and/or redeemed. In some embodiments, the types of transactions that a tokenized token may participate in may be restricted. For example, tokenized tokens representing unstable currencies may be restricted from being exchanged, but may be redeemed or gifted.

In embodiments, the ledger bridging system 416 further generates a visual indicium corresponding to the tokenized token as part of the minting process. In some embodiments, the visual indicia is a digital sticker (or "sticker"). For example, in some embodiments, the sticker may depict an amount and a symbol representing the currency (e.g., a sticker representing a tokenization of five dollars may depict "$5", or a sticker representing a tokenization of a tenth of a bitcoin may depict "฿5"). In this way, the sticker may be displayed in a wallet of an owner of the tokenized token. As discussed, the visual indicia may be used to convey to a user the tokenized tokens that the user owns. Additionally, in some embodiments, the visual indicia may be used to transfer tokenized tokens to other parties (e.g., via text message, messaging applications, email, and the like), as is described elsewhere in the disclosure.

In some embodiments, the ledger bridging system 416 may instantiate (or request the instantiation of) a smart contract corresponding to the tokenized token as part of the minting process. In these embodiments, the smart contract may define one or more base functionalities that govern the tokenized token lifecycle mechanisms such as ownership transfer and/or redemption logic. The base functionalities may include the ability to change ownership of the tokenized token, the types of transactions in which the tokenized token may be used (e.g., to make purchases, to gift, to exchange, to redeem for cash, etc.), and the like. Upon a new tokenized token being minted, the ledger bridging system 416 may instantiate an instance of the smart contract corresponding to the newly minted tokenized token. The instance of the smart contract may execute each time the tokenized token is involved in a transfer (e.g., exchanged, gifted, or redeemed). For example, each time an owner of the tokenized token requests to transfer the tokenized token, the instance of the smart contract may be implicated by the request and the instance of the smart contract can either disallow or facilitate the transfer depending on the contents of the request and the smart contract.

Once a tokenized token is minted, the funds represented by the tokenized token may be "escrowed" by the ledger bridging system 416. In this way, the user is prevented from removing funds from his or her account until the tokenized token is redeemed. In some embodiments, the ledger bridging system 416 may transfer the funds corresponding to the tokenized token from the account of the user to a designated escrow account. Alternatively, the ledger bridging system 416 may freeze the funds corresponding to the tokenized token, such that the funds may not be transferred by the user until the tokenized token is redeemed. Once a tokenized token is redeemed, the funds represented by the tokenized token may be released from escrow, deposited into the account of the redeeming user, and the tokenized token may be destroyed (also referred to as being "invalidated").

In embodiments, the ledger bridging system 416 updates, or initiates the update of, the distributed ledger. The distributed ledger may be updated upon a number of different occurrences. As discussed, in embodiments, the distributed ledger may be updated when a user initially funds an account. In embodiments, the ledger bridging system 416 updates (or initiate the update of) the distributed ledger upon a new tokenized token being minted. In these embodiments, the distributed ledger is updated to reflect the existence of the new tokenized token and the ownership of the token. In embodiments, the ledger bridging system 416 updates (or initiate the update of) the distribute ledger with the instance of the smart contract corresponding to the tokenized token. In embodiments, the ledger bridging system 416 may update (or initiate the update of) the distributed ledger each time a tokenized token is transferred. In these embodiments, the distributed ledger may be updated to reflect the new owner of the tokenized token. In embodiments, the ledger bridging system 416 may update (or initiate the update of) the distributed ledger when a tokenized token when the token is redeemed and subsequently destroyed. In these embodiments, the distributed ledger may be updated to reflect that the tokenized token is no longer valid, the account that redeemed the token, and/or when the token was redeemed.

Figure 5:
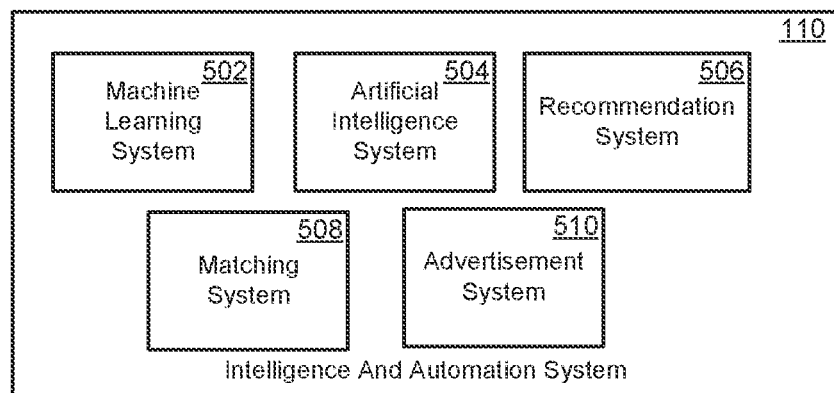
FIG. 5 is a schematic illustrating an example intelligence and automation system according to some embodiments of the present disclosure.

FIG. 5 illustrates the intelligence and automation system 110 according to some embodiments of the present disclosure. In embodiments, the platform includes an intelligence and automation system 110. The intelligence and automation system 110 may include a machine learning system 502, an artificial intelligence system 504, a recommendation engine 506, a service matching engine 508, an advertising system 508, and/or a notification system 510.

In embodiments, the machine learning system 502 may train machine-learning models based on training data. Examples of machine learned may include various types of neural networks, regression-based models, hidden Markov models, scoring models, and the like. The machine learning system 502 may train models in a supervised, semi-supervised, or unsupervised manner. Training can be done using training data, which may be collected or generated for training purposes. The machine learned models may be stored in a model datastore.

In an example, the machine learning system 502 may be configured to train a gift prediction model. A gift prediction model (or prediction model) may be a model that receives recipient attributes (e.g., a profile relating to an intended recipient) and/or item attributes of one or more items that may be provided as a gift and that outputs one or more predictions regarding sending a gift token to that particular consumer. Examples of predictions may be whether to send a gift to that user, gifts the user would value, and the like. In embodiments, the machine learning system 502 trains a model based on training data. In embodiments, the machine learning system 502 may receive vectors containing user data (e.g., transaction history, preferences, wish list virtual assets, and the like), virtual asset data (e.g., price, color, fabric, and the like), and outcomes (e.g., redemption, exchanges, and the like). Each vector may correspond to a respective outcome and the attributes of the respective user and respective item. The machine learning system 502 takes in the vectors and generates predictive model based thereon.

In embodiments, the machine learning system 502 trains risk scoring models using training data sets that indicate the features of users participating in a transaction, features of the transaction (e.g., the type of transaction (e.g., purchase, loan, sale, etc.), the size of the transaction (e.g., a dollar amount), and the like), and an outcome of the transaction indicating whether the transaction was successful or unsuccessful (e.g., did the buyer pay for the item after purchase, did the borrower pay the loan off or default on the loan, was the purchased item delivered and in sufficient condition, etc.). The training data sets may be based on transactions facilitated by the platform and/or generated by an expert.

In embodiments, the machine learning system 502 may store the predictive models in a model datastore. In embodiments, the machine learning system 502 may be further configured to update a model based on captured outcomes, which is also referred to as "reinforcement learning." In embodiments, the machine learning system may receive a set of circumstances that led to a prediction (e.g., item attributes and user attributes) and an outcome related to the treatment (e.g., redemption of item, exchange of item, refund of an item), and may update the model according to the feedback. As used herein, the machine learning techniques that may be leveraged by the machine learning system include, but are not limited to, decision trees, K-nearest neighbor, linear regression, K-means clustering, deep learning neural networks, random forest, logistic regression, Naïve Bayes, learning vector quantization, support vector machines, linear discriminant analysis, boosting, principal component analysis, and hybrid approaches.

In embodiments, the artificial intelligence (AI) system 504 leverages the machine-learned models to make predictions or classifications regarding purchasing, gifting, or other e-commerce outcomes with respect to user data and asset data. Examples of predictions include whether a user will purchase an item, whether a user will exchange a gifted item, redemption options such as delivery timing and delivery location, and the like. For example, the AI system 504 may leverage a gift prediction model to make predictions as to whether a recipient of a particular item will like a gift, return a gift, or exchange a gift.

In embodiments, the recommendation system 506 may be configured to provide recommendations to users regarding items. The recommendation system 506 may request a recommendation from the AI system 504 based on attributes of a user. The AI system 504 may output a set of recommendations and the recommendation system 506 may provide the recommendations to the user or another party. For example, the recommendation system 506 may provide users with recommendations of items to purchase based on a purchase history of the user.

In embodiments, an advertising system 508 is configured to determine advertisements to display to a user, where the advertisements relate to items that are offered for transaction on the platform. In embodiments, the advertising system 508 may present users with discounts, promotions, and the like.

In embodiments, a services-matching system 510 is configured to match consumers to service providers for user-selected services. In these embodiments, a user may be seeking service, and the service matching system 510 may identify service providers that are best suited to provide the service. For example, the services matching system 510 may match service seekers and service providers based on pricing, availability, location, and the like.

Figure 6:
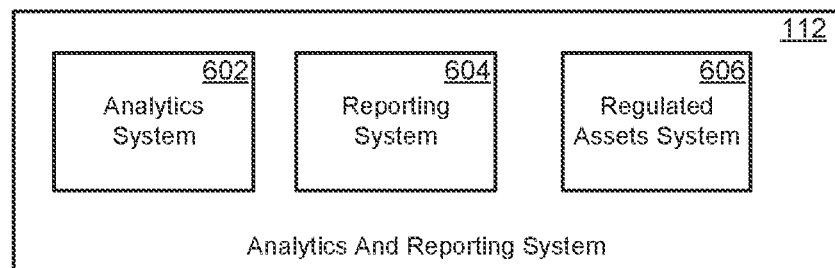
FIG. 6 is a schematic illustrating an example analytics and reporting system according to some embodiments of the present disclosure.

FIG. 6 illustrates the intelligence and automation system 110 according to some embodiments of the present disclosure. In embodiments, the analytics and reporting system 112 is configured to capture and report analytics relating to various aspects of the e-commerce platform 100. In embodiments, the analytics and reporting system 112 may include an analytics system 602, a reporting system 604, and/or a regulated asset system 606. In embodiments, the analytics and reporting system 112 may provide an analytics interface that allows a user to access the analytics and reporting system 112.

In embodiments, the analytics system 602 may track and analyze data relating to, but not limited to, consumer data, item data, merchant, manufacturer, or provider data; user behavior (e.g., purchase behavior, telemetric, and the like), and transaction events (e.g., when items are purchased, how items are purchased, how items are transferred, and the like).

In embodiments, the reporting system 604 reports analytics gained by the analytics system 602 to one or more parties. Interested parties may access the reporting system 604 and/or may subscribe to receive analytics reports. The reporting system 604 may be configured to generate reports based on the gathered analytics and to provide the reports to interested parties. In embodiments, a regulatory GUI may then allow regulators to access the platform 100. For example, a regulator may access the platform to track and monitor a regulated item, such as 3D printed firearms.

In embodiments, the analytics and reporting system 112 includes a regulated asset system 606. In embodiments, the regulated asset system 606 is configured to manage regulated items. For example, the regulated asset system 606 may manage access to weapons or firearms, pharmaceuticals, alcohol, tobacco products, food products, event/venue entry, airline tickets, and the like. In embodiments, the regulated asset system 606 may track and monitor transactions regarding regulated items and may notify certain regulatory agencies based on the transactions and a corresponding workflow. In a non-limiting example, a token could be used to track a 3D printed firearm, where the item that is purchased would be the model used to print the firearm.

Referring back to FIG. 1, in embodiments, the platform 100 includes a virtual world presence system 114 for representing tokenized physical world items within virtual world environments. In some embodiments, the virtual world environments may depict virtual world avatars. Virtual world avatars may represent a user (e.g., a potential buyer) and may interact with virtual items in a virtual world environment. Users may "shop" by controlling a virtual world avatar in a virtual world store. For example, a virtual world avatar may try on a virtual representation of a tokenized physical world hat in a virtual world dressing room. In some embodiments, the virtual world presence system may include a virtual reality system that provides a framework for displaying the virtual world environment. In embodiments, the virtual world presence system may also include a virtual asset display system that displays items related to a user, including but not limited to: items that are owned by the user, in the custody of the user, desired by the user, and the like. These items can be displayed publicly to other users or hidden from other users, individually or collectively. In some embodiments, the virtual asset display system may determine the set of tokens owned by a user to determine the items that are owned or possessed by a user.

In embodiments, the virtual world presence system 114 may include a content sharing system that allows sharing of content related to virtual assets to content platforms. The content sharing system enables users to share content related to virtual assets owned by a user or in custody of user or desired by user. Users may obtain additional information about a virtual asset or request to purchase, rent, borrow, trade, or the like. The shared content may include data from the virtual world presence system. For example, a user may share a video of the user's associated virtual world avatar eating a virtual pizza in a virtual pizza parlor.

Figure 8:
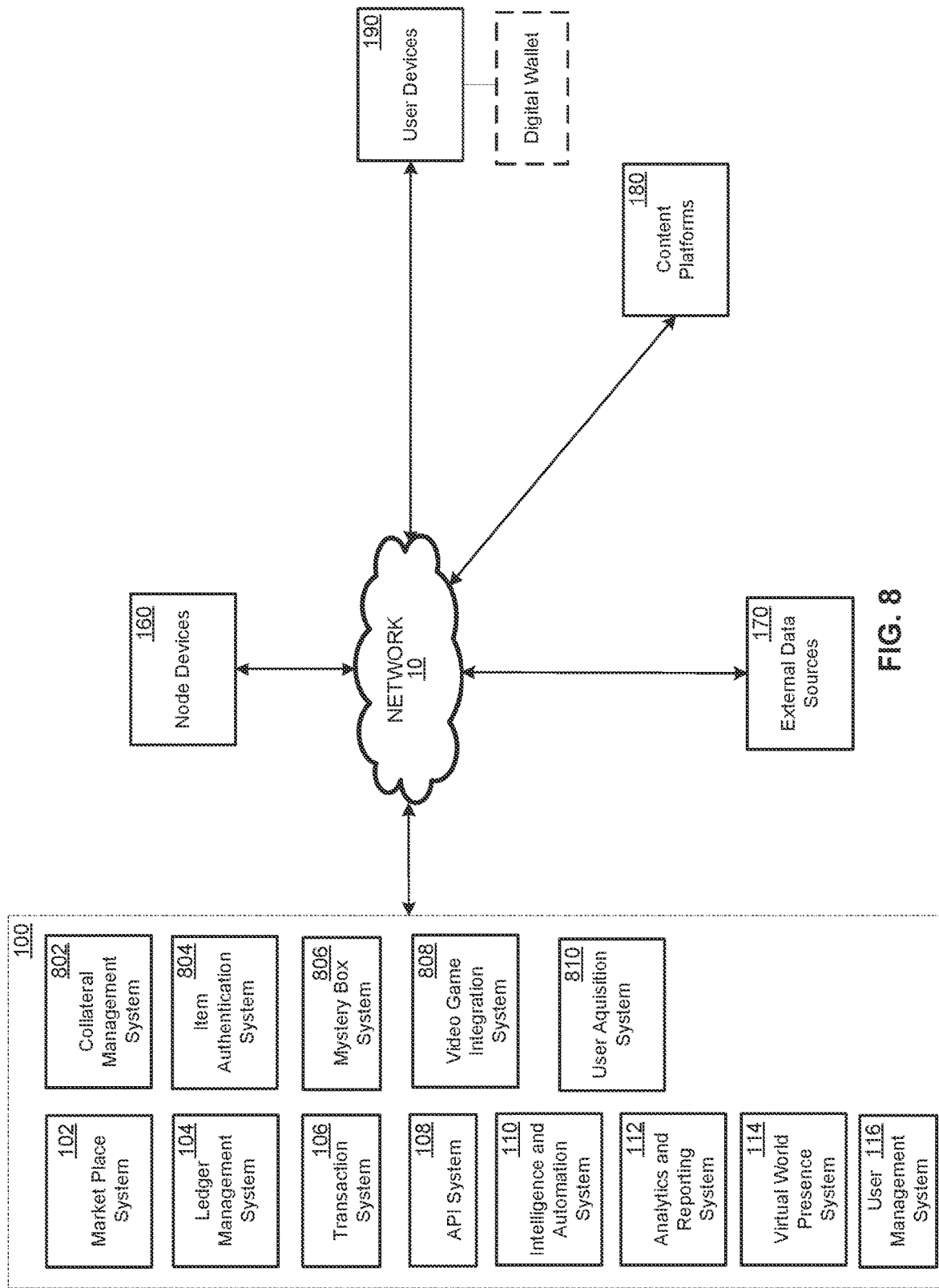
FIG. 8 is a schematic illustrating an example set of components of a tokenization platform according to some embodiments of the present disclosure.

Referring now to FIG. 8, the tokenization platform 100 may support a number of different applications and/or provide a number of different services. For example, the platform 100 may support collateralized lending applications, authentication services, "mystery box" applications, casino-gaming services, and video game streaming services.

In embodiments, the platform 100 includes a collateral management system 802. The collateral management system 802 allows a borrower to provide collateral and request a loan. In some of these embodiments, a user wishing to borrow money can take a collateral item (e.g., a collectible item, jewelry, a firearm, a precious metal, or the like) to a facility affiliated or otherwise supported by the platform 100. At the facility, an employee at the facility may inventory the collateral item using an interface provided by the collateral management system 802. Inventorying the collateral item may include requesting an item identifier for the collateral item, associating the item identifier collateral item with an account of the user (i.e., the owner of the collateral item), taking high resolution photographs of the collateral item, weighting the collateral item using a scale, entering a description of the collateral item, an appraisal of the collateral item, and the like. Once inventoried, the collateral management system 802 can create a virtual item representing the collateral item, and then may generate a non-fungible token corresponding to the virtual item (which may be referred to as a "collateral token"). For example, the collateral management system 802 may request the generation of the virtual item and the collateral token from the ledger management system 104. Upon the collateral token being generated, the ledger management system 104 may update the distributed ledger to reflect the new collateral token and the ownership of the collateral token by the borrower. The collateral token may then appear in a digital wallet of the borrower. In some embodiments, the collateral token may be represented by a visual indicium in the digital wallet. The collateral item corresponding to the collateral token may be stored at the facility until the collateral token is redeemed. Once redeemed, the redeeming user (the borrower or a transferee of the collateral token) may pick up the collateral item from the facility or the collateral item may be shipped to thereto.

In embodiments, the collateral management system 802 may allow a borrower to seek a loan using the collateral token. In embodiments, the collateral management system 802 may provide a marketplace (e.g., that is accessible via a graphical user interface) where the borrower can request a loan amount and offer the collateral token as collateral. Lenders (who have accounts with the tokenization platform 100) may then make loan offers to the borrower via the marketplace. The loan offers may specify a loan amount, an interest rate, and a loan length. The loan offers may include additional conditions as well. For example, a loan offer may indicate whether the loan can be bought out by another lender, and if so, a payoff amount to buy the loan. The borrower may shop through the loan offers and may ultimately decide on a loan offer to accept.

Once the borrower accepts an offer, the collateral management system 802 may instantiate an instance of a smart contract that memorializes the term of the loan and may escrow the collateral token (e.g., no one can redeem the collateral token or transfer the collateral token without complying with the smart contract). The smart contract may indicate the lender, the borrower, the collateral token, the loan amount, a payment schedule, whether the loan is transferrable, when the loan is considered to be in default, ownership rights of the collateral token upon default, and the like. The ledger management system 104 may update the distributed ledger to reflect the smart contract.

Once the instance of the smart contract is instantiated, the borrower must commence repayment of the loan according to the loan schedule. It is appreciated that the loan schedule may require a single lump sum payment by a given time or may require multiple payments that are to be made at predetermined intervals. In embodiments, the borrower may make payments to the lender via his or her digital wallet. In these embodiments, the borrower may transfer funds from a bank, credit card, a digital wallet holding other currencies, or the like. The borrower may then transfer those funds to the lender via the digital wallet. In some embodiments, the ledger bridging system 416 facilitates the transfer of funds from the account of the borrower to an account of the lender.

In embodiments, the collateral management system 802 may deploy a listening thread corresponding to an instance of a smart contract governing a loan. A listening thread may listen for payments by the borrower defined in the instance of the smart contract. When a payment is made, the listening thread may notify the ledger management system 104, which updates the distributed ledger to reflect the payment. During this update, the instance of the smart contract is notified of the payment, which may cause the smart contract to determine whether the loan is fully repaid. If the loan is fully repaid, the smart contract releases the collateral token to the borrower, bringing the smart contract to a close. If the loan amount is not repaid, the terms of the smart contract (e.g., the loan amount and the next repayment) may be updated based on the payment. If the listening thread does not detect a receipt of a payment before the payment due date, the listening thread may notify the ledger management system 104 of the missed payment. In response to the notification, the ledger management system 104 may update the distributed ledger to reflect the non-payment, which may cause the smart contract to determine whether the loan is in default according to the terms of the contract. If the loan is determined to be in default, then the smart contract transfers ownership of the collateral token to the party specified by the smart contract (e.g., the lender). Once this occurs, the lender may redeem the collateral token, sell the collateral token, gift the collateral token, or exchange the collateral token, as the lender is now the owner of the collateral token.

In embodiments, the collateral management system 802 may provide a marketplace for loans that may be bought or transferred. The marketplace may present the amount due on a loan, the value of the loan (e.g., the amount that is to be collected when fully paid off), the payment history of the loan (e.g., whether the borrower is making or missing payments), the collateral item that secures the loan, the price to purchase the loan, and the like. In some embodiments, potential lenders may opt to purchase the loan from the current lender. In these embodiments, the purchase of the loan causes the collateral management system 802 to terminate the current smart contract and to instantiate a new smart contract to reflect the new owner or to adjust the smart contract, such that payments will be directed to an account of the new lender and to designate the new lender as the destination of the collateral token should the borrower default. Additionally, or alternatively, the borrower may seek better terms on a loan using the marketplace. Assuming a loan is transferrable, the borrower may list the loan on the marketplace whereby potential lenders can view the borrower's payment history, the remaining balance on the loan, the loan payoff amount, and the collateral item. Potential lenders may then make loan offers to the borrower with each loan offer having its terms. The borrower can accept a loan offer. In response to the borrower accepting the loan offer, the new lender must transfer the loan payoff amount to the previous lender, which causes the collateral management system 802 to terminate the current smart contract and to instantiate a new instance of a smart contract in accordance with the newly accepted terms of the loan offer.

In embodiments, the platform 100 includes an authentication system 804. The authentication system 804 may provide authentication and/or appraisal services on behalf of the platform 100. For example, the authentication system 804 may be used to authenticate an item that is offered for sale or provided for collateral. Additionally, or alternatively, the authentication system 804 may be used to obtain an appraisal of an item that is offered for sale or provided for collateral.

In some embodiments, the authentication system 804 presents a portal that allows a user (e.g., a seller or an employee of a facility that holds items) to upload a virtual representation of an item. The user may provide an item classification (e.g., a baseball card, vintage clothing, jewelry, artwork, or the like), and one or more of: one or more high resolution photographs of the virtual item; a 3D representation of the item; dimensions of the item; a weight of the item; and/or the like. The authentication system 804 may allow domain-specific experts to sign up as authenticators/appraisers, such that a domain-specific expert can authenticate and/or appraise items classified in the area of their expertise. For example, sports memorabilia experts may be allowed to authenticate baseball cards and memorabilia, but not jewelry or artwork. In some embodiments, authenticators may be rated within their area of expertise and for sub-domains within their area of expertise (e.g., within the general category of sports memorabilia, an expert can be rated with respect to their knowledge on baseball memorabilia, basketball memorabilia, football memorabilia, and the like). When a new item is entered into the portal, the domain-specific experts can bid on the appraisal/authentication job, whereby the bid indicates the terms (e.g., price) under which the expert will perform the appraisal/authentication job. A user may then select the one or more of the experts based on their respective bids and/or their ratings. Alternatively, the authentication system 804 may select the one or more of the experts based on their respective bids and/or their ratings. Once an expert wins a bid, the expert performs the authentication and/or appraisal based on the information uploaded by the user (e.g., one or more high resolution photographs of the virtual item, a 3D representation of the item, dimensions of the item, a weight of the item, and/or the like). The expert may provide an appraisal value and/or a determination indicating the authenticity of the item. The authentication system 804 may include the expert's appraisal and/or authenticity determination in the virtual representation of the virtual item and, in some embodiments, the authentication system 804 may update the distributed ledger with the expert's appraisal and/or authenticity determination. As can be appreciated, the appraisal and/or the authenticity determination may result in an item being kept on or removed from the platform, or may impact the ability to collateralize a loan using the item.

In some embodiments, the authentication system 804 requires an expert to provide appraisal/authentication notes that indicate the reasons for the expert's determination. In providing an appraisal and/or providing a determination of authenticity, the expert provides one or more reasons for his or her findings. For example, in opining that a particular shoe is a knockoff, an expert may indicate in the notes that the stitching of the shoe is indicative of a knockoff. The authentication system 804 may include the expert's appraisal/authenticity notes in the virtual representation of the virtual item and, in some embodiments, the authentication system 804 may update the distributed ledger with the expert's appraisal/authenticity notes.

In embodiments, the expert authentication determinations, as well as authentication notes may be used by the machine learning system 802 (FIG. 5) to train one or more models that can determine whether an item is likely a fake. In these embodiments, the models can be trained on images, weights, dimensions, and/or other features of items that were deemed to be fake. The authentication system 804 may leverage these models (via the artificial intelligence system 804) to determine whether a new item is likely fake. If the model classifies the item as being likely fake, the authentication system 804 may include the determination in the virtual representation of the virtual item and, in some embodiments, the authentication system 804 may update the distributed ledger with the determination that the item is likely fake. If the model is unable to classify the item as likely being fake, the authentication system 804 may list the item on the portal, such that experts may assess the item's authenticity. It is noted that in embodiments, a model can classify an item as likely being fake, but only an expert may authenticate the item, as counterfeiters may adapt and improve the quality of the counterfeit items to trick the models into issuing false authentications.

In embodiments, the tokenization platform 100 includes a mystery box system 806 that supports a mystery box game. In embodiments, a "mystery box" may refer to a set of tokens that potentially can be won by a player, where each token represents a different item that can be redeemed using a token. In embodiments, each token may have a different probability of being selected. In some embodiments, each token may be assigned a range of numbers, where the range of numbers for each token reflects the probability of being won by a player. For example, if there are three tokens, where the first token has a 10% chance of being won, the second token has a 20% chance of being won, and the third token has a 30% chance of being won, and there is a 40% chance of no token being won, the first token may be assigned 1-10, the second token may be assigned 11-30, and the third token may be assigned 31-60. In this example, the range of values that may be selected would be 1-100. A player may pay for a chance to win an item in the mystery box. In some embodiments, the odds of winning each token, and the item represented by the token, are depicted in relation to the mystery box. In this way, players are informed on their chances of winning the various items.

In response to the receiving payment from the player, the mystery box system 806 may generate a random number that is bound by the overall range of values for the box (e.g. 1-100). The mystery box system 806 may then determine which token, if any, was won by the player based on the random number. For example, a mystery box may be jewelry-themed, whereby the mystery box includes a first token representing a diamond ring, a second token representing a cubic zirconium ring, and eight tokens, each representing a $25 gift card that can be spent at a specific jewelry shop (e.g., the jewelry shop that provided the rings). In this example, the first token may have a. 1% chance of being won, the second token may have a 4.9% chance of being won, and the gift cards may each have a 10% chance of being won, whereby there is a 15% chance that the player will not win a prize. In this example, the range of numbers may be 1-1000, where the first token corresponds to the number 1, the second token corresponds to the range of 2-50, and the third through eighth tokens have a collective range from 51-850. In this example, the price to play may be set by the jewelry shop, such that the gift cards may be considered a mechanism to drive traffic to the jewelry shop. It is noted that in the foregoing example, the range of tokens are sequential, however the ranges do not need to be sequential and can be slotted in any suitable manner.

In embodiments, the mystery box system 806, in response to a player winning a prize from the mystery box, may transfer the token to an account of the winning player. In these embodiments, the won token may appear in the digital wallet of the player. Alternatively, the mystery box system 806 may deliver the won token to the user via an electronic message (e.g., a text message, a messaging app message, an email, or the like). As will be discussed below, in some embodiments, the mystery box system 806 provides service to brick-and-mortar casinos, such that the mystery box game is implemented in a physical device. In these embodiments, the mystery box system 806 may print out a ticket that has a token identifier of the won ticket (e.g., a QR code).

In embodiments, the mystery box system 806 may allow players to select a mystery box to play from a plurality of available mystery boxes, where each mystery box may have a respective theme. For example, a first mystery box may be art themed such that the mystery box contains tokens corresponding to art-related items (e.g., arts of work, art related products, services relating to art (e.g., a commissioned painting by an artist), and the like); a second box may be entertainment themed, where the second box may contain tokens corresponding to a movie and television-related items (e.g., memorabilia items from popular movies and/or TV shows, DVDs or download codes for movies and/or TV shows, gift certificates to movie theaters, and the like); a third box may be sports themed, where the third box may contain tokens corresponding to sports-related items that correspond to a particular team (e.g., game worn apparel, tickets to games, replica apparel, team apparel, and the like); a fourth box may be gaming themed, where the fourth box may contain tokens corresponding to gaming-related items (e.g., video game systems, video games, gift certificates, upgrades for characters of a particular game, and the like); a fifth box may be music-themed, where the box may contain tokens relating to items that correspond to a particular band or artist (e.g., a signed show poster, memorabilia from the band or artist, tickets to a show, download codes for an album or song, and the like); and so forth. In this way, players may select to play for prizes that are enticing to them.

In embodiments, a mystery box may contain tokens corresponding to replenishable items and/or non-replenishable items. Replenishable items are items that can be replenished in the mystery box when a player wins a token representing the item. For example, gift certificates, movie tickets, sports game tickets, DVDs, electronics, video games, replica jerseys, and most clothing items are replenishable, while items such as watches, high-end jewelry, game-worn sports apparel, signed memorabilia, limited edition shoes, original artwork, are examples of non-replenishable items. In some embodiments, the party offering the mystery box may designate replacement items of similar value for the non-replenishable items in a mystery box, such that when a non-replenishable item is won from the mystery box, it may be replaced by one of the designated replacement items. In some of these embodiments, a mystery box may be arranged according to a "recipe." A recipe designates two or more tiers of items in the mystery box, and for each tier the odds for winning an item from the tier. In these embodiments, the provider of the mystery box may provide a list of items that belong to each tier. For example, the highest tier (e.g., the tier with the lowest odds) may include the high-value non-replenishable items, while the lower tiers may include various levels of replenishable items. Each item in the recipe may be tokenized, such that the tokens are reserved for use in the mystery box. Each time an item from a tier is won by a player, the mystery box system 806 may replace the token representing the item with another token from the same tier as the won token. In this way, the price to play the mystery box and the odds associated with each item in the mystery box do not change when a non-replenishable item is won from the mystery box.

In embodiments, each mystery box is governed by a smart contract. The smart contract may define the different items or tiers of items, and for each respective item or tier of items, odds for winning the respective item. When a new mystery box is created, the mystery box system 806 may instantiate a new smart contract corresponding to the new mystery box. The instance of the smart contract may define the items or tiers of items of the new mystery box, the odds for each item (or tier of items), the token identifiers of each of items in the mystery box (or replacement items that can be included in the mystery box), and a price to play the mystery box. In embodiments where items are not replaced in a mystery box, the smart contract may further define the manner by which the odds of items or the price of the game may be adjusted when certain items are exhausted. For example, if the highest value item in the mystery box is won, the price to play the game may be lowered and/or the odds of winning the remaining items may be adjusted.

The mystery box system 806 may serve the mystery box game in a variety of different manners. In embodiments, the mystery box system 806 may serve the mystery box game via the tokenization platform 100, whereby users of the tokenization platform 100 may play the mystery box game on a website or application provided by the tokenization platform 100. Additionally, or alternatively, the mystery box system 806 may serve the mystery box game to users via a third-party website or application. In these embodiments, the third-party website or application may access the mystery box system 806 via the API system 108 of the tokenization platform 100.

In some embodiments, the mystery box system 806 may support casino-style machines, whereby players can play the mystery box game on a physical machine located at, for example, a casino or any other suitable brick-and-mortar location. In these embodiments, the items may be located at the brick-and-mortar location where the physical device is located, such that when a player wins an item from the mystery box, the player may redeem the token at the brick-and-mortar location. In these embodiments, the tokenization platform 100 includes the mystery box system 806 that supports mystery box games that are played at the brick-and-mortar locations. In these embodiments, the mystery box system 806 may provide an API that allows network-connected physical gaming devices to communicate with the tokenization platform 100. The mystery box system 806 may serve the mystery box game to the physical gaming devices via the API system 108. In embodiments, the mystery box system 806 may provide token identifiers of won tickets, such that the physical gaming devices may print a ticket that indicates the won token. In some embodiments, the ticket may include a QR-code that indicates the won token.

In embodiments, the player may redeem a ticket indicating a won token at the brick-and-mortar location. In these embodiments, the brick-and-mortar location may include scanning devices that scan the tickets and communicates the token identifier of the won token to the casino gaming system. In response to receiving the token identifier of the won token, the mystery box system 806 may redeem the won token on behalf of the player and may communicate a verification of the redemption of the won token to the scanning device. An employee using the scanning device may then provide the item won by the player to the player. Alternatively, the player may add the won token to a user account of the player. In these embodiments, the player may scan the ticket (e.g., the QR-code). In response to the player scanning the ticket, the mystery box system 806 may facilitate the transfer of the token to an account of the player, whereby the ticket may appear in the player's digital wallet. Once this occurs, the player may redeem, sell, gift, collateralize, or otherwise transact with the token.

In embodiments, the tokenization platform 100 includes a video game integration system 808. The video game integration system 808 allows video game makers to place tokens in video games, such that games playing a video game may be able to find, buy, trade, or otherwise interact with tokens in the video game. In embodiments, a video game maker may access an API of the tokenization platform platform 100 via the API system 108, such that instances of a video game may request certain tokens or types of tokens from the tokenization platform 100. In response to the request, the video game integration system 808 may serve a token to the instance of the video game. The tokens may be fungible or non-fungible. In the latter case, a token may be obtained, purchased, or otherwise transacted for by multiple video games. In the case of a non-fungible token, the first user to transact for the token is the owner of the token. In response to a user transacting for a token, the video game integration system 808 may update the distributed ledger to reflect the new ownership of the token.

In some example embodiments, a video game maker may allow third-parties to advertise items for sale in a video game, whereby a user may purchase an item by selecting an icon (or other visual indicia) displayed in the video game that represents a token corresponding to the item. For example, an advertiser representing a pizza delivery chain may wish to offer pizza delivery to gamers in a specific location. In this example, instances of the video game may request food-related tokens from the video game integration system 808, whereby each request indicates a location of the device executing the respective instance of the video game. The video game integration system 808 may identify tokens corresponding to food items that can be delivered to a location where a respective instance of the video game is being executed. For example, the video game integration system 808 may identify tokens having associated metadata that indicates a delivery radius that includes a location indicated in the request. In response to the request, the video game integration system 808 serves the identified token to the requesting instance of the video game. A visual indicium representing the token may then be displayed by the instance of the video game, whereby a user (i.e., video game player) may opt to transact for the token. Upon a user transacting for ownership of the token, the video game integration system 808 updates the ownership data of the token to reflect that it is owned by the user. In scenarios where delivery information or other logistical information are needed, the instance of the video game and/or the user can provide those details at the time of transaction or the user can provide the required information to complete the transaction. For example, if the user elects to buy a pizza token from a pizza delivery chain, the instance of the video game and/or the user may provide the address to where the pizza will be delivered. The user, via the instance of the video game, may also provide details such as toppings for the pizza.

In some example embodiments, the video game maker may allow an item represented by a token to be both used in the digital environment of the video game and to be redeemed in "real-life." In these embodiments, the video game maker may include specific fungible or non-fungible tokens in the video game, whereby users can find, buy, trade for, or otherwise transact for the tokens appearing in the video game. Once a token appearing in a video game is transacted for, the video game integration system 808 may update the ownership data of the transacted for the token to reflect that the user is the owner of the token. A visual indicium of the token may appear in a video game instance corresponding to the user and/or in a digital wallet of the user. Once owned by the user, the user may use the token in the video game and may subsequently redeem the token to receive the physical item represented by the token. For example, in a role-playing game a token may represent a pair of earrings that give the player of the video game a special power (e.g., invisibility). The user may use the earrings in the game to enjoy the special power or may redeem the earrings. In the latter scenario, the earrings may be shipped to the user, such that the earrings may be physically worn by the user, but are no longer able to be used in the video game. In some of these embodiments, the video game maker may allow the user to transact the tokens. For example, the owner of a token may trade or sell the token for a token corresponding to another item. Each time the ownership is changed, the video game integration system 808 may update the distributed ledger to reflect the change in ownership. Once a user no longer owns a token, the user cannot use or redeem the item indicated by the token. In some embodiments, the video game may allow the user to return the item to a verified location (e.g., storage warehouse), whereby once the item is authenticated the user may then use the digital representation of the item in the video game once again.

The video game integration system 808 may allow video game makers to integrate tokens into their video games in additional or alternative manners. For example, video game makers may use tokens as "Easter eggs" or prizes that may be won by players as they uncover the tokens. In another example, a video game maker may integrate one or more mystery boxes in a video game. In another example, users may create digital items within the construct of a video game, such that the digital items may be tokenized and transacted for (e.g., traded, gifted, sold, etc.).

In embodiments, the tokenization platform 100 includes a user acquisition system 810. In embodiments, the user acquisition system 810 provides mechanisms that facilitate the promotion of the tokenization platform, and particularly, the enlisting of new users. In some embodiments, the user acquisition system 810 provides each existing user with a unique referral code that each respective user can share with his or her friends, social media followers, contacts, or the like. In addition, the user acquisition system 810 may provide an incentive to each existing user, whereby the incentive indicates a reward for each new user or number of users (e.g., three users) that sign up for an account. The incentive may be any form of payment, including currency (e.g., traditional currency or cryptocurrency), gift cards, physical items, digital items, and the like. In some embodiments, the reward is provided as a tokenized token, whereby the tokenized token represents a set amount of currency. In embodiments, the user acquisition system 810 may provide different incentives to different users. In some embodiments, the incentive may be determined based on the potential reach of each respective user. For example, users that have significant reach (e.g., social media influencers, celebrities, etc.) may be given greater incentive than users with relatively little reach. In some embodiments, the incentive may be determined based on the interests of each respective user. For example, a first user that is interested in golf may be incentivized with golf-related items or gift certificates, while a second user that is interested in art may be incentivized with art-related items or gift certificates. In some embodiments, the user acquisition system 810 codifies the incentive for each user in a respective instance of a smart contract. In some of these embodiments, the smart contract instance governs the incentives/rewards of a user is associated with the referral code of the user and/or the public address of the user. When the referral code of the user is successfully used to enlist a new account, the smart contract may facilitate the transfer of a token representing the reward to an account of the referring user.

Each time a new user enlists for an account using a referral code, the user acquisition system 810 determines whether the new user is legitimate (e.g., not a bot, not a fraudulent account, etc.). Assuming the new user is granted an account (e.g., there is not detected fraud), the user acquisition system 810 determines the user account associated with the referral code. In some embodiments, the user acquisition system 810 determines a smart contract associated with the user account and/or the referral code. The user acquisition system 810 may provide a notification to the smart contract associated with the user account and/or the referral code of a new account. The smart contract may then initiate the transfer of the token representing the reward to an account of the user.

In embodiments, the user acquisition system 810 may perform these services for third-party customers. In these embodiments, a third-party customer may provide rewards (e.g., cash, cryptocurrency, gift cards, physical items, etc.) to a trusted third-party holder (e.g., the tokenization platform or another trusted holder). The rewards may then be tokenized and held in escrow. The third-party may further define the parameters governing the rewards (e.g., how much incentive to award, who may be a promoter, etc.). The user acquisition system 810 may generate a smart contract on behalf of the third-party customer. When a user requests a referral code, the user acquisition system 810 may generate an instance of the smart contract on behalf of the customer and may associate the instance of the smart contract with the account of the user. When the user successfully refers a buyer to the customer using a referral code, the user acquisition system 810 (and/or the instance of the smart contract) may transfer a token representing the reward to an account of the referring user.

To further describe some embodiments in greater detail, reference is next made to examples of techniques which may be performed by or in connection with ecommerce systems, for example, platform 100. The techniques include technique 900 of FIG. 9, 1000 of FIG. 10, 1100 of FIG. 11, 1200 of FIG. 12, 1300 of FIG. 13, 1400 of FIG. 14, 1500 of FIG. 15, 1600 of FIG. 16, 1700 of FIG. 17, 1800 of FIG. 18, and 1900 of FIG. 19. Technique 900, technique 1000, technique 1100, technique 1200, technique 1300, technique 1400, technique 1500, technique 1600, technique 1700, technique 1800, and technique 1900 can be executed using computing devices, such as the systems, hardware, and software described herein. Technique 900, technique 1000, technique 1100, technique 1200, technique 1300, technique 1400, technique 1500, technique 1600, technique 1700, technique 1800, and technique 1900 can be performed, for example, by executing a machine-readable program or other computer-executable instructions, such as routines, instructions, programs, or other code. The steps, or operations, of technique 900, technique 1000, technique 1100, technique 1200, technique 1300, technique 1400, technique 1500, technique 1600, technique 1700, technique 1800, and technique 1900 or another technique, method, process, or algorithm described in connection with the embodiments disclosed herein, can be implemented directly in hardware, firmware, software executed by hardware, circuitry, or a combination thereof. For simplicity of explanation, 900, technique 1000, technique 1100, technique 1200, technique 1300, technique 1400, technique 1500, technique 1600, technique 1700, technique 1800, and/or technique 1900 are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Figure 9:
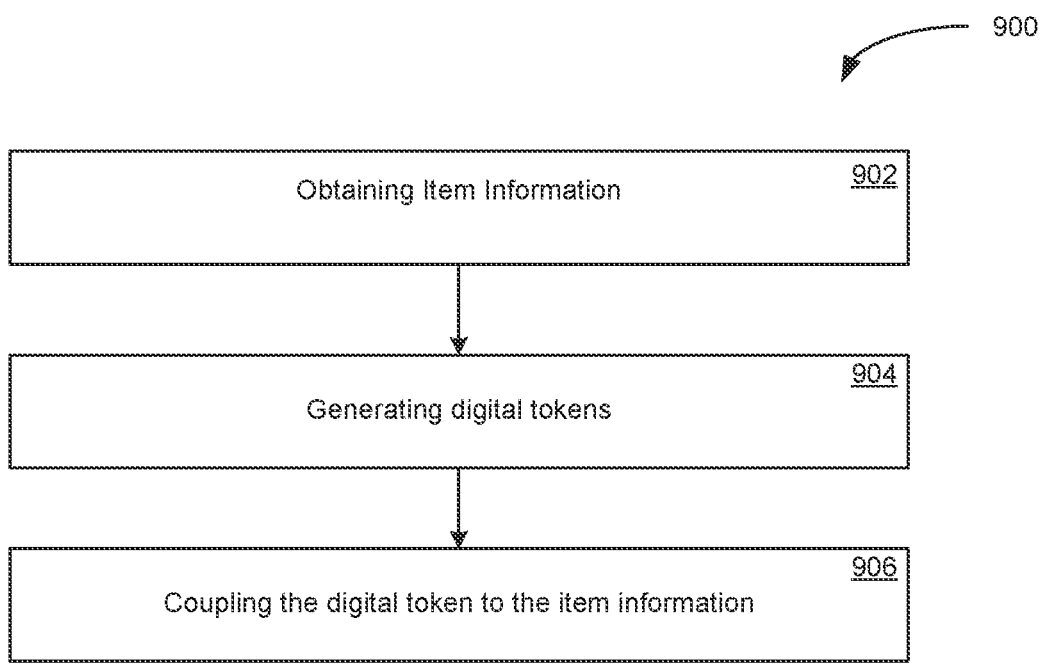
FIG. 9 is a flowchart showing a technique for according to some embodiments of the present disclosure.

FIG. 9 depicts a flowchart showing a technique 900 for tokenizing items according to some embodiments of the present disclosure. At 9002, item information is obtained. The item information may include a unique identifier for a unique unit of the item and a set of item attributes. In embodiments, a processing system of a tokenization platform obtains the information.

At 904, one or more digital tokens are generated. In embodiments, the digital tokens are unique digital tokens. Each unique digital token may include a set of digital attributes that correspond to the set of item attributes. In embodiments, N digital tokens are generated and linked to an item or virtual representation thereof. In embodiments, a token generation system generates the one or more digital tokens.

At 906, the digital token is coupled to the item information. In embodiments, a cryptographic link couples the digital token to the item information such that the digital token provides a representation of the item. For example, the digital token and the item may be unique such that the unique digital token and the unique identifier for the unique unit of the item are cryptographically linked to provide a unique digital representation of the unique unit of the item. In embodiments, a linking system, such as a module of the token generation system 302, couples the digital token to the item information.

In embodiments, tokens may be tokenized (e.g., when generating a token representing an amount of funds). For example, the item information may be funds within the platform 100 or from third-party sources. The tokenized token can be generated in response to validation of receipt of the funds, and the funds may be held from transaction by the user. In some embodiments, the funds remain publicly attributed to the user and the ledger is updated with a hold or lien recorded against the funds to prevent user transaction of the tokenized funds without approval by the platform 100. In some embodiments, the ledger is updated to reflect a transfer of the funds from the user to the platform 100. Beneficially, transferred funds may be tradeable by the platform 100 (e.g., for depositing or investment with third parties), and the tokenized tokens are redeemable for an equivalent amount of the original funds even if the redeemed funds are not the originally tokenized funds such that the tokenized token may be used by transactions within the platform 100 while the deposited funds may participate in economic transactions between the platform 100 and third parties.

Figure 10:
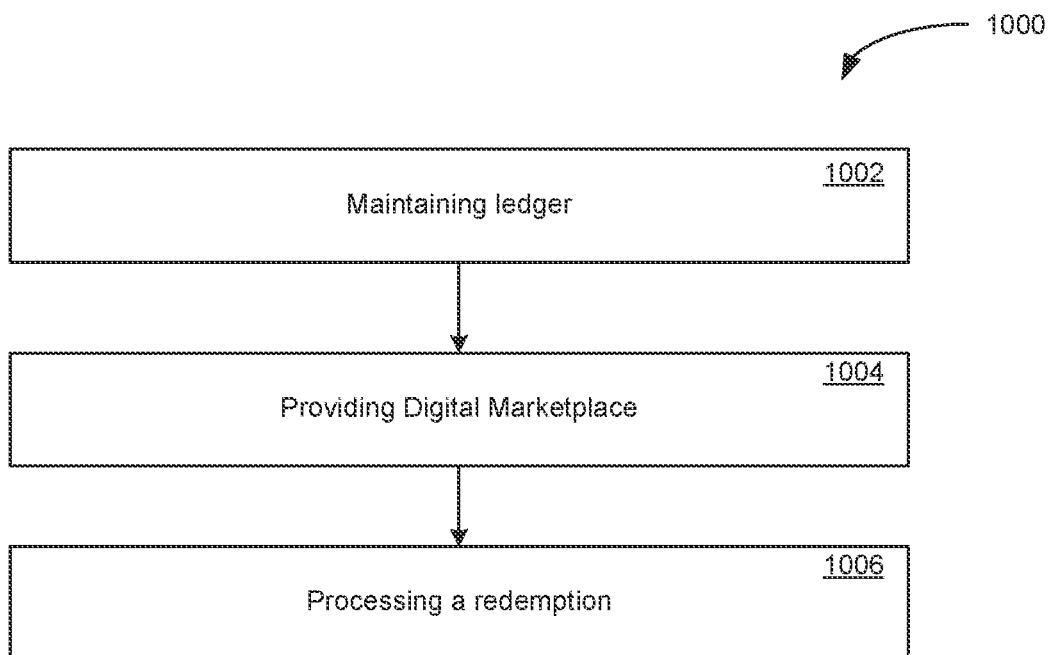
FIG. 10 is a flowchart showing a technique for according to some embodiments of the present disclosure.

FIG. 10 depicts a flowchart showing a technique 1000 for transferring tokens using a digital marketplace according to some embodiments of the present disclosure. At 1002, a ledger is maintained. The ledger stores a plurality of public addresses, a plurality of virtual representations of a plurality of respective items, and, for each virtual representation, a set of tokens, and ownership data of each respective token. The set of tokens respectively correspond to a respective instance of the item represented by the virtual representation. Further, each respective public address corresponds to a respective account of a respective user of the tokenization platform.

At 1004, a digital marketplace is provided. In embodiments, the digital marketplace provides a graphical user interface that allows consumers to view visualizations of virtual representations of items including the virtual representation of the item and transact for an instance of the item by purchasing a digital token of the N digital tokens. Upon a user purchasing a token, the ledger may be updated to reflect a change in ownership of the token from the seller of the token to the user. Once a user owns a token, the user may be allowed to transfer the token to another user, sell the token, use the token as collateral, and/or redeem the token.

At 1006, a redemption is processed in response to a user requesting redemption of the token. In embodiments, the redemption may begin by associating a specific token that corresponds to the virtual representation with an account of the transacting user. The association may be made in response to verifying the request to participate in the transaction. A transfer request is received requesting transfer of the specific token to a transferee. The transfer request includes a digital-token identifier that identifies the specific token and a public address of the different user. Further, the specific token is validated. The validation can be based on the digital-token identifier and the ledger. In the process, the account of the transferee on the platform 100 may be verified and/or validated based on the public address of the user and the ledger. Additionally, the ledger is updated with a block that includes ownership data and indicates that a specific token corresponding to the virtual representation is owned by the transacting user. In embodiments, the updating occurs in response to both validating the specific token and verifying the transferee. Yet further, a redemption request is received to redeem the digital token from a user device of the transferee, and a workflow is executed to satisfy the transaction for instance of the item corresponding to the token. The workflow may be initiated in response to receiving the redemption request.

Figure 11:
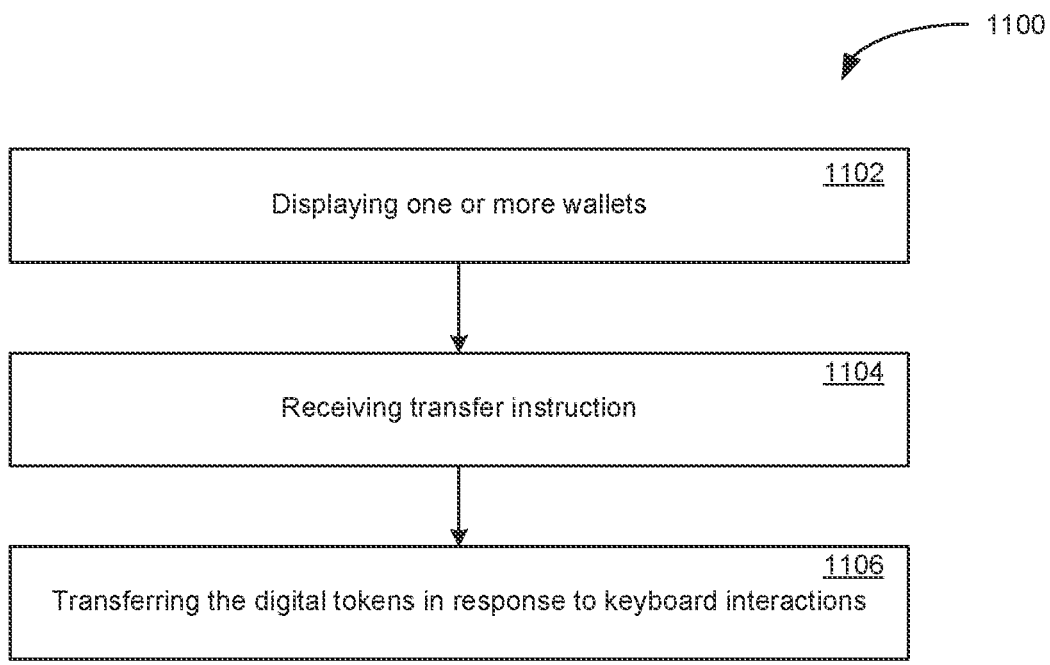
FIG. 11 is a flowchart showing a technique for according to some embodiments of the present disclosure.

FIG. 11 depicts a flowchart showing a technique 1100 for transferring tokens between wallets via a keyboard interaction according to some embodiments of the present disclosure. At 1102, one or more wallets are displayed. The display of the one or more wallets may include, for example, displaying a digital wallet graphical user interface via a user device of a user associated with the digital wallet. Additionally, an inventory of tokens that are owned by the user may be displayed by the digital wallet graphical user interface. In embodiments, each token corresponds to a respective item and may be redeemable by a user to satisfy a transaction for an instance of the respective item.

At 1104, transfer instructions are received. The transfer instruction may include indication of one or more digital tokens from the inventory of tokens and a recipient of the digital token. The transfer instructions can be received by the digital wallet graphical user interface.

At 1106, the digital tokens are transferred in response to keyboard interactions. In embodiments, a digital keyboard is displayed by the digital wallet graphical user interface. The digital keyboard includes a selectable media content that is representative of the item corresponding to the digital token within the transfer request. User input producing a text-based message including a selection of the selectable media content by the digital keyboard is received. For example, the user may type a message surrounding the transfer (e.g., "Please enjoy this gift from me) and may then select the selectable media content representing the token (e.g., an image of the item represented by the token) to create a message having the token embedded therein. The selectable media content includes the digital token/an identifier of the digital token (e.g., a hash value that uniquely identifies the digital token). The digital token (e.g., an identifier thereof) is embedded within the text-based message by the digital keyboard, and the digital wallet transmits the text-based message to a message account of the recipient. Upon receipt, the digital token is accepted into a respective digital wallet of the recipient in response to the recipient selecting the selectable media content.

Figure 12:
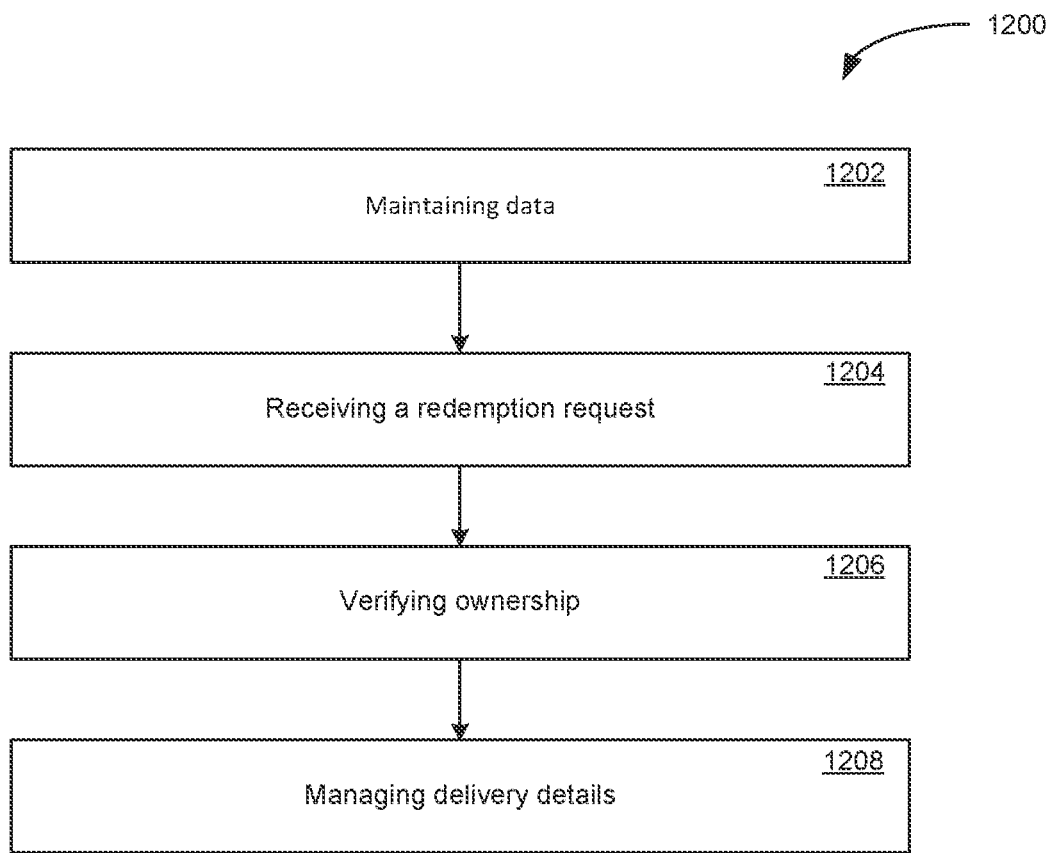
FIG. 12 is a flowchart showing a technique for according to some embodiments of the present disclosure.

FIG. 12 depicts a flowchart showing a technique 1200 for redeeming tokens according to some embodiments of the present disclosure. At 1202, ledger data is maintained. The ledger data can include a plurality of public addresses, a plurality of virtual representations, a set of tokens for each of the plurality of virtual representations, and ownership data for each of the set of tokens. Each respective public address corresponds to a respective account of a respective user of the tokenization platform. The virtual representations correspond to respective items, and the set of tokens respectively correspond to a respective instance of the respective item for each virtual representation.

At 1204, a redemption request is received. The redemption request seeks to redeem a digital token from a user device of a user, and the digital token corresponds to an instance of the item to be redeemed. At 1206, ownership of the digital token by the user is verified. The verification can be made based on the plurality of public addresses, the sets of digital tokens, and the redemption request. For example, the redemption request may include a user id of a user wishing to redeem a token indicated by a token identifier. The platform 100 may validate the ownership of the token by checking that the ledger data links the token identifier indicated in the redemption request to the public address of the user indicated in the redemption request. If so, the ownership of the digital token is verified.

At 1208, details for fulfilment and/or delivery are managed by the platform 100. In some embodiments, the platform 100 may prompt the user to provide delivery details (e.g., via a graphical user interface). In response, the platform 100 may receive the delivery details from the user via the user device. The delivery details may then be output to a delivery system, which initiates delivery of the redeemed token. For example, the user may provide a physical address and any other relevant delivery data (e.g., best time of day for delivery or phone number). In this case, the delivery system may use the provided address to initiate a delivery of the item represented by the redeemed token. In another example, the token may represent a digital item. In such cases, the user may provide an email address or other account data to which the digital item (or a link thereto) may be delivered. In some embodiments, the platform 100 may request fulfilment details in response to verifying that the user is the owner of the token. The fulfilment details include information needed to satisfy the transaction for the item that were not provided at a time when the token was transacted for. For example, the fulfilment details may include item constituent materials, sizing, color, combinations thereof, and the like. The fulfilment details may be received from the user device of the user and outputted to a fulfilment system. The fulfillment system may initiate delivery of an item that satisfies the fulfillment details.

Figure 13:
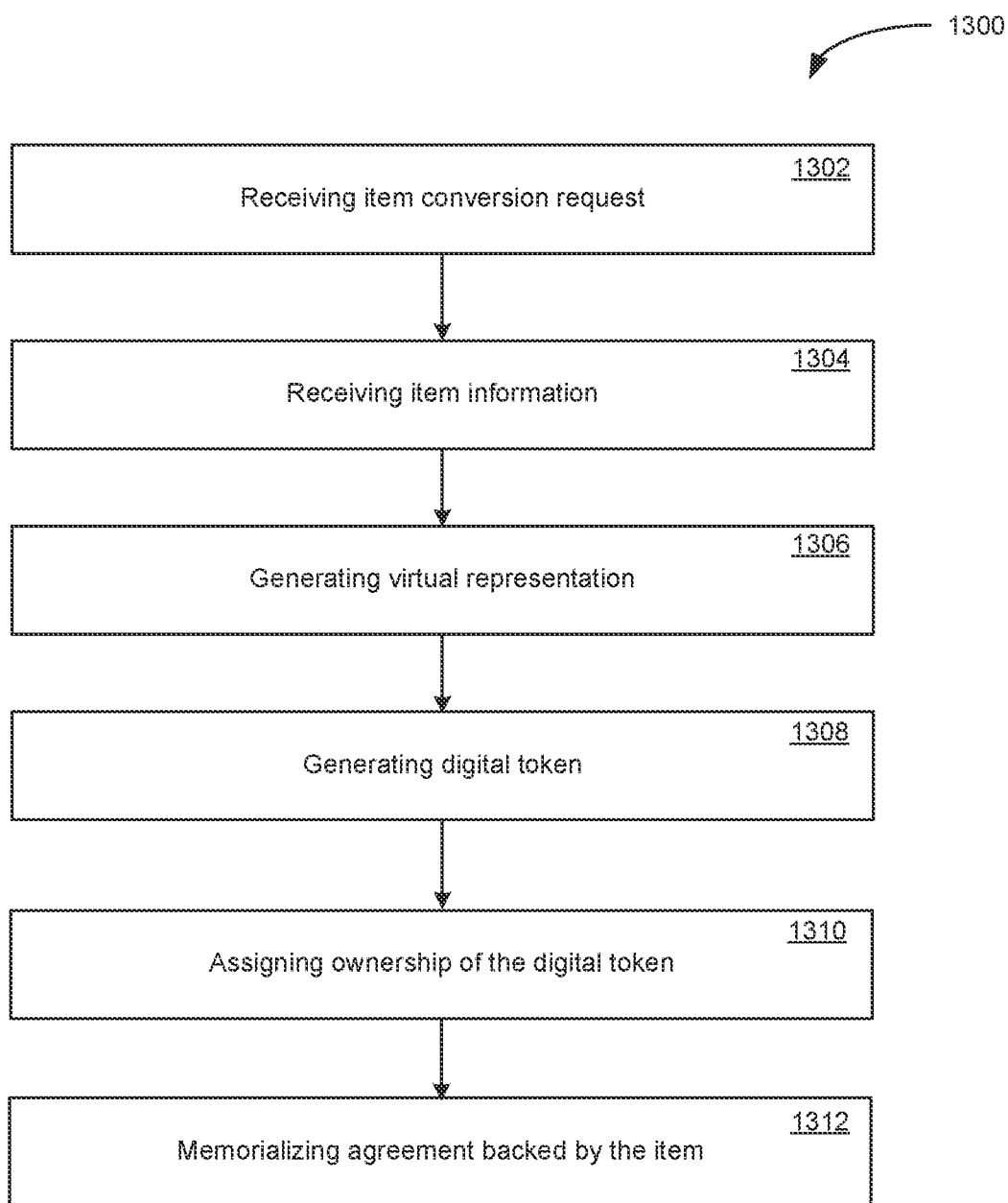
FIG. 13 is a flowchart showing a technique for according to some embodiments of the present disclosure.

FIG. 13 illustrates a flowchart showing a technique 1300 for collateralization and/or securitization according to some embodiments of the present disclosure. At 1302, an item conversion request is received. In embodiments, the item is a tangible item. In other embodiments, the item is other forms of collateral. At 1304, item information is received. The item information may include information that is required or helpful in determining valuation of the item. For example, the item information may include one or more photographs of the item, a description of the item, an appraisal value of the item, and/or a holding location of the item.

At 1306, a virtual representation of the collateral item is generated based on the item information. At 1308, one or more tokens are generated based on the virtual representation. At 1310, ownership of the digital token is assigned. Initially, the ownership of the digital token is assigned to the owner of the collateralized item represented by the digital token. At 1312, an agreement that is backed by the item is memorialized. In embodiments, the item is an asset that is used as collateral to an agreement to provide a service for the user by a provider. In embodiments, an instance of a smart contract that governs the service is generated. The smart contract indicates an amount to be provided by the user to the provider and one or more conditions that cause ownership of the digital token to be transferred to the provider. The instance of the smart contract may then be deployed by the processing system. In embodiments, the item is a collateralizable item that is used as loan security. The agreement to loan a defined amount of funds to the user by a lender is received by the processing system. An instance of a smart contract governing the loan is generated by the processing system. The instance of the smart contract indicates an amount to be paid back by the user to the lender, as well as one or more conditions that cause ownership of the token to be transferred to the lender (e.g., default conditions). The instance of the smart contract is then deployed by the processing system. In some embodiments, the token may be placed in escrow, such that the lendee cannot redeem or transfer the token until the loan is paid. In these embodiments, the smart contract may define conditions that result in the token being transferred back to the lendee (e.g., when payment is complete).

Figure 14:
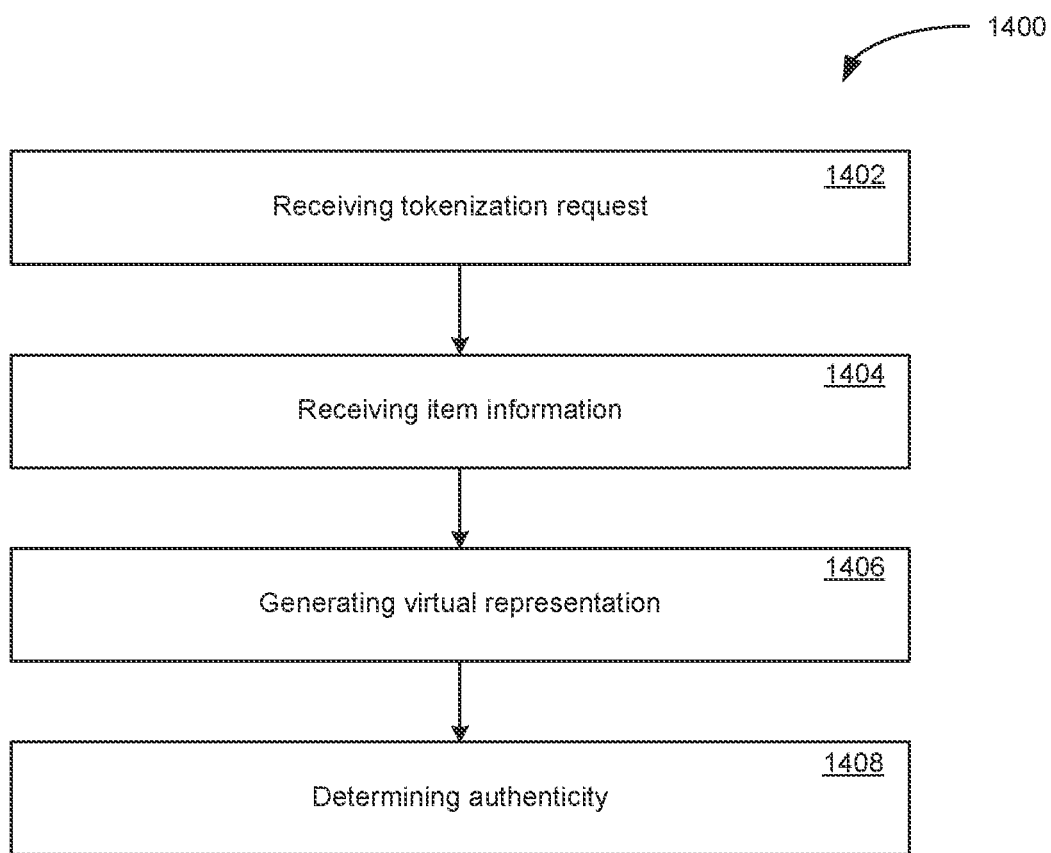
FIG. 14 is a flowchart showing a technique for according to some embodiments of the present disclosure.

FIG. 14 illustrates a flowchart showing a technique 1400 for item authentication according to some embodiments of the present disclosure. At 1402, a tokenization request is received from a user device. At 1404, item information is received. In some embodiments, the item information may be provided by a user or via an automated processes. At 1406, a virtual representation of the item is generated.

At 1408, the authenticity of the item is determined through suitable authentication processes. In embodiments, an authentication of the item may be requested via a portal that is accessible by subject-matter authentication experts. In these embodiments, the portal may further display the virtual representation of the item. For example, the subject-matter expert may be presented with an image of the item, a description of the item (e.g., weight, dimensions, etc.), a video of the item, and/or the like. An authentication report may then be received by the processing system. The authentication report may be provided by a subject-matter authentication expert, which may include an opinion indicating whether the subject-matter authentication expert deemed the item authentic or not-authentic and one or more reasons for the opinion. In some embodiments, the platform may generate a digital token in response to an opinion indicating that the item is deemed authentic, and ownership of the digital token assigned to an owner of the item. The digital token may be based on a virtual representation of the item.

Figure 15:
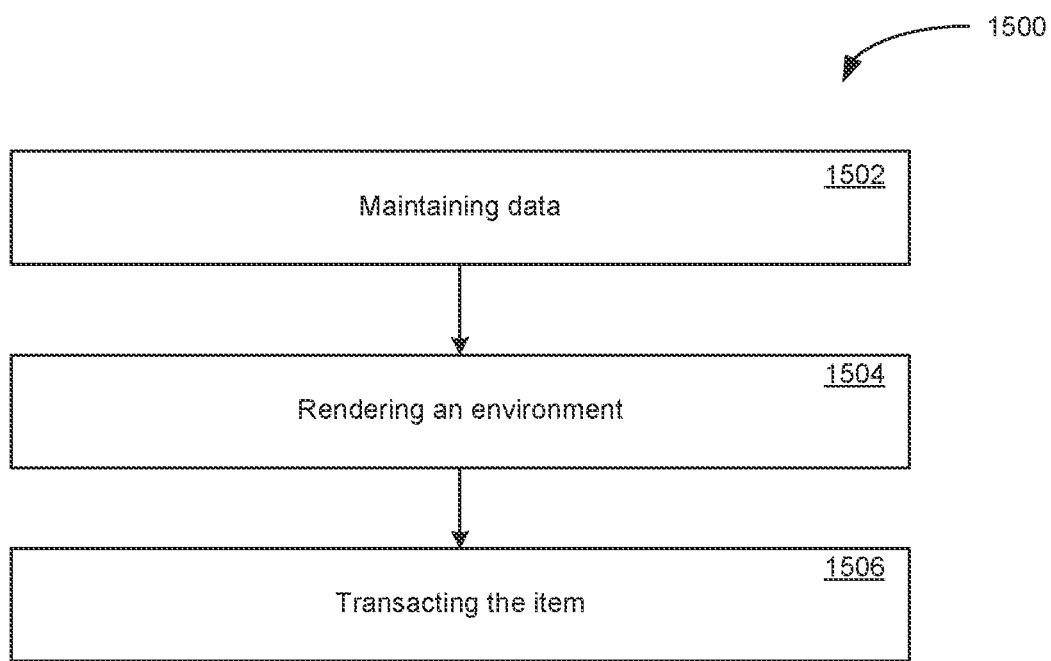
FIG. 15 is a flowchart showing a technique for according to some embodiments of the present disclosure.

FIG. 15 depicts a flowchart showing a technique 1500 for rendering VR environments. Leger data is maintained at 1502 using suitable processes such as those discussed above. At 1504, an environment is rendered. In embodiments, a virtual reality store environment is rendered, which provides an interface that allows users to view virtual reality visualizations of available items and to transact for instances of the available items. The available items are items which are available for transaction. Further, a virtual reality visualization of an item represented by a virtual representation may also be included within the virtual reality store environment. At 1506, the item within the virtual environment is transacted through suitable processes. For example, a request to participate in a transaction for an instance of the item is received by the platform 100 from a user device of a transacting user. In embodiments, the request to participate in the transaction is received in response to the transacting user viewing the virtual reality representation of the item in the virtual reality store environment. Information associated with the request may be verified, and the specific token corresponding to the virtual representation is associated with an account of the transacting user in response to verifying the request to participate in the transaction.

Figure 16:
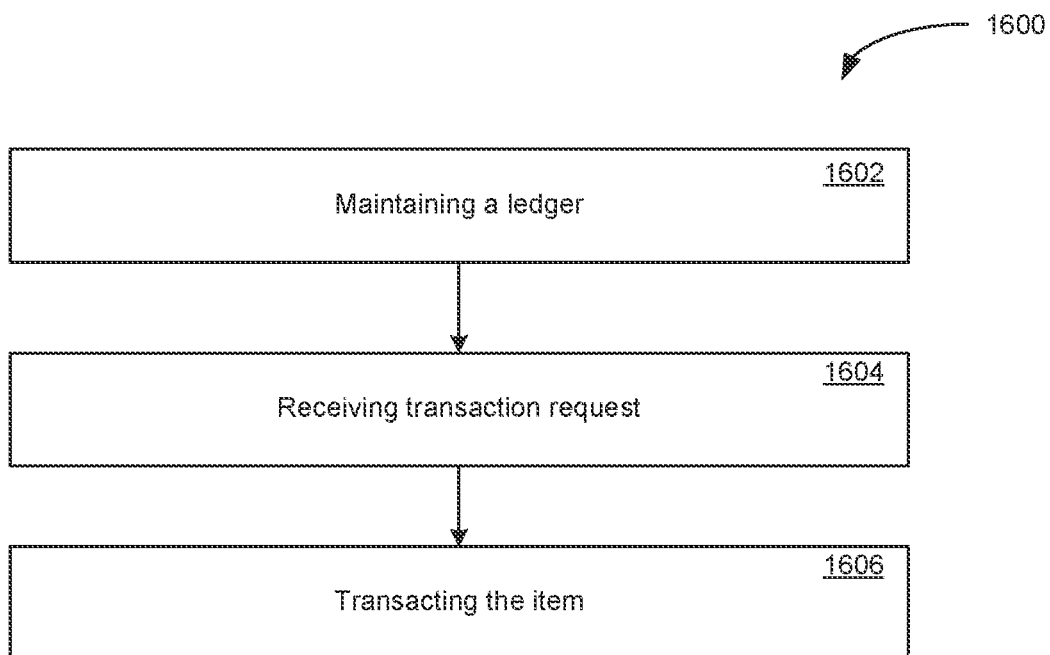
FIG. 16 is a flowchart showing a technique for according to some embodiments of the present disclosure.

FIG. 16 illustrates a flowchart showing a technique 1600 for facilitating transactions using ledger with a side chain of blocks according to some embodiments of the present disclosure.

At 1602, a ledger is maintained. The ledger includes a main chain of blocks and a side chain of blocks. In embodiments, blocks of the main chain collectively store information relating to a plurality of users, which include both item providers and item consumers. The information relating to the plurality of users includes a plurality of public addresses, and each respective public address corresponds to a respective account of a respective user of the tokenization platform. Blocks of the side chain collectively store a plurality of virtual representations of a plurality of respective items, a set of tokens for each virtual representation, and ownership data of each respective token. Each virtual representation includes virtual reality content to render a virtual reality visualization of the respective item, and each set of tokens respectively corresponds to a respective instance of the item represented by the virtual representation.

At 1604, a transaction request is received through a suitable process, such as those described above. At 1606, transaction of the item occurs. In embodiments, ownership data of a specific token corresponding to the virtual representation in the first side chain of blocks is updated to indicate that the transacting user owns the specific token. In embodiments, the transaction of the item includes validating the specific token based on the digital-token identifier and the first chain of blocks, verifying that the different user has a valid account on the tokenization platform based on the public address of the user and the main chain of blocks, and, in response to validating the specific token and verifying the different user, updating the second chain of blocks with a new block. The new block includes ownership data that indicates that the specific token corresponding to the virtual representation is owned by the different user.

Figure 17:
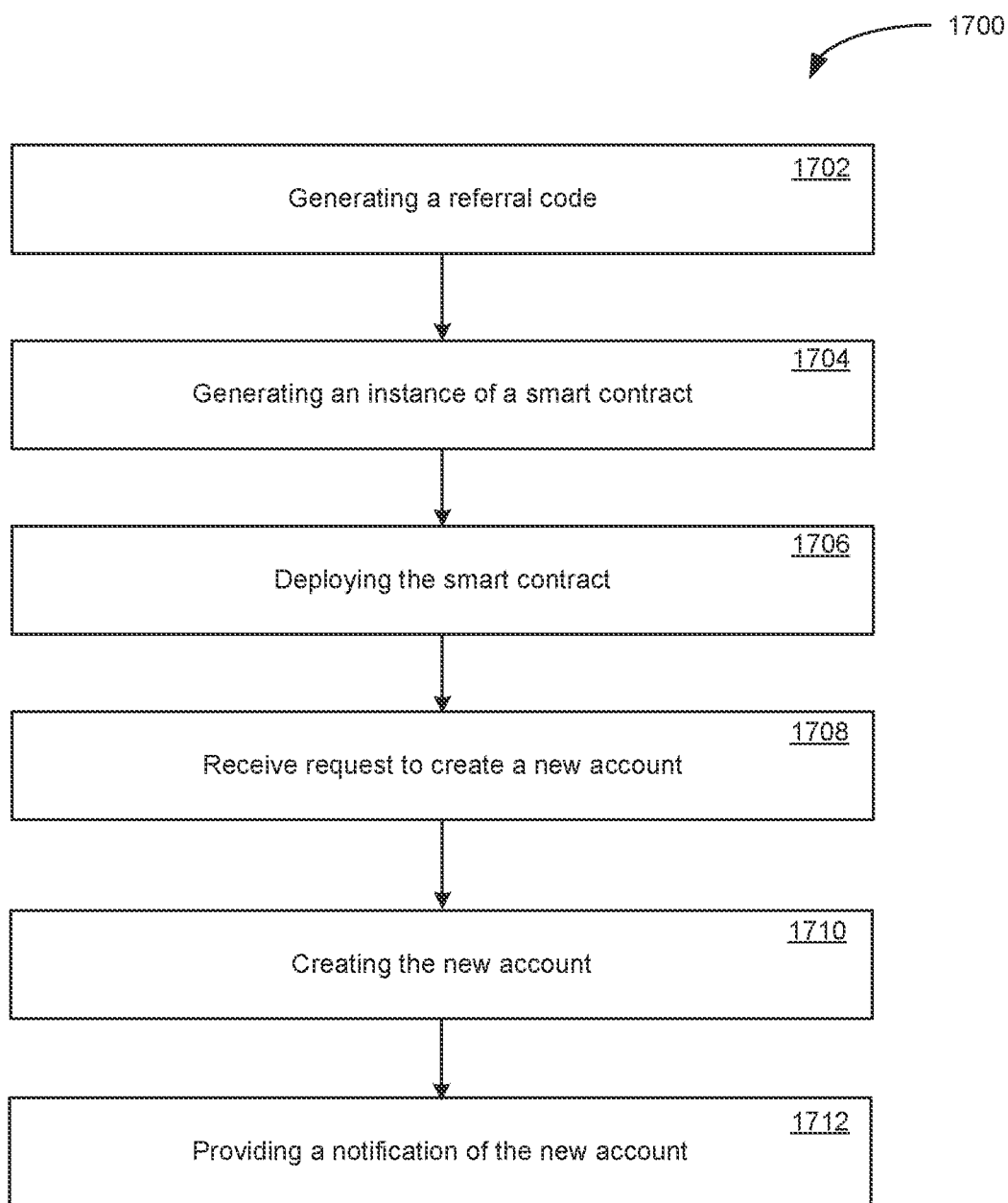
FIG. 17 is a flowchart showing a technique for according to some embodiments of the present disclosure.

FIG. 17 depicts a flowchart showing a technique 1700 for facilitating user acquisition according to some embodiments of the present disclosure. At 1702, a referral code is generated, which corresponds to a user of the tokenization platform. The referral code may be generated by a processing system of the tokenization platform. At 1704, an instance of a smart contract is generated that corresponds to the user of the tokenization platform. The instance of the smart contract may be generated by the tokenization platform. The instance of the smart contract indicates an incentive to be provided to the user when the user successfully refers the tokenization platform. At 1706, the instance of the smart contract is deployed by the processing system. At 1708, a request to create a new account is received from a new user by the processing system. The request includes the referral code of the user. At 1710, the new account is created for the new user by the processing system. At 1712, the processing system provides a notification of the new account to the instance of the smart contract corresponding to the user. The smart contract then facilitates the transfer of a token representing the incentive in response to the notification.

Figure 18:
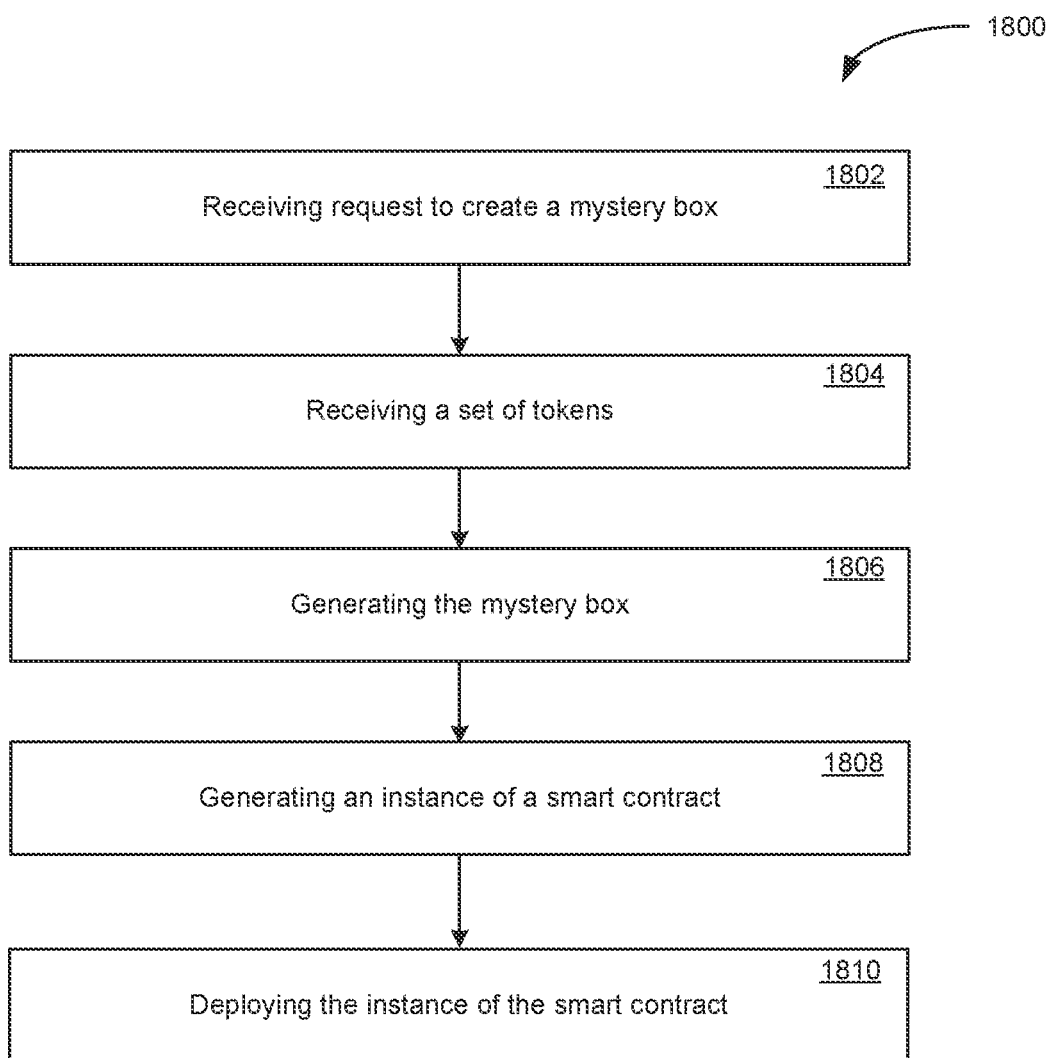
FIG. 18 is a flowchart showing a technique for according to some embodiments of the present disclosure.

FIG. 18 depicts a flowchart showing a technique 1800 for managing mystery boxes according to some embodiments of the present disclosure. At 1802, a request to create a mystery box is received by the processing system. At 1804, a set of tokens to be included in the mystery box is received by the processing system. Each token in the set of tokens represents a respective item and has a probability assigned thereto. The probability indicates a probability of winning the respective item.

At 1806, the mystery box is generated by the processing system based on the set of tokens and the probabilities assigned thereto. Each token in the set of tokens is assigned a range of values within an interval of values such that the range of values with respect to the interval of values is proportionate to the probability assigned to the token.

At 1808, an instance of a smart contract is generated by the processing system. The smart contract is associated with the mystery box and governs the transfer of tokens from the set of tokens in support of the mystery box. At 1810, the instance of the smart contract is deployed by the processing system.

Figure 19:
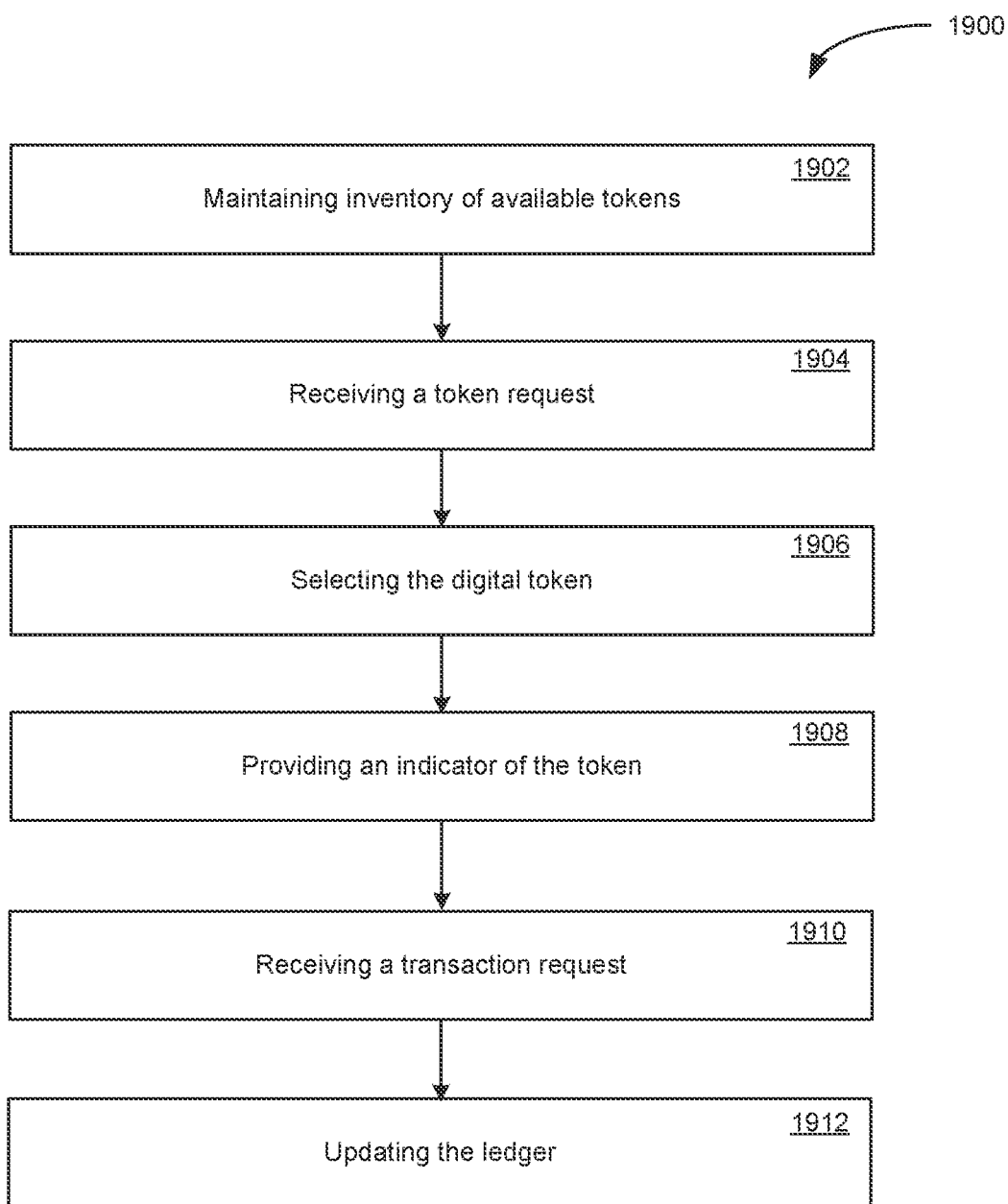
FIG. 19 is a flowchart showing a technique for according to some embodiments of the present disclosure.

FIG. 19 depicts a flowchart showing a technique 1900 for video-game integration according to some embodiments of the present disclosure. At 1902, an inventory of available tokens is maintained. The available tokens are available for integration in a video game. Each token in the inventory of tokens represents a respective item. At 1904, a token request for a digital token is received by the processing system. The digital token is from an instance of the video game via an API. At 1906, the processing system selects the digital token from the inventory of available tokens based on the token request. At 1908, an indicator of the token is provided to the instance of the video game by the processing system. At 1910, the processing system receives a transaction request from the instance of the video game. The transaction request is configured to request a transfer of the token provided to the instance of the video game to an account of a user of the instance of the video game. At 1912, the ledger is updated to reflect that the user is the owner of the token.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition). The term "set" may refer to one or more objects.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for"

performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system for integrating real-world items into video games, comprising:
    an interface configured to receive an identifier of a real-world item, the real-world item having a set of real-world-item attributes;
    a token generation system configured to:
        generate a unique digital token that has a set of digital attributes that correspond to the set of real-world item attributes, the set of digital attributes including a token identifier that identifies the digital token, and
        generate a cryptographically secure, one-to-at-least-one link between the digital token generated by the cryptographic token generation system and the identifier of the real-world item, such that the digital token provides a digital representation of the real-world item and is associated with a video game, such that digital token corresponds to an in-game benefit in the video game that is unlocked for an owner of the digital token, the digital token being redeemable for the real-world item;
    a ledger update system configured to:
        write the digital token to a blockchain in accordance with a protocol, thereby facilitating transactions for the real-world item using the digital token, and
        assign the digital token to an account of a user on the blockchain in accordance with the protocol, whereby once assigned to the account of the user, the digital token indicates an ownership right of the user to the real-world item that is cryptographically linked to the digital token;
    a video game integration system configured to:
        receive a request from an instance of the video game, wherein the request is indicative of the user and requests eligible digital tokens owned by the user,
        access the account of the user on the blockchain using a public address of the user to verify that the user is the owner of the digital token, and
        in response to verifying that the user is the owner of the digital token, serve the digital token to the instance of a video game, the video game instance unlocks the in-game benefit corresponding to the digital token in response to receiving the digital token; and
    a redemption system that facilitates redemption of digital tokens, the redemption system being configured to:
        receive a redemption request that indicates the token identifier of the digital token and the account of the user,
        determine whether or not the digital token is served to the instance of the video game such that the in-game benefit is unlocked, and
        initiate fulfillment of the real-world item in response to verifying that: (i) the digital token is not currently served to the instance of the video game such that the in-game benefit is no longer unlocked, and (ii) the digital token is owned by the user based on the token identifier, the account, and the blockchain.

2. The system of claim 1, wherein the real-world item is a unique non-fungible item and the digital token is a non-fungible token that is redeemable for the real-world item.

3. The system of claim 1, wherein the real-world item is a unique non-fungible item and the user is in possession of the non-fungible item.

4. The system of claim 1, wherein the real-world item is a fungible consumer product and the digital token is a copy of a fungible token that is redeemable for a unit of a plurality of units of the fungible consumer good, such that multiple users may redeem respective other copies of the fungible token for respective units of the plurality of units of the fungible consumer product.

5. The system of claim 1, wherein the real-world item is a consumer product and the digital token is cryptographically linked with the digital representation of the consumer product and is redeemable for a unit of the consumer product.

6. The system of claim 1, wherein the digital token is transferrable to another user.

7. The system of claim 6, further comprising: a token transfer system that receives a request to transfer the digital token from the account of the user to a second account of the other user and, in response, facilitates the transfer of the digital token from the account of the user to the second account of the user via the ledger update system.

8. The system of claim 7, wherein once the digital token is transferred to the second account of the other user, the in-game benefit is no longer unlocked with respect to video game instances of the user.

9. The system of claim 7, wherein once the digital token is transferred to the second account of the other user, the in-game benefit is unlocked with respect to video game instances of the other user.

10. The system of claim 1, further comprising a digital marketplace a digital marketplace system that provides a user interface that allows users to transact for respective items, wherein the digital marketplace is configured to facilitate transactions for the items using digital tokens that are cryptographically linked with item identifiers of the respective items.

11. The system of claim 10, wherein the digital token was transferred to the account of the user in response to the user transacting for the real-world item via the digital marketplace.

12. The system of claim 1, wherein the real-world item is already in existence.

13. The system of claim 1, wherein the real-world item has a defined type and a defined set of characteristics but is not yet in existence, such that the digital token is redeemable for the real-world item after the real-world item is in existence.

14. The system of claim 1, wherein the set of real-world-item attributes includes a set of physical attributes of the real-world item, wherein at least some of the digital attributes are based on the physical attributes of the real-world item.

15. The system of claim 1, wherein the set of real-world-item attributes include a set of origination attributes of the real-world item, wherein at least some of the digital attributes are based on the origination attributes of the real-world item.

16. The system of claim 15, wherein the set of origination attributes includes one or more of limited-edition attributes, celebrity signature attributes, certification of originality attributes, location of origin attributes, or certification of ethical production attributes.

17. The system of claim 1, wherein the set of digital attributes of the unique digital token includes a data structure that represents the physical attributes of the real-world item.

18. The system of claim 1, wherein the set of digital attributes of the unique digital token includes a data structure that supports a visual representation of the real-world item.

19. The system of claim 1, wherein the set of digital attributes of the unique digital token includes an image of the real-world item.

20. The system of claim 1, wherein the set of digital attributes of the unique digital token includes a data structure that represents an animation of the real-world item.

21. The system of claim 1, wherein the ledger update system writes the digital token to a side chain of a set of side chains of the blockchain.

22. The system of claim 21, wherein each side chain of the set of side chains is a respective shard of the blockchain that extends from a main chain of the blockchain.

23. The system of claim 22, wherein each side chain of the set of side chains corresponds to a different categorization of real-world items.

24. The system of claim 22, wherein the side chain of the plurality of side chains further stores a virtual representation of the real-world item.

25. The system of claim 1, wherein the blockchain is a private blockchain.

26. The system of claim 1, wherein the blockchain is a public blockchain.

27. The system of claim 1, wherein the video game integration system is further configured to facilitate appearance of a visual indicium of the digital token in the video game instance corresponding to the owner of the unique digital token.

28. The system of claim 1, wherein the digital token confers respective in-game benefits within multiple video game environments.

* * * * *